(12) United States Patent
Lablans

(10) Patent No.: US 8,345,873 B2
(45) Date of Patent: Jan. 1, 2013

(54) METHODS AND SYSTEMS FOR N-STATE SIGNAL PROCESSING WITH BINARY DEVICES

(75) Inventor: Peter Lablans, Morris Township, NJ (US)

(73) Assignee: Ternarylogic LLC, Morris Township, NJ (US)

( * ) Notice: Subject to any disclaimer, the term of this patent is extended or adjusted under 35 U.S.C. 154(b) by 1044 days.

(21) Appl. No.: 12/273,262

(22) Filed: Nov. 18, 2008

(65) Prior Publication Data

US 2009/0092250 A1 Apr. 9, 2009

Related U.S. Application Data

(63) Continuation-in-part of application No. 11/696,261, filed on Apr. 4, 2007, now Pat. No. 7,487,194, and a continuation-in-part of application No. 12/264,728, filed on Nov. 4, 2008, now abandoned, and a continuation-in-part of application No. 12/137,945, filed on Jun. 12, 2008.

(60) Provisional application No. 61/078,606, filed on Jul. 7, 2008.

(51) Int. Cl.
*H06F 15/16* (2006.01)
(52) U.S. Cl. ........ 380/255; 380/210; 380/211; 380/212; 380/268; 380/260; 713/180; 713/189; 713/165; 714/774; 714/777
(58) Field of Classification Search ............ 380/28, 380/255, 287, 210, 268
See application file for complete search history.

(56) References Cited

U.S. PATENT DOCUMENTS

| | | | |
|---|---|---|---|
| 4,304,962 A | 12/1981 | Fracassi et al. |
| 4,663,501 A | 5/1987 | Pospischil |
| 4,669,118 A | 5/1987 | Pospischil |
| 5,412,665 A | 5/1995 | Gruodis |
| 5,745,522 A | 4/1998 | Heegard |
| 5,844,989 A | 12/1998 | Nishida et al. |
| 5,966,447 A | 10/1999 | Nishida et al. |
| 6,038,577 A | 3/2000 | Burshtein |
| 6,122,376 A | 9/2000 | Rao |
| 6,188,714 B1 | 2/2001 | Yamaguchi |

(Continued)

OTHER PUBLICATIONS http://www-inst.eecs.berkeley.edu/~cs150/sp03/handouts/15/LectureA/lec27-6up.pdf "Fibonacci and Galois Representations of Feedback with Carry Shift Registers"—Mark Goresky and Andrew Klapper, PSU, Dec. 2004.*

(Continued)

*Primary Examiner* — Krista Zele
*Assistant Examiner* — Randy Scott
(74) *Attorney, Agent, or Firm* — Diehl Servilla LLC

(57) ABSTRACT

Linear Feedback Shift Registers (LFSRs) based $2^p$ state with $p>2$ or $p \geq 2$ scramblers, descramblers, sequence generators and sequence detectors in binary implementation are provided. An LFSR may apply devices implementing a binary XOR or EQUIVALENT function, a binary shift register and binary inverters and binary state generator, wherein at least an output of one shift register element in a first LFSR is connected to a device implementing a reversible binary logic function is a second LFSR. They may also apply $2^p$ state inverters using binary combinational logic are applied. Memory based binary $2^p$ state inverters are also applied. Non-LFSR based n-state scramblers and descramblers in binary logic are also provided. A method for simple correlation calculation is provided. Communication systems and data storage systems applying the provided LFSR devices are also disclosed.

20 Claims, 39 Drawing Sheets

U.S. PATENT DOCUMENTS

| | | | |
|---|---|---|---|
| 6,282,230 B1 | 8/2001 | Brown et al. | |
| 6,295,301 B1 | 9/2001 | Asano | |
| 6,430,246 B1 | 8/2002 | Ozluturk | |
| 6,463,448 B1 | 10/2002 | Mo | |
| 6,510,228 B2 | 1/2003 | Rose | |
| 6,665,692 B1 | 12/2003 | Nieminen | |
| 6,785,389 B1 | 8/2004 | Sella et al. | |
| 6,788,668 B1 | 9/2004 | Shah et al. | |
| 6,933,862 B2 | 8/2005 | Neff | |
| 6,947,468 B2 | 9/2005 | Medlock | |
| 7,046,803 B2 | 5/2006 | Lee et al. | |
| 7,082,449 B2 | 7/2006 | Rarick | |
| 7,227,949 B2 | 6/2007 | Heegard et al. | |
| 7,383,295 B2 * | 6/2008 | Souvignier et al. | 708/252 |
| 2003/0063677 A1 | 4/2003 | Mix et al. | |
| 2004/0090907 A1 | 5/2004 | An | |
| 2004/0111613 A1 * | 6/2004 | Shen-Orr et al. | 713/165 |
| 2007/0047623 A1 | 3/2007 | Eun et al. | |
| 2007/0168406 A1 | 7/2007 | Meyer | |
| 2007/0283231 A1 * | 12/2007 | Hoyle | 714/781 |
| 2007/0290901 A1 * | 12/2007 | Hekstra et al. | 341/95 |

OTHER PUBLICATIONS http://www.math.ias.edu/~goresky/pdf/Fib.jour.pdf "Fibonacci and Galois Representations of Feedback with Carry Shift Registers"—Mark Goresky and Andrew Klapper, IEEE Transactions on Information Theory, vol. 48, No. 11, Nov. 2002.*

Arazi, Benjamin "Self Synchronizing Digital Scramblers", *IEEE Transactions on Communications*, vol. Com-25, No. 12, (Dec. 1977), 1505-1507 pp.

Sklar, Bernard "Reed-Solomon Codes", *Downloaded from URL http://www.facweb.iitkgp.ernet.in/~pallab/mob_com/art_sklar7_reed-solomon.pdf*, (unknown), 1-33 pp.

Clarke, C.K.P. "Reed-Solomon Error Correction", *BBC R&D White Paper*, (Jul. 2002), 47 pp.

Rogers, Derek P., "Non-Binary Spread-Spectrum Multiple-Access Communications", *Thesis for the degree of Doctor of Philosophy, The University of Adelaide, Faculty of Engineering, Department of Electrical and Electronic Engineering*, Adelaide, Australia, (Mar. 1995), 213 pages.

* cited by examiner

| shift register | | |
|---|---|---|
| sr1 | sr2 | sr3 |
| 1 | 3 | 0 |
| 0 | 1 | 3 |
| 1 | 3 | 2 |
| 3 | 3 | 1 |
| 2 | 2 | 2 |
| 3 | 0 | 0 |
| 0 | 3 | 0 |
| 0 | 0 | 3 |
| 1 | 3 | 3 |
| 1 | 2 | 0 |
| 0 | 1 | 2 |
| 3 | 2 | 3 |
| 1 | 0 | 1 |
| 2 | 0 | 1 |
| 2 | 3 | 1 |
| 2 | 3 | 2 |

| shift register | | |
|---|---|---|
| sr1 | sr2 | sr3 |
| 1 | 3 | 2 |
| 3 | 3 | 1 |
| 2 | 2 | 2 |
| 3 | 0 | 0 |
| 0 | 3 | 0 |
| 0 | 0 | 3 |
| 1 | 3 | 3 |
| 1 | 2 | 0 |
| 0 | 1 | 2 |
| 3 | 2 | 3 |
| 1 | 0 | 1 |
| 2 | 0 | 1 |
| 2 | 3 | 1 |
| 2 | 3 | 2 |
| 3 | 0 | 1 |
| 2 | 2 | 1 |

| shift register | | |
|---|---|---|
| sr1 | sr2 | sr3 |
| 0 | 1 | 0 |
| 0 | 0 | 1 |
| 1 | 1 | 1 |
| 3 | 0 | 0 |
| 1 | 3 | 0 |
| 2 | 1 | 3 |
| 0 | 1 | 2 |
| 2 | 2 | 3 |
| 0 | 1 | 1 |
| 1 | 1 | 0 |
| 2 | 1 | 1 |
| 2 | 3 | 0 |
| 3 | 2 | 3 |
| 2 | 0 | 1 |
| 2 | 3 | 1 |
| 2 | 3 | 2 |

| shift register | | | | |
|---|---|---|---|---|
| sr1 | sr2 | sr3 | sr4 | sr5 |
| 0 | 1 | 0 | 0 | 1 |
| 1 | 0 | 1 | 1 | 0 |
| 0 | 1 | 0 | 1 | 1 |
| 1 | 0 | 1 | 1 | 1 |
| 1 | 1 | 0 | 0 | 1 |
| 1 | 1 | 1 | 1 | 0 |
| 0 | 1 | 1 | 1 | 1 |
| 1 | 0 | 1 | 0 | 1 |
| 1 | 1 | 0 | 0 | 0 |
| 0 | 1 | 1 | 0 | 0 |
| 0 | 0 | 1 | 1 | 0 |
| 0 | 0 | 0 | 1 | 1 |
| 1 | 0 | 0 | 1 | 1 |
| 1 | 1 | 0 | 1 | 1 |
| 1 | 1 | 1 | 1 | 1 |
| 1 | 1 | 1 | 0 | 1 |

| shift register | | | | |
|---|---|---|---|---|
| sr1 | sr2 | sr3 | sr4 | sr5 |
| 1 | 1 | 1 | 1 | 1 |
| 1 | 1 | 1 | 0 | 1 |
| 0 | 1 | 1 | 0 | 0 |
| 1 | 0 | 1 | 1 | 0 |
| 1 | 1 | 0 | 1 | 1 |
| 0 | 1 | 1 | 1 | 1 |
| 0 | 0 | 1 | 0 | 1 |
| 1 | 0 | 0 | 0 | 0 |
| 1 | 1 | 0 | 0 | 0 |
| 1 | 1 | 1 | 0 | 0 |
| 0 | 1 | 1 | 1 | 0 |
| 0 | 0 | 1 | 1 | 1 |
| 0 | 0 | 0 | 0 | 1 |
| 0 | 0 | 0 | 1 | 0 |
| 1 | 0 | 0 | 0 | 1 |
| 1 | 1 | 0 | 1 | 0 |

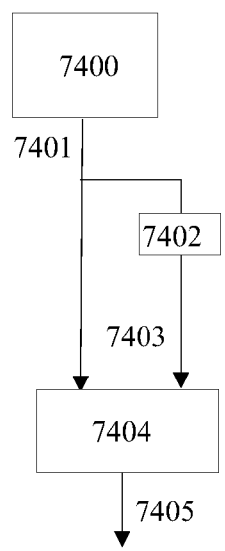
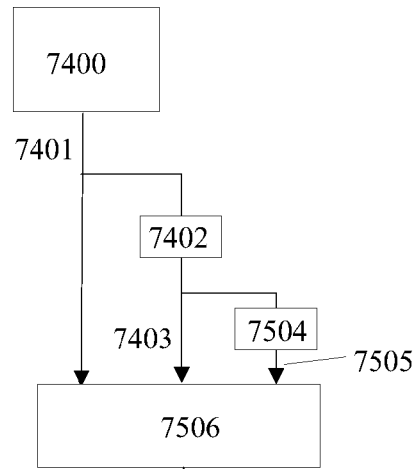
FIG. 74    FIG. 75
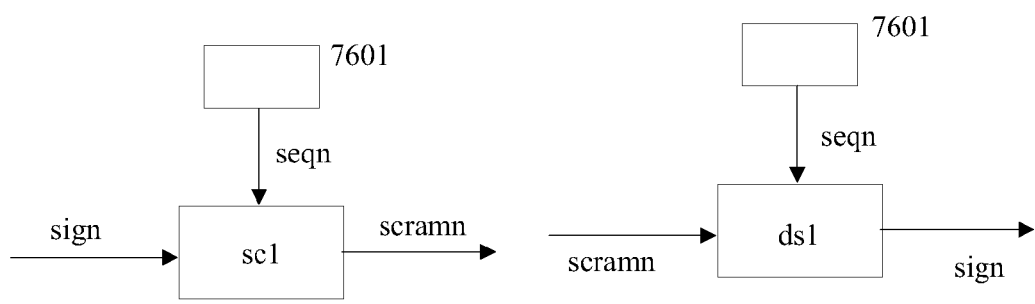
FIG. 76    FIG. 77

METHODS AND SYSTEMS FOR N-STATE SIGNAL PROCESSING WITH BINARY DEVICES

CROSS-REFERENCE TO RELATED APPLICATIONS

This application is a continuation-in-part of U.S. Non-Provisional patent application Ser. No. 11/696,261, filed on Apr. 4, 2007 now U.S. Pat. No. 7,487,194, which is incorporated herein by reference in its entirety. This application is also a continuation-in-part of U.S. Non-Provisional patent application Ser. No. 12/264,728, filed on Nov. 4, 2008 now abandoned, which is incorporated herein by reference in its entirety. This application is also a continuation-in-part of U.S. Non-Provisional patent application Ser. No. 12/137,945, filed on Jun. 12, 2008, which is incorporated herein by reference in its entirety. This application claims the benefit of U.S. Provisional Application No. 61/078,606, filed Jul. 7, 2008, which is incorporated herein by reference in its entirety.

BACKGROUND OF THE INVENTION

The present invention relates to n-valued Linear Feedback Shift Registers (LFSRs). More specifically it relates to equivalency of n-valued LFSRs in Fibonacci and Galois configuration, implemented in binary circuitry.

Data scramblers, descramblers, sequence generators, detectors and coders based on shift registers with feedback are important components in data communications and data transfer in applications such as magnetic and optical data storage. It is known that linear feedback shift registers (LFSRs) can be realized in Fibonacci and Galois configurations. LFSRs in Fibonacci configuration are easier to analyze. Descramblers in Fibonacci are self-synchronizing. No prior art was found with sequence descramblers in a first Galois configuration. However descramblers in a first Galois configuration herein provided as an aspect of the present invention are not self-synchronizing. LFSRs in Galois configuration require fewer clock cycles for execution than Fibonacci equivalents.

LFSRs are also of interest in n-valued applications with n>2. It is sometimes advantageous to design an LFSR in Fibonacci configuration, while implementing it in Galois configuration. It may also be advantageous to implement an n-valued sequence generator in Galois configuration, because it is fast. One may want also to create a matching self synchronizing detector for such a generator, which may be in Fibonacci configuration. The rules for creating corresponding n-valued Fibonacci equivalent LFSRs in descramblers to Galois scramblers were not known prior to the present invention.

This invention relates to the processing of multi-valued or n-state (non-binary) signals with n>2. More in particular it relates to the scrambling, descrambling, generation and the detection of multi-valued (non-binary) or n-state signals representing sequences of multi-valued (non-binary) or n-state symbols such as n-valued pseudo-noise sequences. Multi-valued signals, also referred to as n-valued or n-state signals, can assume one of n states, wherein n is greater than or equal to three.

The n-state scramblers and descramblers are implemented by using a Linear Feedback Shift Register or LFSR. Well known is the binary LFSR based scrambler and the corresponding self synchronizing LFSR based binary descrambler. Its potential application is in telecommunication systems, control systems and other applications. Specific examples of utility where the invention can be used include spread-spectrum technologies, signal scrambling, CDMA, line-coding including error control, error detection and error control coding and scrambling application in video, voice and data communication and other signal distribution.

LFSR based scramblers are used to change the appearance of a digital signal in such a way that during transmission the signal is different from the original signal. The original signal can be recovered from the scrambled signal at the receiving end by a descrambler. Most commonly in today's telecommunications, the scramblers relate to binary signals.

Scrambling of a binary signal can be achieved by combining the binary signal to be scrambled with a second known binary signal through a digital circuit that has the characteristics of a reversible function. A known signal is commonly known as a key and may for instance be derived from a prime number, which may be a large prime number.

In the case of scrambling with an LFSR scrambler there is no real known signal. A second signal that is used for scrambling comes from the LFSR. Such a signal is essentially unknown. However, the nature of the LFSR allows the signal from the LFSR to be reconstructed at the receiving side. Though the signal from the LFSR is still unknown, it can be reconstructed and thus can be applied to recover the original signal from a scrambled signal.

The inventor has provided the rule for an n-valued or n-state LFSR based descrambler corresponding to an n-valued LFSR based scrambler. This has been disclosed in U.S. patent application Ser. No. 10/935,960 filed Sep. 8, 2004 entitled Ternary and multi-valued digital signal scramblers, descramblers and sequence generators and in U.S. patent application Ser. No. 10/912,954 filed Aug. 6, 2004 entitled Ternary and higher multi-valued digital scramblers/descramblers, which are both incorporated herein by reference in their entirety.

There are two known binary functions that can perform this reversible function: the Exclusive Or (XOR) and the Equality function in a binary scrambler and descrambler. The XOR function is also known as the modulo-2 adding function.

Telecommunication markets such as wireless communications and Internet communications demonstrate an ongoing increase in demand for higher information transmission rates. This demand in increased information transmission rates in wireless communications is addressed by increasing bandwidth of communication channels, by compression of the information and by moving into much higher radio spectra (such as Ultra Wide Band in the 5 GHz area). Eventually, new technology has to be applied to obtain better performance from existing bandwidth, starting with highly congested spectrum areas. Current transmission technology predominantly uses digital binary signals. One possible technology to provide better bandwidth usage is the application of multi-valued or n-state signals on a much broader scale. Scrambling, descrambling and signal sequence generation is an important element of signal processing technology, especially in wireless communications. Currently very little technology exists that can perform multi-valued digital scrambling, descrambling and sequence generation. Most of existing solutions in scrambling, descrambling and sequence generation only performs binary functions, as previously discussed. Transmission of non-binary signals already takes place. Examples are for instance QAM-$2^p$ signals with $p \geq 2$. One may easily find articles describing QAM-4096 signals. A QAM-4096 symbol may capture the equivalence of 12 bits.

Despite the transmission of high information content signals, processing of symbols in general takes place completely in the binary domain. The processing of $2^p$ valued or state signals may be facilitated by considering a $2^p$ state signal as being defined in $GF(2^p)$. This allows the creation of $GF(2^p)$ based LFSRs as was described extensively by the inventor in U.S. patent application Ser. No. 12/137,945 filed on Jun. 12, 2008 which is incorporated herein by reference in its entirety. The application describes scramblers, descramblers and sequence generators.

The LFSR over $GF(2^p)$ approach may also be applied to other novel types of scramblers, sequence generators and sequence detectors which may provide for instance better security or a greater statistical variety in sequences and changing of sequences.

Accordingly, new and improved methods and apparatus for n-state scrambling, descrambling, sequence generation and sequence detection on multi-valued or n-state signals with binary technologies are required.

SUMMARY OF THE INVENTION

In the context of the present invention the term n-valued is used. In general n is intended to indicate a state of a signal or a symbol with n>2, unless it is specifically mentioned that n≧2. Symbols may represent a signal. The term symbol and signal may be used interchangeably. An n-valued symbol or signal is able to assume one state at a time, wherein the symbol or signal assumes one of n possible states. In general states are indicated with values from 0 to (n−1). A state signifies only that it is different from another state. While a state of a symbol may represent a signal, a state does not reflect the actual value of a signal. An exception herein may be the state 0, which in certain cases may reflect absence of signal. A symbol which is indicated as being able to assume one of n states, is intended to be able assume at a time any of the n possible states. In some cases a symbol may be able to only or at least assume a limited number of states. In that case it may be mentioned that a symbol can assume for instance a first or a second state.

LFSRs are widely used for coding and decoding. Scramblers and descramblers differ from some coders that they are first of all generally streaming, coding one received symbol into another symbol and no symbols are added or removed. This is different from for instance Reed-Solomon coders, which use LFSRs. However those coders work on a predetermined number of symbols and form a codeword or decode a codeword of finite length. Also for each codeword the initial content of the shift register is reset. This is usually different for scramblers and descramblers.

In accordance with an aspect of the present invention a method is provided for scrambling a binary word of p-bits with p≧2 with a plurality of p binary Linear Feedback Shift Registers (LFSR), each LFSR in the plurality having an input and an output, each input of an LFSR enabled to receive a signal representing a bit, and each output enabled to provide a signal representing a bit, each binary LFSR having a plurality of shift register elements, each shift register element having an input and an output, comprising, creating a scrambler containing: the p LFSRs, p inputs and p outputs, providing a signal representing a bit in the word of p bits on a first input of each of p scrambling devices, each scrambling device implementing a binary 2-place function and each scrambling device further including a second input and an output, wherein the second input of each of the p scrambling devices is connected uniquely to the output of one of the p LFSRs in the plurality of binary LFSRs, connecting each of the p outputs of the scrambling devices uniquely to one input of the p LFSRs in the plurality of LFSRs, connecting a first input of a device that is in a first LFSR in the plurality of LFSRs, the device implementing a reversible binary two-place logic function further having a second input and an output to a connection point in a second LFSR in the plurality of LFSRs, the first and second LFSRs being different LFSRs, and outputting p signals representing a scrambled word of p bits on the p outputs of the scrambler.

In accordance with a further aspect of the present invention a method is provided, wherein each of the outputs of the p scrambling devices is uniquely connected to the input of the one of p LFSRs of which the output is connected to the second input of the one of the p scrambling devices.

In accordance with yet a further aspect of the present invention a method is provided, wherein each of the outputs of the p scrambling devices is connected uniquely to the input of one of the p LFSRs in such a way that the output of each of at least two scrambling devices is uniquely connected to an input of the LFSR of which the output is not connected to the second input of the scrambling device.

In accordance with yet a further aspect of the present invention a method is provided, wherein each of the outputs of the p scrambling devices is connected uniquely to the input of one of the p LFSRs by a binary logic device that may be a memory or a combinational device implementing a multiplier over $GF(2^p)$.

In accordance with yet a further aspect of the present invention a method is provided, wherein the first and the second LFSR are the same LFSR.

In accordance with yet a further aspect of the present invention a method is provided, wherein an LFSR has a Fibonacci configuration.

In accordance with yet a further aspect of the present invention a method is provided, wherein an LFSR has a Galois configuration.

In accordance with yet a further aspect of the present invention a method is provided, further comprising descrambling with a descrambler the p signals representing the scrambled word of p bits into p signals representing the binary word of p bits.

In accordance with yet a further aspect of the present invention a method is provided, wherein the descrambler contains a binary LFSR in Galois configuration and the scrambler is self-synchronizing.

In accordance with yet a further aspect of the present invention a method is provided, wherein the descrambler contains a binary LFSR in Galois configuration and the scrambler is not self-synchronizing.

In accordance with another aspect of the present invention a device is provided for scrambling a binary word of p-bits with p≧2, comprising, p inputs, each input enabled to receive a signal representing one of p-bits of the binary word, p outputs, each output enabled to provide a signal representing one of p scrambled bits, the p scrambled bits forming a scrambled binary word of p bits, a plurality of p binary Linear Feedback Shift Registers (LFSR), each LFSR in the plurality having an input and an output, each input of an LFSR enabled to receive a signal representing a bit, and each output enabled to provide a signal representing a bit, each binary LFSR having a plurality of shift register elements, each shift register element having an input and an output, p scrambling devices, each scrambling device implementing a binary 2-place function and each scrambling device including a first and a second input and an output, wherein the first input of each scrambling device is enabled to receive the signal representing one of p bits of the binary word, the second input of each of the p scrambling devices is connected uniquely to the output of one of the p LFSRs in the plurality of binary LFSRs, and the output of each of the p scrambling devices is connected uniquely to the input of one of the p LFSRs in the plurality of LFSRs, a device that is in a first of the p LFSRs, the device implementing a binary two-place logic function having a first and a second input and an output, wherein the first input of the device in the first LFSR is connected a connection point in a second LFSR in the p LFSRs, the first and second LFSRs being different LFSRs.

In accordance with yet another aspect of the present invention a device is provided, wherein each of the outputs of the p scrambling devices is uniquely connected to the input of one of p LFSRs of which the output is connected to the second input of the one of the p scrambling devices.

In accordance with yet another aspect of the present invention a device is provided, wherein each of the outputs of the p scrambling devices is connected uniquely to the input of one of the p LFSRs in such a way that the output of each of at least two scrambling devices is connected uniquely to an input of the LFSR of which the output is not connected to the second input of the scrambling device.

In accordance with yet another aspect of the present invention a device is provided, wherein each of the outputs of the p scrambling devices is connected uniquely to the input of one of the p LFSRs by a binary logic device that may be a memory or a combinational device implementing a multiplier over $GF(2^p)$.

In accordance with yet another aspect of the present invention a device is provided, wherein the first and the second LFSR are the same LFSR.

In accordance with yet another aspect of the present invention a device is provided, further comprising a descrambler for descrambling the p signals representing the scrambled word of p bits into p signals representing the binary word of p bits.

In accordance with yet another aspect of the present invention a device is provided, wherein the descrambler contains a binary LFSR in Galois configuration and the scrambler is self-synchronizing.

In accordance with yet another aspect of the present invention a device is provided, wherein the descrambler contains a binary LFSR in Galois configuration and the scrambler is not self-synchronizing.

In accordance with yet another aspect of the present invention a device is provided, wherein the device is part of a communication system.

In accordance with yet another aspect of the present invention a device is provided, wherein the device is part of a storage system.

In accordance with yet another aspect of the present invention a device is provided, wherein the descrambler is part of a playing device.

In accordance with one aspect of the present invention presents a novel method and system that implement binary and n-valued with n>2 sequence generators, scramblers, descramblers and detectors in LFSRs and Linear Forward Connected Shift Registers (LFSCRs) in fast Galois configuration.

In accordance with another aspect of the present invention binary and n-valued corresponding scramblers and descramblers in Galois configuration are provided.

In accordance with a further aspect of the present invention binary and n-valued scramblers, descramblers, detectors and generators are provided which apply multi-input switching functions.

In accordance with another aspect of the present invention methods are provided for determining equivalent LFSRs in Galois and Fibonacci configuration.

In accordance with a further aspect of the present invention a method is provided to determine the content of a shift register in Galois configuration.

In accordance with another aspect of the present invention methods, apparatus and a system are provided for detecting a maximum length sequence of binary or n-valued symbols by using LFSRs in Galois configuration.

In accordance with a further aspect of the present invention self synchronizing binary and n-valued descramblers in Galois configuration using a LFSCR are provided.

In accordance with another aspect of the present invention self synchronizing binary and n-valued descramblers in Galois configuration using a LFSCR and corresponding to scramblers with a Galois LFSR and one or more inverters are provided.

In accordance with a further aspect scramblers, descramblers, sequence generators, and detectors with inverters being equivalent to the same without inverters are provided.

In accordance with a further aspect of the present invention systems including communication and data storage systems are provided.

DESCRIPTION OF THE DRAWINGS

FIGS. 74-75 show a diagram of a sequence generator in accordance with an aspect of the present invention;

FIGS. 76-84 show a diagram of a scrambler/descrambler in accordance with yet a further aspect of the present invention;

DETAILED DESCRIPTION OF THE INVENTION

Standard binary LFSR based scramblers, descramblers and sequence generators are generally provided in Fibonacci form. The inventor has shown elsewhere, such as in U.S. Non-Provisional patent application Ser. No. 10/935,960 filed on Sep. 8, 2004 entitled: Ternary and multi-value digital signal scramblers, descramblers and sequence generators, which is incorporated hereby in its entirety by reference, how non-binary scramblers, descramblers and sequence generators can be created in Fibonacci form.

Figure 1:
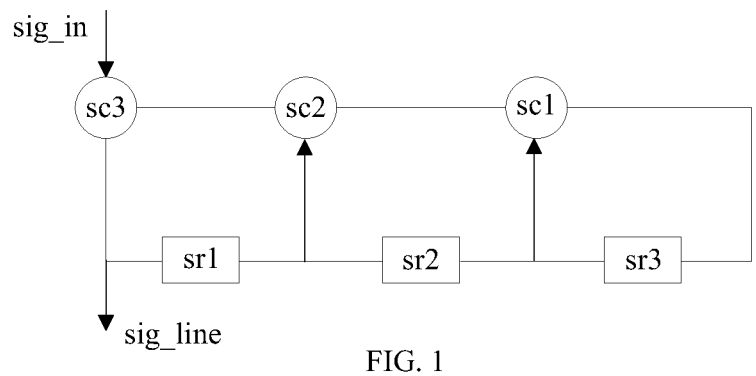
FIG. 1 is a diagram of an n-valued scrambler in Fibonacci configuration.

FIG. 1 shows in diagram an illustrative n-valued LFSR based scrambler. The shift register is comprised of 3 elements [SR1 SR2 SR3] and there are 3 taps. The n-valued feedback logic functions are sc1 and sc2. The functions sc1, sc2 and sc3 are n-valued 2 inputs/single output n-valued reversible logic functions. The n-valued function sc3 combines an incoming signal 'sig_in' with a signal that was fed back by the LFSR. The output of the circuit is 'sig_line'. One can create many different scramblers based on LFSRs with any p-length shift register applying one or p feedback taps and any of the possible n-valued reversible logic functions.

The scrambled signal 'sig_line' can be de-scrambled by the corresponding n-valued LFSR based descrambler. The descrambler is shown in diagram in FIG. 2.

The descrambler is almost a perfect reverse or mirror image of the scrambler around the x-axis, with sc3 becoming ds3 and with an input and output of function sc3 changing position. The rule for the descrambler is that it has an identical number of elements of shift registers, identical number of taps and position of taps. Also the feedback taps are connected to identical reversible n-valued functions as in the scrambler. The only difference is that instead of a reversible n-valued function 'sc3' the descrambler has an n-valued function 'ds3'. The function 'ds3' is the reverse of 'sc3'. So if c=(a sc3 b) then a=(c ds3 b).

Both the scrambler and descrambler work under the control of a clock signal upon which the content of the shift register elements moves one position. The clock signal is assumed but not drawn in the diagrams.

The advantage of the above descrambler is that it is self synchronizing with regard to the content of its shift register. In case of an error in the incoming signal the error will not be propagated, but will be flushed after the error has been shifted out of the shift register. This means that an error will not propagate beyond the length of the shift register.

One can also create a scrambler and descrambler in Galois configuration. In that case the logic function in the tap connects directly two adjacent shift register elements. A scrambler in Galois configuration is shown in a diagram in FIG. 3. Its corresponding descrambler is shown in diagram in FIG. 4.

The advantage of the Galois configuration is that the delay in determining all the signals can be less than in the Fibonacci configuration. One can see for instance in the diagram of FIG. 1 that in the Fibonacci configuration one has to generate intermediate results from function sc1, then from sc2 before one can generate the scrambling result. This can be substantially longer than in the Galois configuration.

While Galois configurations are known, they are usually designed as for instance Galois Field multipliers or dividers. This requires in many cases that the taps have a multiplication function over GF(n) and that the functions sc1 and sc2 for instance are adders over GF(n). The inventor has shown in the cited patent application Ser. No. 10/935,960 that one can combine an n-valued logic function with an inverter in one or both inputs into a single n-valued logic function. The inventor has also shown in U.S. patent application Ser. No. 11/679,316 filed on February 27, entitled METHODS AND APPARATUS IN FINITE FIELD POLYNOMIAL IMPLEMENTATIONS which is incorporated hereby in its entirety by reference, how Galois type scrambling and descrambling solutions can be created that apply no multipliers in their taps.

Figure 2:
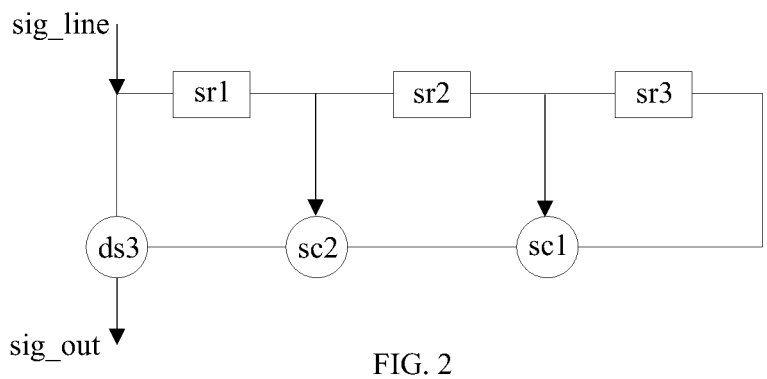
FIG. 2 is a diagram of an n-valued descrambler in Fibonacci configuration.
Figure 3:
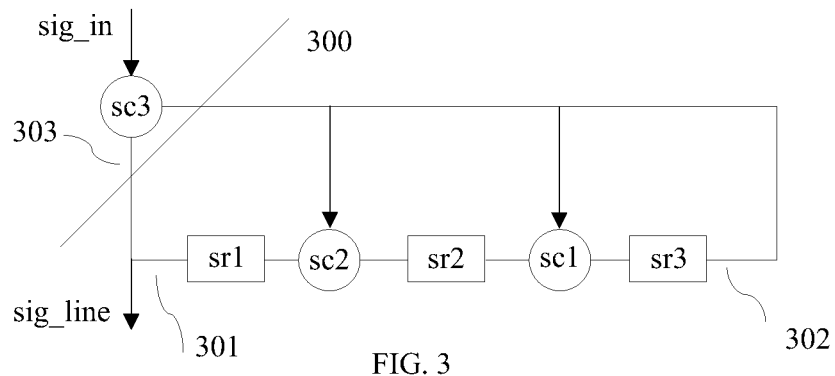
FIG. 3 is a diagram of an n-valued scrambler in Galois configuration.

While the scrambler of FIG. 1 and FIG. 3 look similar, with just the functions in different places, their results in scrambling usually are different, even when the initial state of the shift registers of FIG. 1 and FIG. 3 are identical. The descrambler of FIG. 4 descrambles correctly the sequence generated by the scrambler of FIG. 3. Accordingly the descramblers of FIG. 2 and FIG. 4 will in general be different. The descrambler of FIG. 4 unfortunately is not self synchronizing as the shift register will not be flushed over time. An error in the received signal will thus be perpetuated.

If one expects errors during transmission or processing of the scrambled signals one should use a self-synchronizing descrambler. One may reduce the delay time of descramblers in Fibonacci configuration by using multi-input adders over GF(n). It was shown in the cited patent application Ser. No. 11/679,316 that one can create a multi-input adder with multipliers over GF(n) at the inputs from a limited set of n-valued inverters and n-valued switches which are in series and can be switched simultaneously.

Figure 5:
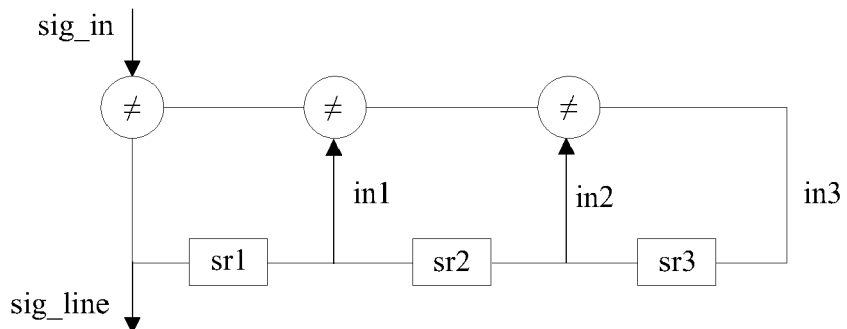
FIG. 5 is a diagram of a binary scrambler in Fibonacci configuration.
Figure 6:
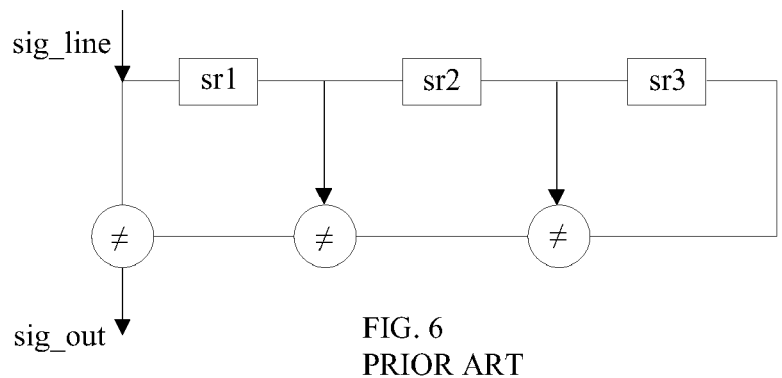
FIG. 6 is a diagram of a binary descrambler in Fibonacci configuration.
Figure 7:
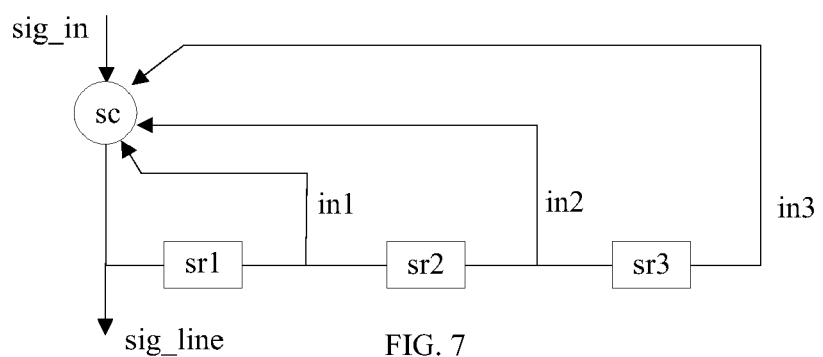
FIG. 7 is a diagram of a scrambler with a multi-input function.
Figure 8:
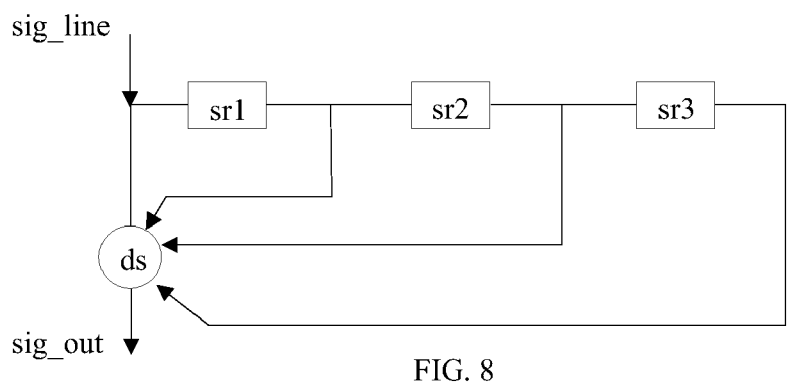
FIG. 8 is a diagram of a descrambler with a multi-input function.

The diagram of FIG. 5 and FIG. 6 show a known binary scrambler and descrambler. FIG. 7 and FIG. 8 show how the individual XOR function may be combined into a single multi-input function sc with a truth table of sub tables and into a single multi-input function ds for the descrambler. It is believed to be a novel approach to implement sc and ds with inverters and switches.

It may be difficult to visualize the truth table of sc and ds. The truth table is in fact an array sc(sig_in, in1, in2, in3). One may show sc along different dimensions. Because in general an n-valued truth table is shown as a 2-dimensional matrix, the truth table will be shown as a series of two dimensional sub-tables in the following tables:

| (0, 0) | 0 | 1 | (1, 0) | 0 | 1 | (0, 1) | 0 | 1 | (1, 1) | 0 | 1 |
|---|---|---|---|---|---|---|---|---|---|---|---|
| 0 | 0 | 1 |   | 1 | 0 |   | 1 | 0 |   | 0 | 1 |
| 1 | 1 | 0 |   | 0 | 1 |   | 0 | 1 |   | 1 | 0 |

Figure 9:
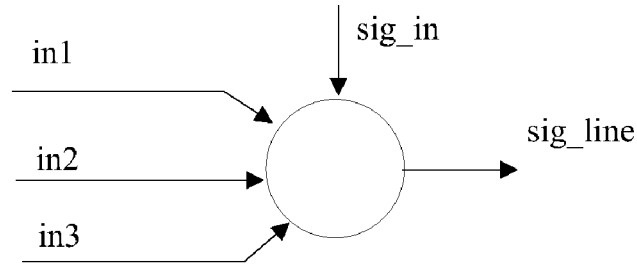
FIG. 9 is a diagram of a multi-input switching function in accordance with an aspect of the present invention.

This truth table implements the multi-input binary logic function of FIG. 9.

Figure 10:
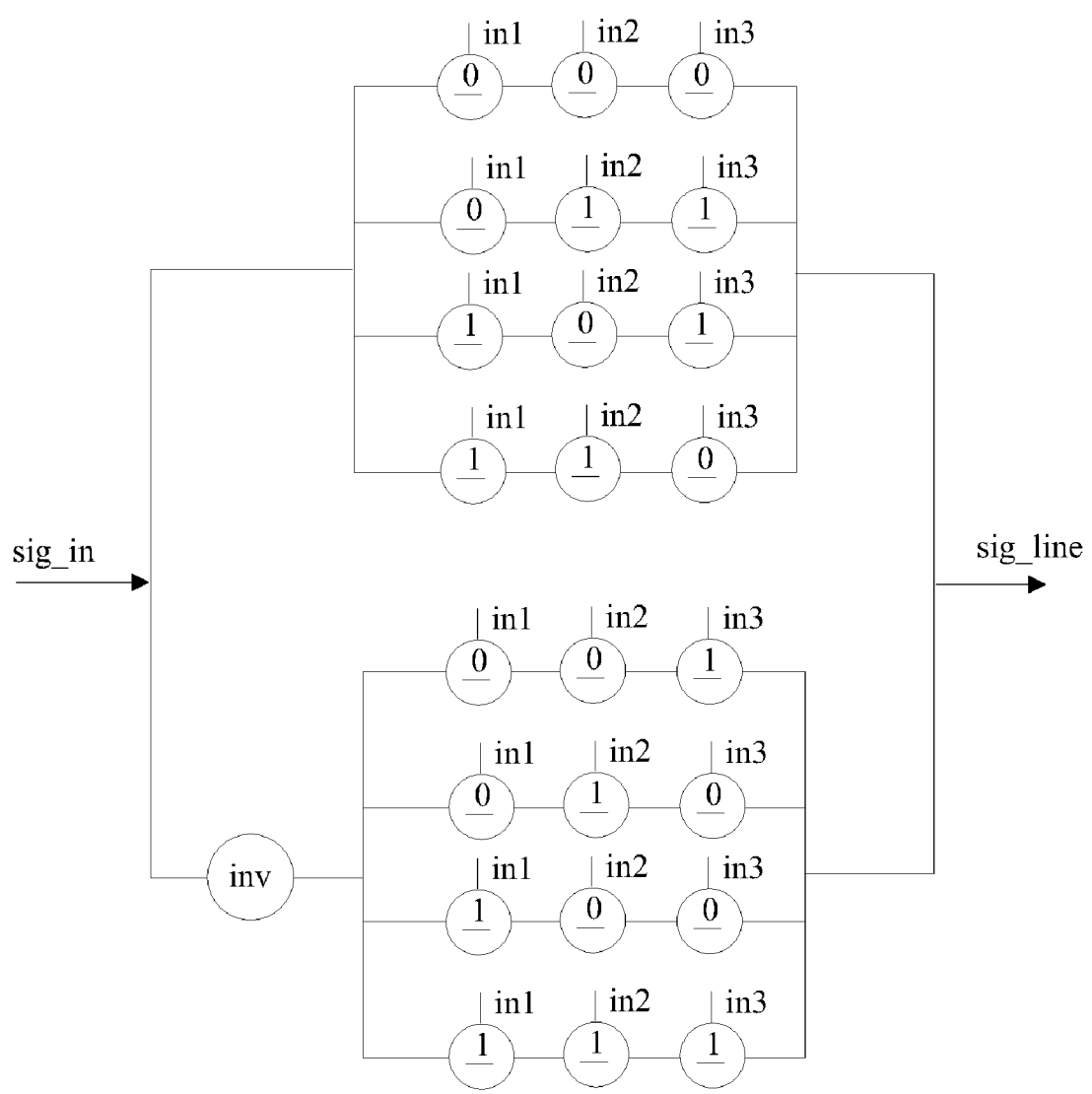
FIG. 10 is an implementation of a multi-input function in accordance with an aspect of the present invention.

An implementation of the function sc of FIG. 9 by way of individually controlled gates and inverters is shown in FIG. 10. The inventor has shown in U.S. patent application Ser. No. 11/000,218 filed on Nov. 30, 2004 entitled SINGLE AND COMPOSITE BINARY AND MULTI-VALUED LOGIC FUNCTIONS FROM GATES AND INVERTERS, which is incorporated herein by reference in its entirety, how one can realize any truth table from individually controlled switches and inverters, including binary and non-binary truth tables.

The approach herein is that a row or a column is implemented by an inverter. One way to visualize such an implementation is to assume that the signals are optical in nature able to assume 2 or more states and are passed by a switch or are blocked. Herein absence of signal is also a state.

A column or row [0 1] in the truth table of sc is identity or a plain conductor. A column or row [1 0] is an inverter 'inv'. Assume that [0 1] and [1 0] are 'seen' by signal 'sig_in' depending on a state of 'in1', 'in2' and 'in3'. Accordingly the implementation only requires one conductor and one inverter and a number of gates activated by signals 'in1', 'in2' and 'in3' acting upon 'sig_in' to generate the correct state of 'sig_line'. The truth table of FIG. 9 can then be realized by an implementation as shown in FIG. 10. Because all gates switch simultaneously there should be minimal delay.

The same approach can be applied to a non-binary adder used in a scrambler or descrambler. One can start out designing such a multi-input scrambler configuration with the configuration in FIG. 3 wherein all functions are n-valued. Herein the functions sc3 is assumed to be an adder over GF(4) for simplicity reasons. However if sc3 is not an adder one may expand sc3 into an adder with inverters at the input. The functions sc2 and sc1 are also expanded into adders and multipliers over GF(4).

Figure 11:
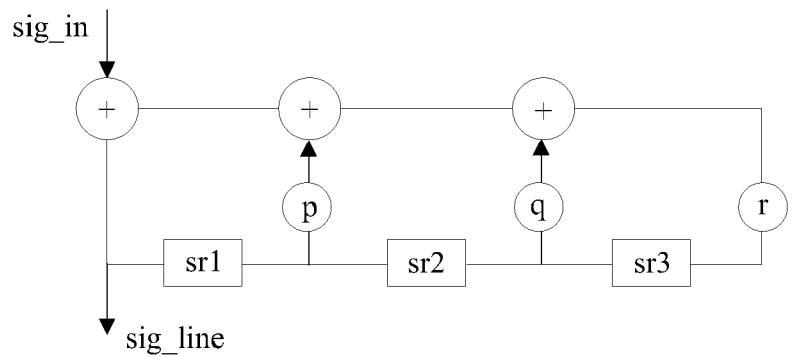
FIG. 11 is a diagram of a scrambler in Fibonacci configuration.
Figure 12:
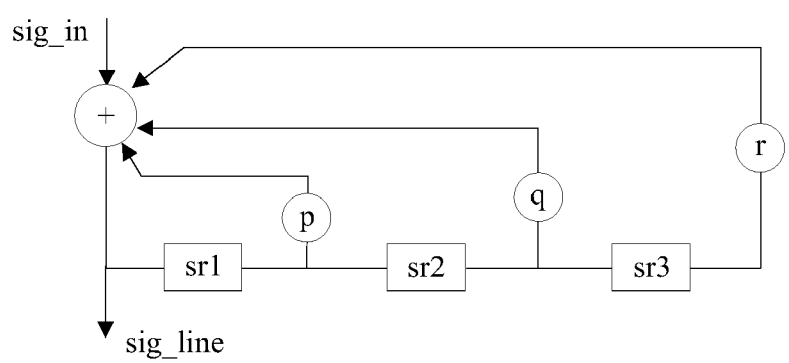
FIG. 12 is another diagram of a scrambler in Fibonacci configuration.
Figure 13:
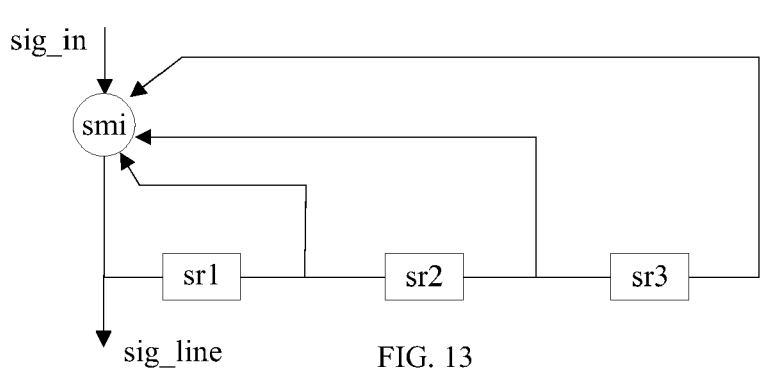
FIG. 13 is yet another diagram of a scrambler in Fibonacci configuration.

Assume to start out with the 4-valued scrambler of FIG. 11. Because the adder is associative one can reduce the configuration to the implementation as shown in FIG. 12. And in a next step one can reduce the multi-input 4-valued adder over GF(4) with multipliers at the input to the configuration of FIG. 13 having no multipliers and a 4-valued multi-input function 'smi'.

Figure 14:
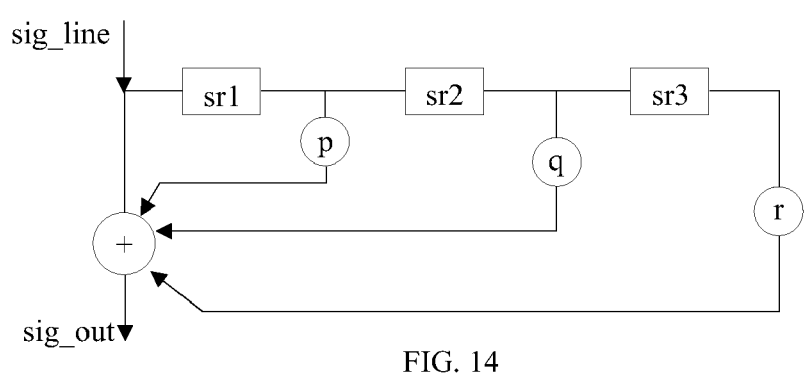
FIG. 14 is a diagram of a descrambler in Fibonacci configuration.

One may use this approach also for the descrambler. Accordingly an n-valued descrambler in Fibonacci configuration as shown in FIG. 14 with an adder over GF(4) in the present example and with multipliers p, q, and r over GF(4) can be reduced to a descrambler with a single multi-input function 'dmi' as shown in FIG. 15.

In a next section the rules for creating matching sets of n-valued scramblers in Galois configuration with n-valued descramblers in Fibonacci configuration will be provided. This allows one to create a fast scrambler with a matching descrambler. The here provided method of implementing multi-input n-valued functions also allows to create fast Fibonacci descramblers, which are self-synchronizing.

Figure 15:
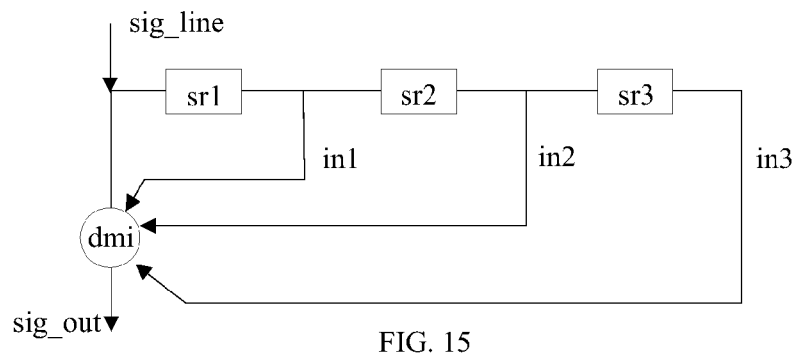
FIG. 15 is another diagram of a descrambler in Fibonacci configuration.
Figure 16:
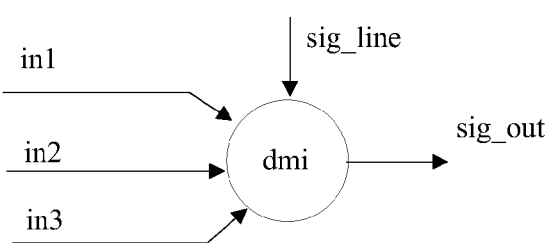
FIG. 16 is a diagram of a multi-input switching function.

Using the descrambler of FIG. 15 wherein in 1 is the signal from shifts register element sr1, in2 is the signal from shifts register element sr2 and in3 is the signal from shifts register element sr3. Further more 'sig_line' is the signal received by the descrambler and 'sig_out' is the signal generated by the descrambler. The multi-input function 'dmi' consolidating the different functions with its inputs and output is shown in FIG. 16.

Assume the multipliers to be p=3, q=2 and r=3 over GF(4) as an illustrative example. A basic 2-input addition and a multiplication truth table over GF(4) are provided in the following tables.

| + | 0 | 1 | 2 | 3 | × | 0 | 1 | 2 | 3 |
|---|---|---|---|---|---|---|---|---|---|
| 0 | 0 | 1 | 2 | 3 | 0 | 0 | 0 | 0 | 0 |
| 1 | 1 | 0 | 3 | 2 | 1 | 0 | 1 | 2 | 3 |
| 2 | 2 | 3 | 0 | 1 | 2 | 0 | 2 | 3 | 1 |
| 3 | 3 | 2 | 1 | 0 | 3 | 0 | 3 | 1 | 2 |

Accordingly a multiplier 2 is the 4-valued inverter [0 2 3 1] and multiplier 3 is the inverter [0 3 1 2]. The truth table of the 4-input 4-valued function has 4×4 or 16 truth sub-tables (with every additional input the number of sub tables is multiplied by n=4 in this case). Each sub table has the same columns (or rows) as in the original addition table which will be modified according to the multipliers. So in this case the 4 columns (or inverters) are [0 1 2 3] which is identity; [1 0 3 2]; [2 3 0 1] and [3 2 1 0]. As in the binary case one can implement the complete truth table of the function 'dsi' by using the 4 inverters, with signal 'sig_line' as input, and enabling the appropriate inverter by a set of individually controlled gates, which are controlled by the signals 'in1', 'in2' and 'in3'. All the signals are available at the same time and each gate can be enabled at the same time.

Sequence Generators in Galois Configuration

It is possible to create multi-valued sequences with feedback shift registers in Galois configuration. An example will first be provided of a ternary PN generator in Galois configuration. The shift register is comprised of 5 elements and a ternary logic function sc1 will be used between element 4 and 5 of the shift register. The truth table of sc1 is provided in the following table.

| sc1 | 0 | 1 | 2 |
|---|---|---|---|
| 0 | 0 | 1 | 2 |
| 1 | 2 | 0 | 1 |
| 2 | 1 | 2 | 0 |

Figure 17:
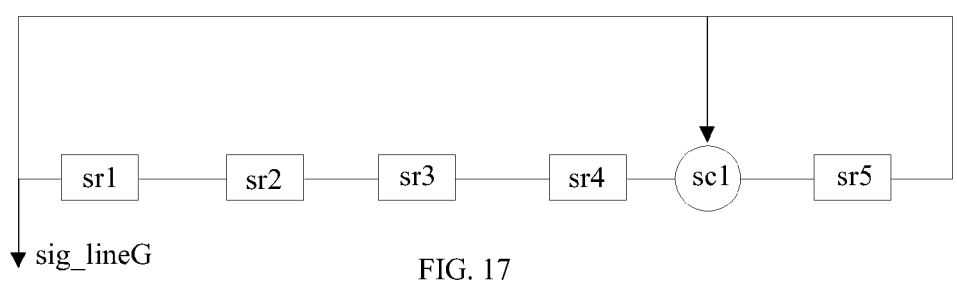
FIG. 17 is a diagram of a sequence generator in Galois configuration.

The initial content of the shift register is [1 0 2 1 0]. The diagram in FIG. 17 provides the used Galois configuration. (As before a clock signal is assumed but not shown). This sequence generator will create a ternary pseudo-random sequence of length 242 symbols and its auto-correlation graph is a bi-level graph with a single peak. The top input of sc1 determines the column and the input to sc1 from shift register element sr4 determines the row of the truth table.

Figure 19:
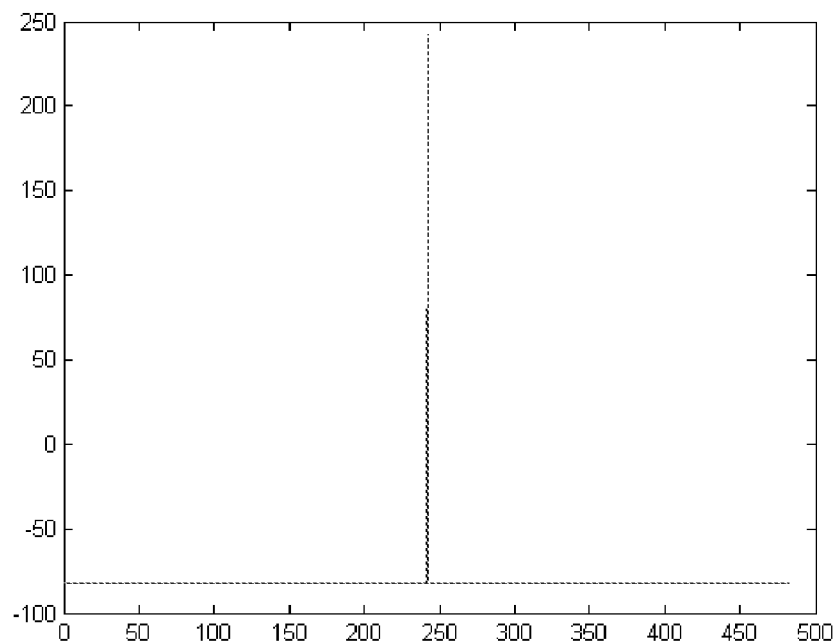
FIG. 19 is a correlation graph.

FIG. 19 shows an auto-correlation graph of the sequence generated by this configuration.

Figure 18:
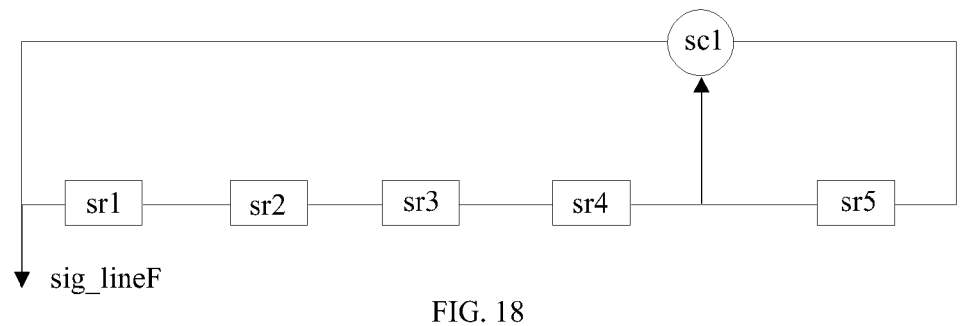
FIG. 18 is a diagram of a sequence generator in Fibonacci configuration.
Figure 20:
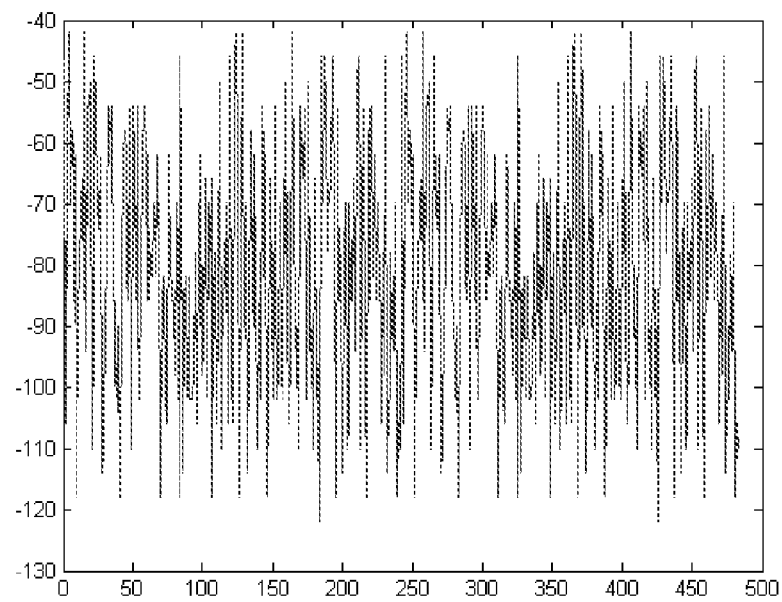
FIG. 20 is a cross-correlation graph.

One can also create a sequence generator in Fibonacci configuration from these components and the same ternary logic function. This is shown in the diagram of FIG. 18. This configuration will also generate a ternary PN-sequence of length 242. Also the order of the inputs to the function sc1 is switched. The generated sequence here is different from the sequence generated in the Galois configuration. The graph in FIG. 19 shows an auto-correlation of the sequence generated by the Galois configuration and by the Fibonacci configuration. FIG. 20 shows a cross-correlation graph of the two sequences generated by the generators of FIG. 17 and FIG. 18 which demonstrates that the two sequences are not shifted versions of each other.

Thus it should be clear that one can use the Galois configuration as a method to create PN sequences. The method also works for other values of n and for configurations with more than 1 tap and different n-valued functions.

Comparing Fibonacci and Galois Sequence Generators

In this section 4-valued and 3-valued sequence generators in Galois and in Fibonacci configuration will be demonstrated.

Figure 21:
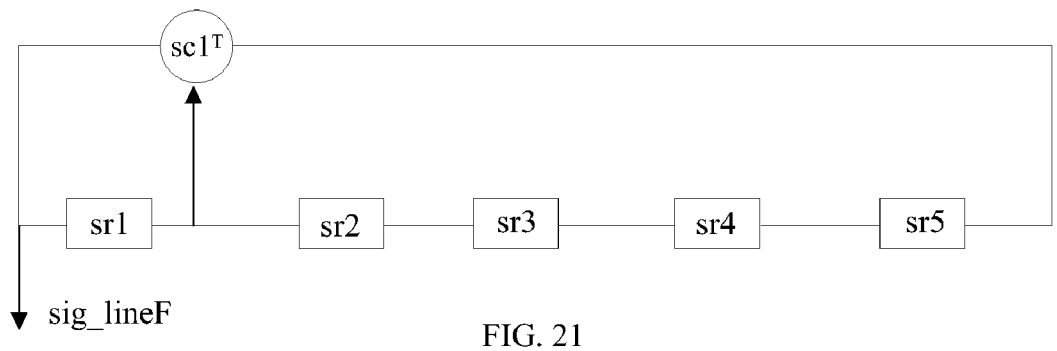
FIG. 21 is a diagram of a sequence generator in Fibonacci configuration in accordance with an aspect of the present invention

As a first example a 3-valued sequence generator in Fibonacci configuration as shown in FIG. 21 will be used. One can see that this generator, like the generator in Galois configuration in FIG. 17 has only one 3-valued function. However instead 3-valued function sc1 at a tap after shift register element sr4 it has a function $sc1^T$ (which is the transposed version of sc1) at the tap after shift register element 1. The truth table of sc1$^T$ is shown in the following table.

| sc1$^T$ | 0 | 1 | 2 |
|---|---|---|---|
| 0 | 0 | 2 | 1 |
| 1 | 1 | 0 | 2 |
| 2 | 2 | 1 | 0 |

Figure 22:
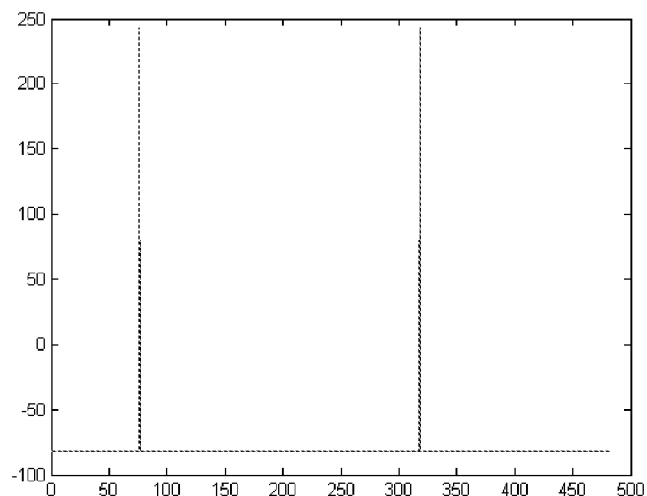
FIG. 22 is a cross-correlation graph.

This generator will generate a maximum length pn sequence. The generator of FIG. 17 will also generate a maximum pn sequence. A cross correlation graph of the pn sequences of 242 symbols generated by each generator using the same initial shift register is shown in FIG. 22. One can see that the graph has two peaks, not centered. This means that the two sequences are shifted maximum length sequences. By using different initial content of the shift register one is able to generate two identical sequences from the Galois and the Fibonacci configuration.

Basically this provides the rule for finding equivalent Fibonacci and Galois configurations for sequence generators. The example shows that one should carefully watch the order of inputs of n-valued functions if a function is non-commutative. Switching a set of inputs will make the configurations non-matching. Another issue to watch carefully is to make sure to select a generator that will generate either a maximum length sequence or sequences that have the same repetitive performance. In most cases, it turns out there will be no matching pairs of configurations. However a maximum length sequence can only repeat over (n↑p−1) in an n-valued LFSR with p shift register elements. So each maximum length pn sequence can be generated by a particular generator, be it in Galois or Fibonacci configuration. Further more a Galois configuration cannot create more pn sequences than a Fibonacci configuration with the same number of shift register elements. Consequently there is at least one Galois and Fibonacci configuration for each maximum length sequence.

It is also possible to find matching pairs in Fibonacci and Galois configuration for some (but not all) sequences not being a maximum length sequence. However such pairs do not have to be unique, in the sense that a Galois configuration may have several matching Fibonacci configurations.

Figure 23:
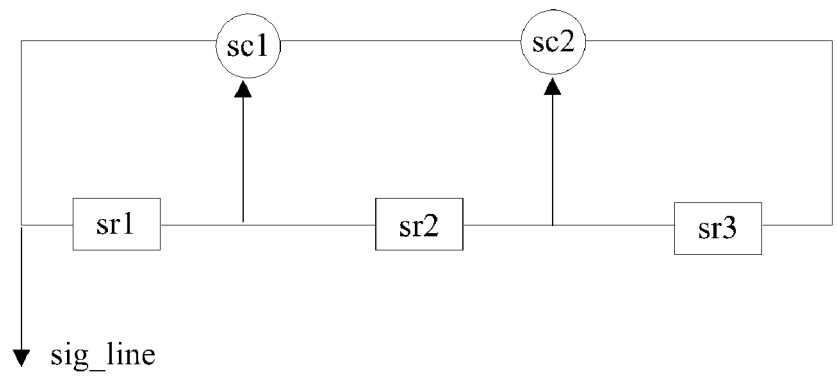
FIG. 23 is a diagram of a sequence generator in Fibonacci configuration.

The diagram of FIG. 23 shows a Fibonacci configuration of an n-valued sequence generator. Assume that the circuit is 4-valued. The truth tables of sc1 and sc2 are provided in the following tables.

| sc1 | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

| sc2 | 0 | 1 | 2 | 3 |
|---|---|---|---|---|
| 0 | 0 | 2 | 3 | 1 |
| 1 | 1 | 3 | 2 | 0 |
| 2 | 2 | 0 | 1 | 3 |
| 3 | 3 | 1 | 0 | 2 |

Function sc1 is commutative and sc2 is non-commutative. Assume that the initial state of the shift register [sr1 sr2 sr3] is [1 0 3]. This particular sequence generator will generate a maximum length 4-valued pn sequence of 63 symbols seq41.
seq41=[0 1 3 2 3 0 0 1 1 0 3 1 2 2 2 3 2 2 1 0 2 0 2 1 3 1 0 0 2 2 0 1 2 3 3 3 1 3 3 2 0 3 0 3 2 1 2 0 0 3 3 0 2 3 1 1 1 2 1 1 3 0 1].

The diagram in FIG. 23 shows the equivalent 4-valued sequence generator in Galois configuration of the generator in FIG. 22. One should apply 'flipping' or 'mirroring' the taps and functions in the Fibonacci configuration to create the Galois configuration and vice versa. One has also to mirror the position of the taps to complete the equivalent transformation. Assume that there are p shift register elements both in Fibonacci and in the Galois configurations. In order to change the Fibonacci configuration into an equivalent Galois configuration, remembering that this rule in general only applies to maximum length sequence generators, one has to perform the following steps.

1. Determine the position of a tap in the Fibonacci configuration. Assume a tap is in the position k of (p−1) possible positions (this is 1 less than the number of elements, as a tap is always between two elements) wherein k is the number of elements between the tap and the input of the first element.

2. Determine the truth table of the function connected to a tap.

3. Determine the mirror position of the Fibonacci tap in the Galois configuration.

This is then k elements from the output of the last tap of the shift register in the Galois configuration.

4. Determine the transposed (columns and rows exchanged so that the first row becomes the first column etc.) versions of the truth tables of the logic functions at the taps and put the transposed functions in their mirror position.

This is a rule that cannot be extrapolated from binary configurations. Clearly the binary case has no non-commutative reversible functions and thus cannot apply this rule.

Application of this rule to the example will then create the following functions and their truth tables.

| sc2$^T$ | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

The function sc2 is commutative. Consequently the function sc2 will have the same truth table as sc2.

| sc1$^T$ | 0 | 1 | 2 | 3 |
|---|---|---|---|---|
| 0 | 0 | 1 | 2 | 3 |
| 1 | 2 | 3 | 0 | 1 |
| 2 | 3 | 2 | 1 | 0 |
| 3 | 1 | 0 | 3 | 2 |

The initial state of the shift register [sr1 sr2 sr3] is [1 0 3]. The Galois sequence generator will create a sequence seq42.
seq42=[3 3 2 0 3 0 3 2 1 2 0 0 3 3 0 2 3 1 1 1 2 1 1 3 0 1 0 1 3 2 3 0 0 1 1 0 3 1 2 2 2 3 2 2 1 0 2 0 2 1 3 1 0 0 2 2 0 1 2 3 3 3 1]. Sequences seq41 and seq42 are shifted versions of each other.

Figure 24:
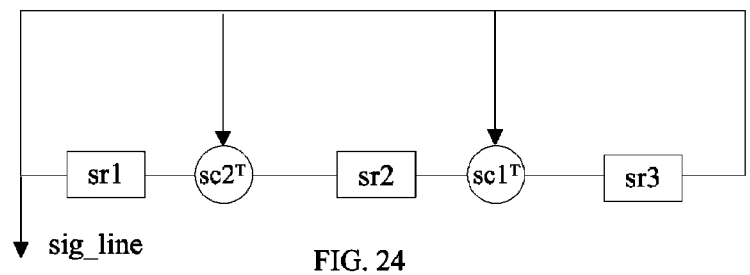
FIG. 24 is a diagram of a sequence generator in Galois configuration in accordance with an aspect of the present invention.

The Galois configuration of FIG. 24 will generate exactly the same sequence as the Fibonacci configuration of FIG. 23 when the initial state of its shift register is [1 1 0]. In order to generate an identical sequence when the conditions of tap positions and functions have been met the initial content of the shift register in the Galois configuration needs to be 1 higher than the one in the Fibonacci configuration in this example.

A 3-Valued Example

To show that the transformation from Fibonacci to Galois (or Galois to Fibonacci) works in general, another sequence generator will be in 3-valued example with a shift register of 6 elements and 3 different functions.

Figure 25:
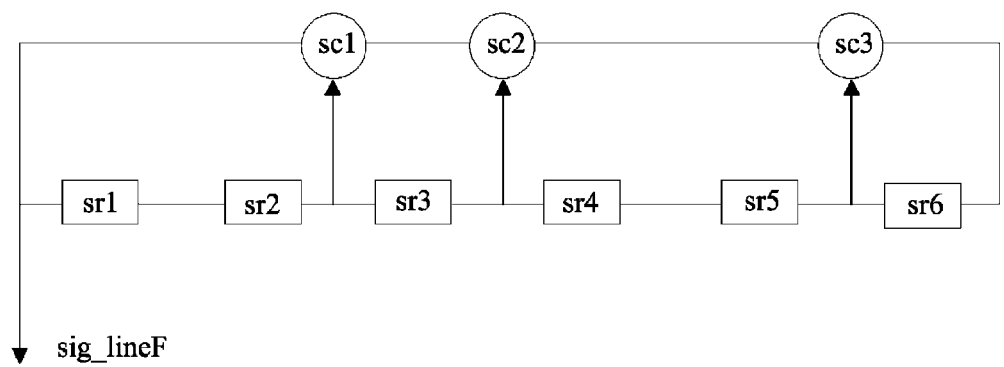
FIG. 25 is a diagram of a sequence generator in Fibonacci configuration.
Figure 26:
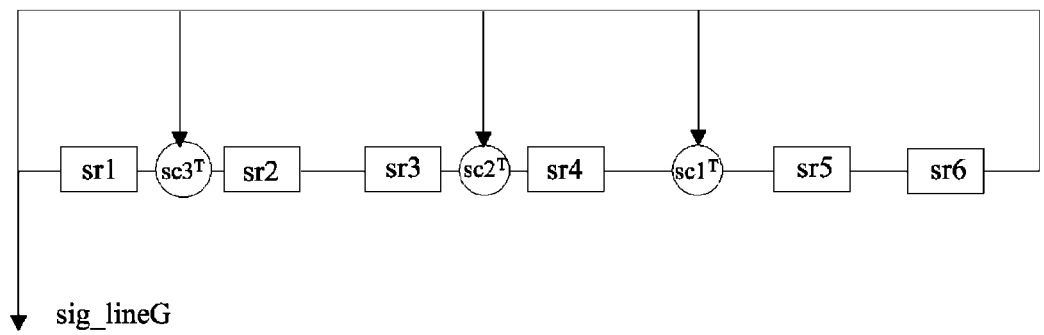
FIG. 26 is a diagram of a sequence generator in Galois configuration in accordance with an aspect of the present invention.

The example will start with the Fibonacci configuration in FIG. 25 having three functions (sc1, sc2 and sc3) and 6 shift register elements and transform to Galois (though to one skilled in the art it should be apparent that one can also start with Galois and transform to Fibonacci) in FIG. 26.

The truth tables of the ternary functions sc1, sc2 and sc3 are shown in the following tables.

| sc1 | 0 | 1 | 2 |
|---|---|---|---|
| 0 | 2 | 1 | 0 |
| 1 | 1 | 0 | 2 |
| 2 | 0 | 2 | 1 |

| sc2 | 0 | 1 | 2 |
|---|---|---|---|
| 0 | 0 | 2 | 1 |
| 1 | 1 | 0 | 2 |
| 2 | 2 | 1 | 0 |

| sc3 | 0 | 1 | 2 |
|---|---|---|---|
| 0 | 0 | 1 | 2 |
| 1 | 1 | 2 | 0 |
| 2 | 2 | 0 | 1 |

The sequence generator as shown in FIG. 25 will create a maximum-length 3-valued pseudo-noise sequence of 728 symbols with a 2-level auto-correlation. Assume that the initial content of the shift register is [1 0 0 2 0 1]. The equivalent Galois sequence generator (applying the mirroring-rules) is provided in FIG. 26. Of the 3-valued switching functions sc1, sc2 and sc3; sc1 and sc3 are commutative and sc2 is non-commutative. This means that $sc1=sc1^T$ and $sc3=sc3^T$. The truth table of $sc2^T$ is provided in the following table.

| $sc2^T$ | 0 | 1 | 2 |
|---|---|---|---|
| 0 | 0 | 1 | 2 |
| 1 | 2 | 0 | 1 |
| 2 | 1 | 2 | 0 |

The sequence generator of FIG. 26 will create a shifted equivalent pn-sequence of the Fibonacci generator when both start with initial content [1 0 0 2 0 1]. The 6-element/3 function Galois generator will create exactly the same sequence as the Fibonacci one if the initial content of the Galois shift register is [1 1 0 2 0 0].

The Binary Case

The same equivalence transformation between Fibonacci and Galois configurations can be applied to other shift register/tap/function configurations as well for any n-valued sequence generator of maximum length sequences, including the binary one. One may for instance use the sequence generator as shown in the ternary logic form in FIGS. 25 and 26 and replace all elements by binary elements (functions and shift register). In general one uses the binary XOR function as binary logic function in this type of circuits. The transposition of the truth table of the XOR is of course again a XOR. So the transformation from Fibonacci to Galois when only XOR functions are used, only require exchange of the position of the functions. If the initial shift register content is [1 0 0 1 0 1] in the Fibonacci case then its Galois configuration will generate exactly the same sequence (in-phase) when the initial shift register content is [1 1 0 0 0 1].

Things can be come a little more complicated if one mixes XOR and EQUAL functions in a single realization. Though of course the transposition of an EQUAL function is again an EQUAL function, the transformation rule requires that the order changes. So if in the Fibonacci configuration sc1=XOR, sc2=XOR and sc3=EQUAL, then in the Galois configuration $sc3^T$=EQUAL, $sc2^T$=XOR and $sc1^T$=XOR.

Accordingly it is possible for any Fibonacci configuration of any n-valued sequence generator of maximum length sequences, wherein all functions are reversible, to create a Galois configuration that will generate exactly the same (in-phase) sequence and vice-versa.

Detecting Sequences

The inventor has shown earlier how a type of descrambler can be used to detect sequences that are created by Fibonacci generators. See for instance US Patent Application Publication no. 20050184888 filed on Feb. 25, 2005 entitled: GENERATION AND DETECTION OF NON-BINARY DIGITAL SEQUENCES, which is incorporated herein in its entirety. In this section it will be shown how shift register circuits can be applied to detect sequences generated by shift register circuits, also when these circuits or methods are in Galois configuration.

Figure 27:
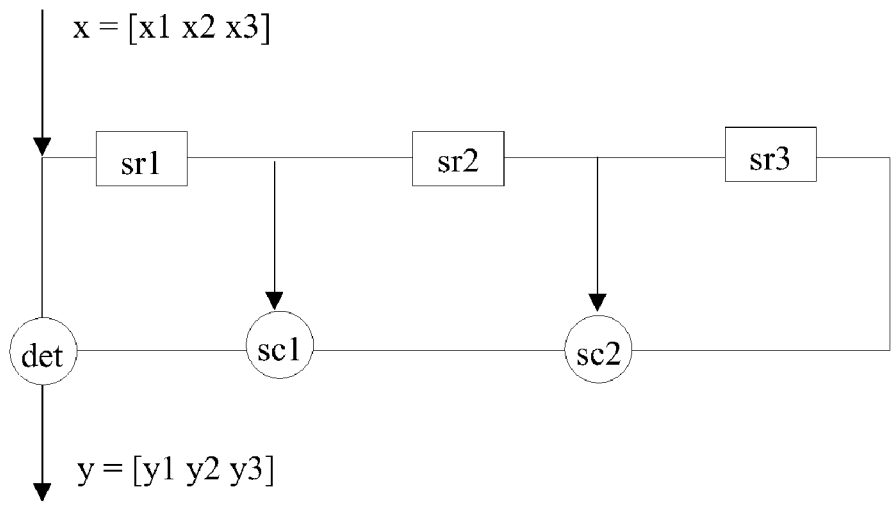
FIG. 27 is a diagram of a sequence detector in Fibonacci configuration.

As an illustrative example assume that a sequence is generated by the method or circuit as shown in the diagram of FIG. 23. The sequence generated by that generator can be detected by the descrambler type solution as shown in FIG. 27.

One can make different choices for the function 'det'. The only restriction to 'det' for detection purposes is that the diagonal of its truth table has identical values or states. The reason for that is that if the input signal 'x' is generated by the sequence generator that corresponds with the detector configuration; and the content of the shift register is correct; then both inputs to 'det' will provide identical signals. For instance assume that correct detection means that the output signal 'y' is all 0s. Then the diagonal of the truth table of 'det' should be all 0.

The advantage of the shown Fibonacci configuration is that if the content of the shift register is not correct even if the input signal 'x' is a correct sequence, then at most only 3 symbols can be detected wrongly. That is because the shift register will be flushed.

Assume that one would like to determine at the occurrence of the signal 'x' if the correct sequence is present. The way to do this is at every clock pulse to assume that the correct signal is present and can be detected. On that assumption one can then determine the content of the shift register that would correspond with correct detection. Next, one should make the calculated shift register content the actual shift register and run the detector. If not a correct 'sequence detect' signal (0s in our illustrative example) is generated after more than 3 pulses then at the next input signal one should recalculate the correct content.

This method applies the following reasoning.
a. assume that the next 3 consecutive input symbols [x1 x2 x3] are part of the correct to be detected sequence;
b. the output y=[y1 y2 y3] as a result of the input should be [0 0 0];
c. the initial content of the shift register is [s1 s2 s3] when the input signal is x1.

This will give the following equations:

$$x1=\{s3sc2s2\}sc1s1$$

$$x2=\{s2sc2s1\}sc1x1$$

$$x3=\{s1sc2x1\}sc1x2$$

With solutions:

$$s1=\{x3sc1^{-1}x2\}sc2^{-1}x1$$

$$s2=\{x2sc1^{-1}x1\}sc2^{-1}s1$$

$$s3=\{x1sc1^{-1}s1\}sc2^{-1}s2$$

The use of inverse function in these expressions may be confusing. As the functions may be non-commutative in general (a sc1 b)≠(b sc1 a). So in solving these equations one should carefully check if one applies the correct inverse function. The order of inputs is selected in such a way that an input from one side of a function determines the row input and an input from the top determines the column in a truth table. It is assumed in general that in (a sc1 b) input 'a' determines the row and 'b' determines the column in the truth table.

This novel method as an aspect of the present invention allows calculating the correct shift register content at any time assuming that the correct sequence is being received. This method can be used for any length shift register and for any n-valued logic (including binary) as all functions at the taps have to be reversible. This method may not be extremely urgent in Fibonacci configurations (because of shift register flushing) however it is very useful in Galois configurations. This is because in some Galois configurations error propagation in the shift register will occur. Calculating the correct shift register content after an error has occurred may stop error propagation.

Figure 28:
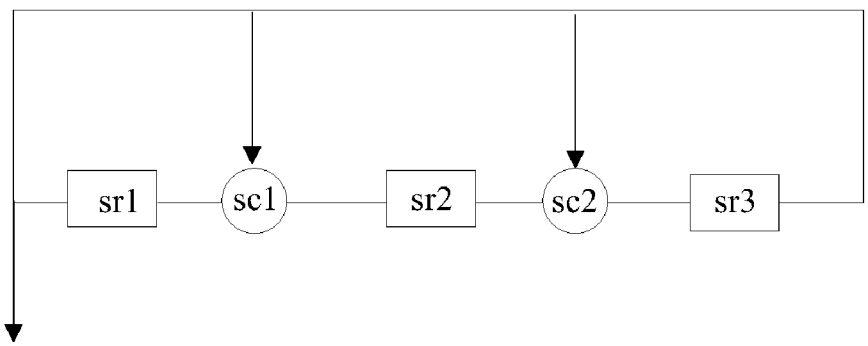
FIG. 28 is a diagram of a sequence generator in Galois configuration.
Figure 29:
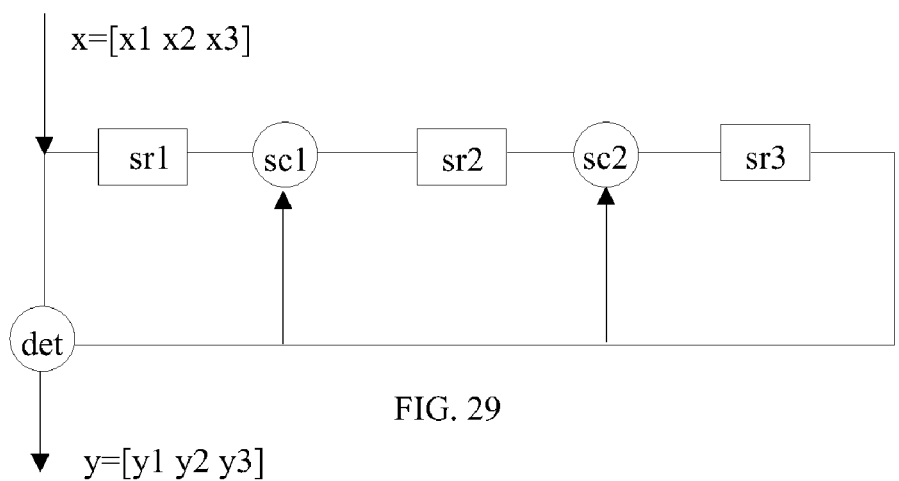
FIG. 29 is a diagram of a sequence detector in Galois configuration in accordance with an aspect of the present invention.

As an illustrative example the Galois sequence generator shown in the diagram of FIG. 28 will be used. A detector for the sequence created with this generator is shown in the diagram of FIG. 29.

Assuming that the correct sequence is at the input one can create the following equations.

$$x1=s3$$

$$x2=(s2sc2s3)$$

$$x3=\{s1sc1s3\}sc2\{s2sc2s3\}=\{s1sc1s3\}sc2x2$$

This leads to the following states of the shift register:

$$s3=x1$$

$$s2=(x2sc2^{-1}x1)$$

$$s1=\{(x3sc2^{-1}x2)sc1^{-1}x1\}$$

Assume that one uses the (in this case 3-valued) functions with the following truth tables.

| sc1 | 0 | 1 | 2 |
|---|---|---|---|
| 0 | 0 | 1 | 2 |
| 1 | 1 | 2 | 0 |
| 2 | 2 | 0 | 1 |

| sc2 | 0 | 1 | 2 |
|---|---|---|---|
| 0 | 0 | 1 | 2 |
| 1 | 2 | 0 | 1 |
| 2 | 1 | 2 | 0 |

| det | 0 | 1 | 2 |
|---|---|---|---|
| 0 | 0 | 1 | 2 |
| 1 | 2 | 0 | 1 |
| 2 | 1 | 2 | 0 |

The sequence generated with initial register state [1 0 2] is the pn-sequence seq3_26=[2 2 2 1 0 0 2 2 0 2 0 1 2 1 1 1 2 0 0 1 1 0 1 0 2 1].

Inputting this sequence to the detecting circuit with initial shift register state [1 0 2] will generate res=[0 0 0 0 0 0 0 0 0 0 0 0 0 0 0 0 0 0 0 0 0 0 0 0 0 0]. One can demonstrate the effect of error propagation in Galois type detectors by changing the initial content of the shift register of the detector to for instance [1 0 0]. The result at the output of the detector is then: res_er=[2 2 0 1 1 0 2 2 0 1 1 0 2 2 0 1 1 0 2 2 0 1 1 0 2 2]. Clearly one would conclude on this basis that an incorrect sequence was received.

In order to start or restart the Galois detector at any time one would need to make sure that the correct content is in the shift register. The first way to do that is to use the formulations that calculate the correct content assuming that the correct sequence without errors is available at the input of the detector. Applying the already determined expressions:

$$s3=x1$$

$$s2=(x2sc2^{-1}x1)$$

$$s1=\{(x3sc2^{-1}x2)sc1^{-1}x1\}$$

The truth tables of the inverse functions are provided in the following tables.

| sc1⁻¹ | 0 | 1 | 2 |
|---|---|---|---|
| 0 | 0 | 2 | 1 |
| 1 | 1 | 0 | 2 |
| 2 | 2 | 1 | 0 |

| sc2⁻¹ | 0 | 1 | 2 |
|---|---|---|---|
| 0 | 0 | 1 | 2 |
| 1 | 2 | 0 | 1 |
| 2 | 1 | 2 | 0 |

One can determine the initial state when the first three elements of the sequence are [2 2 2]. Inserting the values of the symbols in the equations will generate: s3=2

$$s2 = (2sc2^{-1}2) = 0$$

$$s1 = \{(2sc2^{-1}2)sc1^{-1}2\} = \{0sc1^{-1}2\} = 1$$

This means that the initial content should be [1 0 2].

One can apply the same approach for instance by starting at symbol 4 of the sequence and registering the first 3 symbols as of symbol 4. That means [x1 x2 x3]=[1 0 0]. This requires for correct decoding that the setting of the shift register is [2 1 1] by applying the above equations.

This method can be extended to any n-valued sequence generator including the binary one. Clearly long shift registers with relatively many taps will create more complex expressions. However the method will still work. The equations become easier to solve if one applies adders and multipliers over GF($2^p$) with p>1. Adders will be commutative, self-reversing and associative.

The method works as well for the binary case, especially because the XOR and EQUAL functions are commutative and associative and self-reversing. These aspects make the solving equations easier to be determined. They apply in general to LFSRs having adders over GF($2^p$) with p≧1 wherein p=1 is of course the binary case. An illustrative 4-valued example will be provided.

Figure 30:
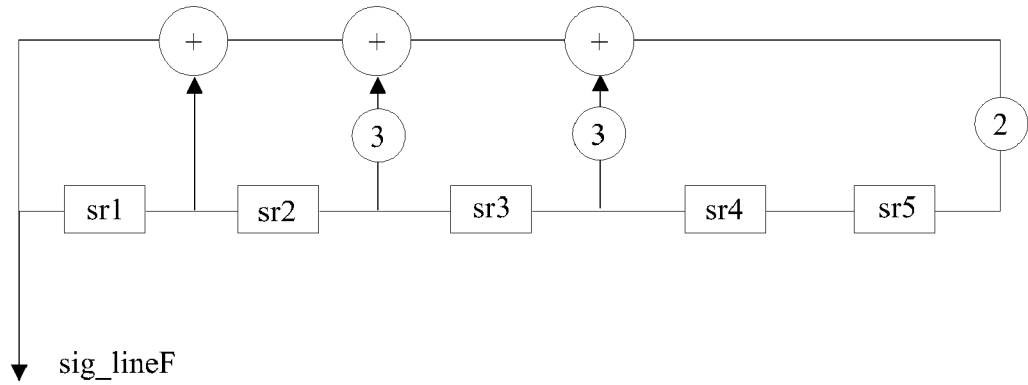
FIG. 30 is a diagram of a sequence generator in Fibonacci configuration.

In FIG. 30 a 4-valued sequence generator in Fibonacci configuration is provided, wherein the adder '+' is an adder over GF(4) and the multipliers 2 and 3 are multipliers over GF(4). The truth tables of '+' and 'x' are provided in the following tables.

| + | 0 | 1 | 2 | 3 |
|---|---|---|---|---|
| 0 | 0 | 1 | 2 | 3 |
| 1 | 1 | 0 | 3 | 2 |
| 2 | 2 | 3 | 0 | 1 |
| 3 | 3 | 2 | 1 | 0 |

| x | 0 | 1 | 2 | 3 |
|---|---|---|---|---|
| 0 | 0 | 0 | 0 | 0 |
| 1 | 0 | 1 | 2 | 3 |
| 2 | 0 | 2 | 3 | 1 |
| 3 | 0 | 3 | 1 | 2 |

Figure 31:
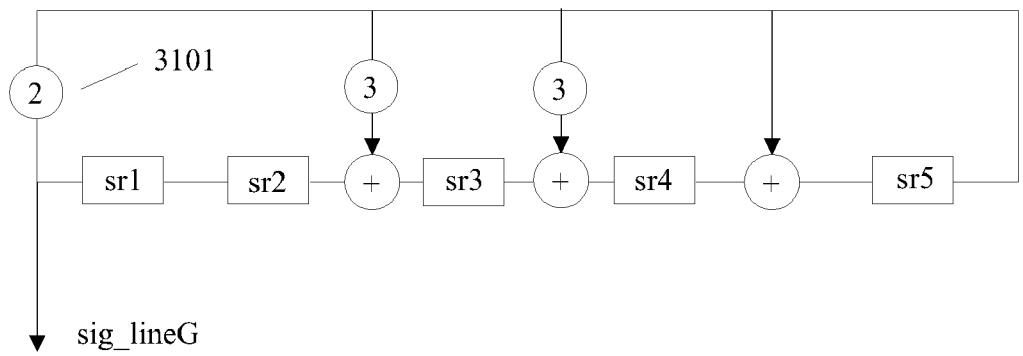
FIG. 31 is a diagram of a sequence generator in Galois configuration.

The generator of FIG. 30 generates a 1023 4-valued symbol maximum length sequence. The matching Galois configuration is shown in FIG. 31. Again one sees that the Galois and Fibonacci configurations are mirrored over the diagonal of the Fibonacci configuration: that is: the taps move to mirror positions (including the multipliers) and the functions go in transposed positions. Because the 4-valued '+' is commutative, the functions will appear as being the same.

Figure 32:
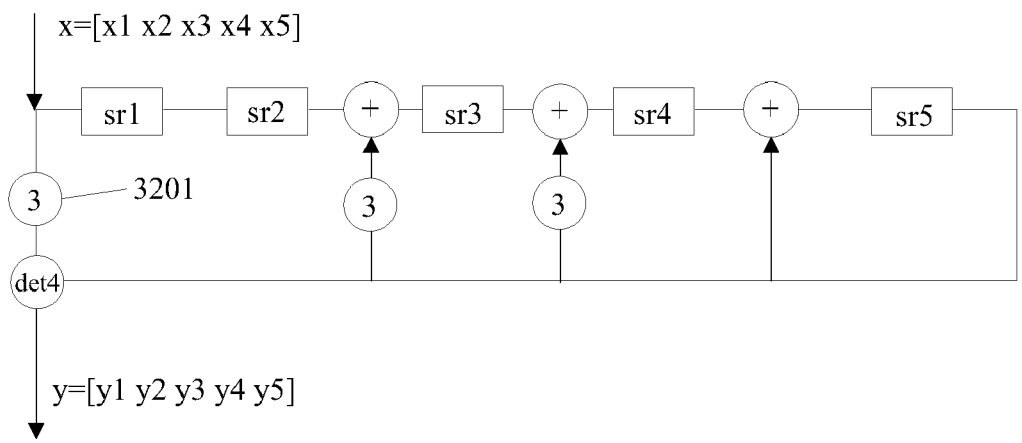
FIG. 32 is a diagram of a sequence detector in Galois configuration in accordance with an aspect of the present invention.

A detector in Galois configuration for the sequence generated by the generator of FIG. 31 is shown in FIG. 32. One should take care in reversing the multiplier of 3101 in FIG. 31 to the multiplier 3201 in FIG. 32 to correctly detect the sequence. The function 'det4' can for instance be the '+' in GF(4).

One can see from the multiplier truth table that the inverse of multiplication by 3 is multiplication by 2 in GF(4). One may also circumvent the issue of multipliers by first eliminating the multipliers in the Fibonacci configuration in accordance with a method shown by the inventor in U.S. patent application Ser. No. 11/679,316 filed on Feb. 27, 2007 entitled METHODS AND APPARATUS IN FINITE FIELD POLYNOMIAL IMPLEMENTATIONS which is hereby incorporated herein by reference in its entirety. After eliminating the multipliers one can then apply the conversion rule being an aspect of the present invention and then create the appropriate detector in Galois configuration which will then have no multipliers.

As an illustrative example of calculating the correct initial content of the Galois detector with multipliers the detector of FIG. 32 will be analyzed.

Assume that the initial state of the shift register of the detector of FIG. 32 is [a1 a2 a3 a4 a5] when at the input the signal x=[x1 x2 x3 x4 x5] is provided and the signal y=[y1 y2 y3 y4 y5] will be generated at the output. Assume that the state of the shift register is correct and that the input signal was generated by the corresponding sequence generator. Using the 4-valued function '+' is 'det4' as the detection function in FIG. 32 then the output signal y=[0 0 0 0 0]. All functions and multipliers are reversible, and accordingly one can create sufficient equations to solve a1, a2, a3, a4 and a5 as the unknowns. The Galois LFSR is somewhat more complicated because at every clock pulse the content of a shift register element after a function is different from the content of preceding shift register element at the previous clock pulse.

However the conditions are set in such a way that the content of the last shift register element is easily determined by the equation yn=(3*xn det4 sr5), wherein det4 is the 4-valued adder over GF(4) and 3* is a multiplier over GF(4) and sr5 is the content of the last shift register element. One can then for the first clock pulse determine that: y1=x1+3*sr5 or 0=x1+3*sr5.

Assume that the generated sequence starts with [x1 x2 x3 x4 x5]=[2 2 2 0 0]. One can then easily calculate [a1 a2 a3 a4 a5]. It should be clear that one may apply this approach at any stage of a sequence. Once [a1 a2 a3 a4 a5] is known one can then calculate y6 by using the calculated states of the shift register. If one is receiving a correct sequence then y6 will also be 0. If not one, can re-calculate the shift register content as shown here from x2 to x6 and check if the then next outputted symbol is a 0. Based on expected symbol error ratio one can perform this several times. If for several cycles the output of the detector is not 0 one may decide that not the correct sequence was received and that non-receiving was not due to errors.

One approach to calculate the value of [a1 a2 a3 a4 a5] is to assume that the content of the shift register of FIG. 32 in 5 consecutive clock cycles is provided by: initial: [a1 a2 a3 a4 a5]

after pulse 1: [b1 b2 b3 b4 b5]
after pulse 2: [c1 c2 c3 c4 c5]
after pulse 3: [d1 d2 d3 d4 d5]
after pulse 4: [e1 e2 e3 e4 e5]

The relation between the consecutive states can be expressed as: initial: [a1 a2 a3 a4 a5]

after pulse 1 [x1 a1(a2+3*a5) (a3+3*a5) (a4+a5)]
after pulse 2 [x2 x1(b2+3*b5) (b3+3*b5) (b4+b5)]
after pulse 3 [x3 x2(c2+3*c5) (c3+3*c5) (c4+c5)]
after pulse 4 [x4 x3(d2+3*d5) (d3+3*d5) (d4+d5)]

The above provides the representation of the states of the shift register after a pulse match with the previous representation.

Accordingly one can create sets of equations. For instance the earlier representation shows that after (clock) pulse 1 the content of the third shift register element is b3. This is equal to (a2+3*a5) and leads to b3=(a2+3*a5), keeping in mind that '+' and '*' are defined in GF(4) and were already presented as truth tables. Assuming that the correct sequence was detected so the output y=[0 0 0 0 0]. Accordingly: 0=3*x1+a5; 0=3*x2+b5; 0=3*x3+c5; 0=3*x4+d5; and 0=3*x5+e5. The 4-valued function '=' is associative, commutative and self-reversing, and accordingly: a5=3*x1; b5=3*x2; c5=3*x3; d5=3*x4; and e5=3*x5.

The solution, expressing the shift register content [a1 a2 a3 a4 a5] in x1, x2, x3, x4 and x5 will provide:

$$a1=3*3*x2+3*3*x3+3x4+3*x5$$

$$a2=3*3*x1+3*3*x2+3*x3+3*x4$$

$$a3=3*3*x1+3*x2+3*x3$$

$$a4=3*x1+3*x2$$

$$a5=3*x1$$

For instance assume that 5 consecutive 4-valued symbols created by the sequence generator of FIG. 31 are x=[2 2 2 0 0]. A correct detection requires that [a1 a2 a3 a4 a5]=[0 1 3 0 1]. This is the correct initial state of the LFSR of FIG. 31 to generate the sequence.

The detector can be used to indicate that either symbol errors have occurred in the received sequence or that the wrong sequence is being detected for the content of the shift register, or a wrong state shift register state is being used. This is indicated when the output of a detector does not generate identical symbols (such as 0s in the illustrative example).

Accordingly the calculation of the state or the content of the shift register of a detector LFSR in Galois configuration provides at least two useful applications in detection of sequences of symbols.

As an aspect of the present invention one can restart the Galois detection of a sequence of symbols created by a sequence generator, in which errors have occurred. While this Galois configuration detector is not self synchronizing, one may overcome the errors by calculating the correct shift register content.

As another aspect of the present invention, one can also use the method of calculating the content of the shift register to detect the presence of a sequence. In telecommunication applications such as CDMA cell phone systems, often an LFSR generated m-sequence is used, wherein for individual users a shifted version of such sequence is applied. The correlation between an m-sequence and a shifted version is Low, while the correlation between two identical sequences is High. FIG. 19 shows a correlation graph that demonstrates this aspect. In general one requires a sufficient amount of symbols of a sequence to determine a correlation graph.

Assuming that a sequence is error free, one has one of two situations: either a sequence in a correct phase is received, or a sequence not in correct phase is received. If a sequence is not in a correct phase it should be rejected and treated as for instance noise. The current reconstruction method for determining the content of the shift register in Galois configuration offers a rapid and simple detection method. In general receivers maintain a low power clock circuit which allows a receiver to determine a phase with a main sequence generator. In fact one often applies this to synchronize an offset mask for generating an expected sequence when part of a receiving circuit comes out of a sleep mode. In the detection method one uses a clock signal to determine a state of a shift register based on an assumed correct reception of a sequence. At the same time one retrieves from a memory the known correct state that an LFSR should have at a certain moment if the correct sequence was received.

It was shown by the inventor that an LFSR generating an m-sequence (be it binary or n-valued with n>2) that over the length of the sequence being generated at every clock pulse the content of the shift register is different from any other state of the shift register during the generation of the m-length sequence. This is for instance described in U.S. patent application Ser. No. 11/427,498, filed on Jun. 29, 2006 entitled The Creation and Detection of Binary and Non-Binary Pseudo-Noise Sequences Not Using LFSR Circuits which is incorporated herein by reference in its entirety. This means that a calculated content of the shift register of a detector detecting an out-of-phase sequence, the out-of-phase sequence will be different from the calculated content of the shift register in the detector from an in-phase sequence. Accordingly one can correctly distinguish between sequences in different phases by calculating the content of the shift register of a detector and comparing it to the known required content which is for instance stored in a memory.

Figure 33:
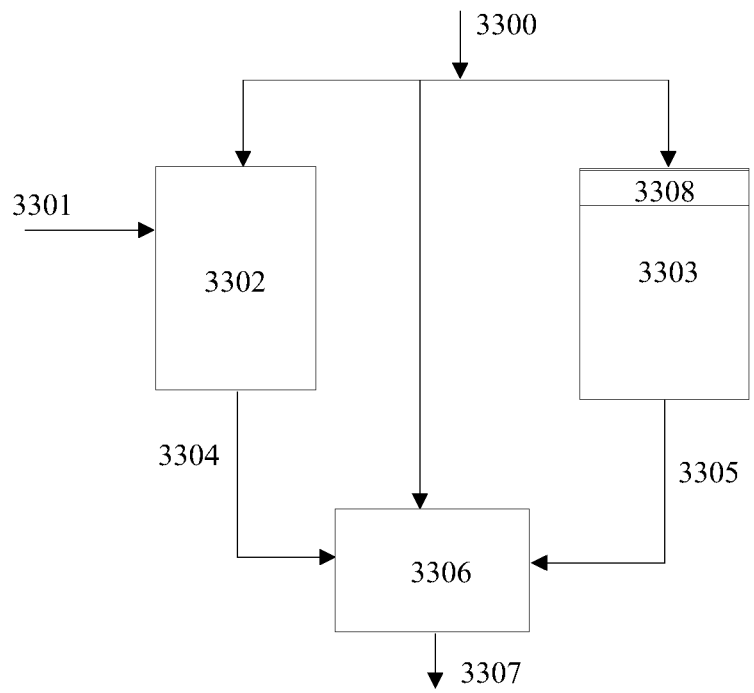
FIG. 33 is a diagram of a system for sequence detection in accordance with an aspect of the present invention.

A diagram for such a detector is provided in FIG. 33. A unit 3302, which can for instance comprise a processor which may use A/D converters to convert n-valued signals in binary words, is used to calculate from k incoming symbols the required state of a state register with k elements at a moment t0, assuming that at moment t0 the first of k correct n-valued symbols of a sequence were received. N-valued symbols are received on an input 3301. A clock signal is provided on an input 3300. After k incoming symbols have been received the calculated state of the shift register is provided on output 3304. The clock signal is also provided to a memory unit 3303 that has stored the correct state of the LFSR related to a sequence in a certain phase, and makes it available on an output 3305. The memory 3303 may contain a unit 3308 that controls a delay time for providing the stored state of the LFSR on the output, to make sure that both units 3302 and 3303 will provide information at the appropriate time. The output of the units 3303 and 3305 is inputted to a comparator 3306, which compares the inputs from 3303 and 3305. The comparator 3306 also may use the clock signal 3300 to determine when to execute the comparison, which may include calculating a delay. A signal acknowledging identity or difference between the inputs will be provided on an output 3307. One may make a decision after just calculating 1 content. One may also compare several consecutive or non-consecutive calculated and known states to make sure that potential errors in a received signal are dealt with based on a certain symbol error ratio.

The method and apparatus here provided works for n with n>2 as well as for binary detection. A first illustrative 4-valued example will be provided. Herein the sequence generator in Galois configuration is shown in diagram in FIG. 34. The function '+' is the earlier provided 4-valued adder over GF(4). The multiplier 3401 is a multiplication with factor 2 according to the earlier provided multiplication over GF(4). One may reduce the structure in such a way that no multipliers are used. A multiplier is used in the example.

Figure 34:
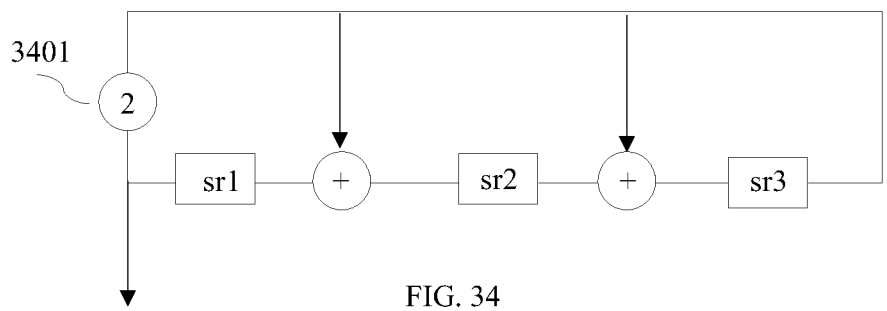
FIG. 34 is a diagram of a sequence generator in Galois configuration.
Figure 35:
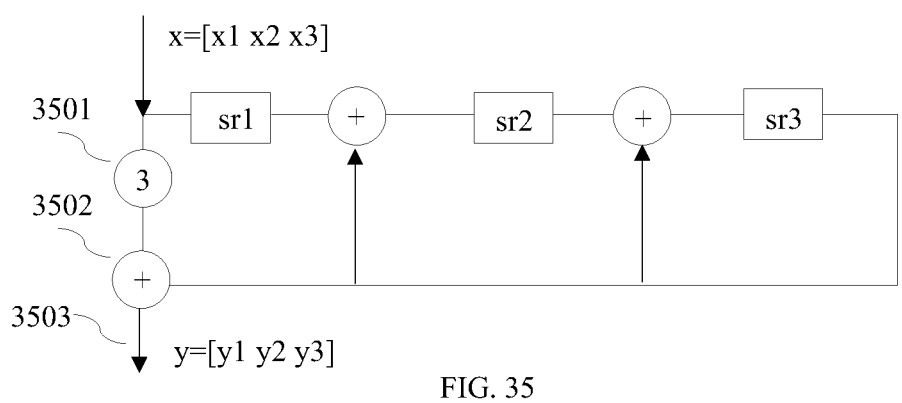
FIG. 35 is a diagram of a sequence detector in Galois configuration in accordance with an aspect of the present invention.

The corresponding detector is shown in FIG. 35. The detector is the generator flipped along the horizontal axis, wherein now a detecting function 3502 is inserted. The detecting function preferably has a truth table with the diagonal providing identical states. The '+' function meets this requirement and thus is applied as detecting function. The input to the first element of the shift register may be considered the input to the LFSR of the detector and to the detector. The input to the LFSR is also connected to a multiplier 3501 which should reverse the multiplier 3401 in the generator of FIG. 34. This is the multiplier 3 over GF(4). Further more the input to the detector is connected to the input of the multiplier 3501. The output of the multiplier 3501 is connected to a first input of function 3502 and the output of the last element of the shift register of the LFSR is connected to a second input of the function 3502. When the correct sequence is received and the shift register has the correct state the output 3503 will generate all 0s.

As before all LFSRs work under control of a clock signal which is assumed but not shown. Assume that the generator of FIG. 34 has an initial shift register content [sr1 sr2 sr3]=[1 3 0]. The generator will provide a 4-valued maximum length sequence of 63 symbols of which the first 16 symbols are [0 1 3 2 3 0 0 1 1 0 3 1 2 2 2 3].

Figures 36, 37, 38:
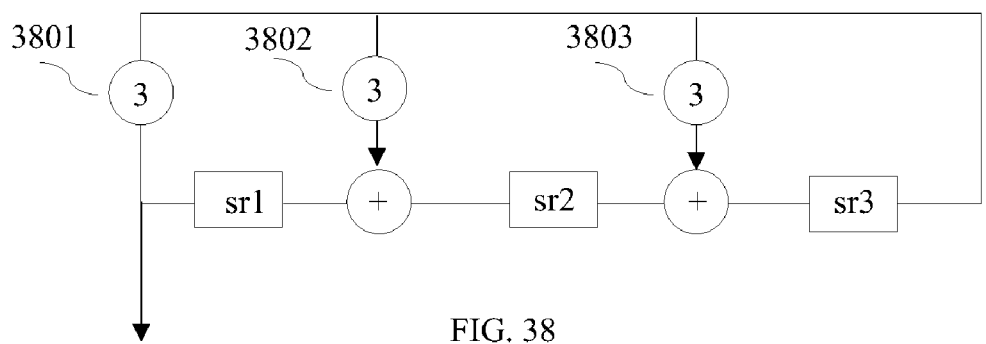
FIG. 36 is a table with consecutive states of a shift register in Galois configuration.
FIG. 37 is another table with consecutive states of a shift register in Galois configuration.
FIG. 38 is a diagram of a sequence generator in Galois configuration.

The table in FIG. 36 provides the content of the shift for the first 16 clock pulses. One can see that the content of the first element of the shift register is identical to the first 16 symbols of the sequence.

The content of the shift register [sr1 sr2 sr3] based on the assumption of the received sequence [x1 x2 x3] being the correct one can be calculated from:

$$sr1=3*x1+3*x2+3*x3$$

$$sr2=3*x1+3*x2$$

$$sr3=3*x3$$

One can then input series of 3 consecutives symbols into the above equations to generate a shift register table. For the current case that is a table identical of course to the table of FIG. 36.

Assume that the received sequence is out of phase by two symbols with the here provided sequence. The first 16 symbols of the sequence are then: [3 2 3 0 0 1 1 0 3 1 2 2 2 3 2 2]. The first 16 calculated states of the shift register using the above equations are provided in the table of FIG. 37. Not unexpectedly the table of FIG. 37 is different from FIG. 36. The table is shifted in vertical direction by 2 positions. This means that at any time the content of a table with shift register states corresponding with a sequence in a certain phase is different from a table representing the states of the same sequence in a different state. Accordingly one can detect a sequence in a certain phase and distinguish it from the same sequence in a different phase.

The here provided method and apparatus can also be applied to distinguish between a first m-sequence generated by the generator of FIG. 34 for instance and a second sequence generated by a different sequence generator. In an illustrative example a 4-valued m-sequence of 63 symbols will be generated by the generator of which a diagram is provided in FIG. 38. As one can see this generator has three multipliers 3801, 3802 and 3803 all being a multiplier 3 over GF(4). The reason to use this example is because the shift register of this generator will have all the states of the generator of FIG. 34, but substantially in a different order. The first 16 symbols of the sequence generated from the initial shift register state [1 3 0] are [0 2 2 0 0 1 3 1 2 0 2 0 1 2 2 3].

One can provide this sequence to the comparator 3303 of FIG. 33. The unit will then generate the calculated states as provided in the table of FIG. 39. Comparing the table of FIG. 39 with FIG. 36 of the correct sequence shows that in certain cases one has to compare a series of consecutive states before deciding if a sequence was detected. In this case the shift register contents [2 0 1], [2 3 1] and [2 3 2] appear in the same order in the same phase. After this the correct and calculated shift register content will be different again. However it is clear that in such situations at least 4 consecutive shift register contents should be calculated and compared in order to arrive at a correct decision of detection.

As illustrative examples 4-valued LFSRs are used wherein '+' and 'x' are defined over GF(4). This makes symbol manipulation fairly simple as the operations are commutative, reversible, distributive and associative. It should be appreciated that the here provided method works for any reversible n-valued function with reversible n-valued inverters. Symbol manipulation may be not as easy as in an extended binary field; however solutions can be determined and applied.

One can use the here provided method and apparatus also in the binary case. A diagram of a binary sequence generator in Galois configuration is provided in FIG. 40. It has 5 shift register elements. The binary function '+' is the XOR function. The corresponding detector is provided in FIG. 41. The binary detection function 40001 is also a XOR function. In case of correct detection of the sequence generated by the generator of FIG. 40 by the detector of FIG. 41 the following relations hold between the state of the shift register at detection of x1 between the state register content [sr1 sr2 sr3 sr4 sr5] and the input signal during 5 consecutive input symbols [x1 x2 x3 x4 x5].

$$sr1=x3+x5$$

$$sr2=x2+x4$$

$$sr3=x1+x3$$

$$sr4=x2$$

$$sr5=x1$$

Figures 39, 40:
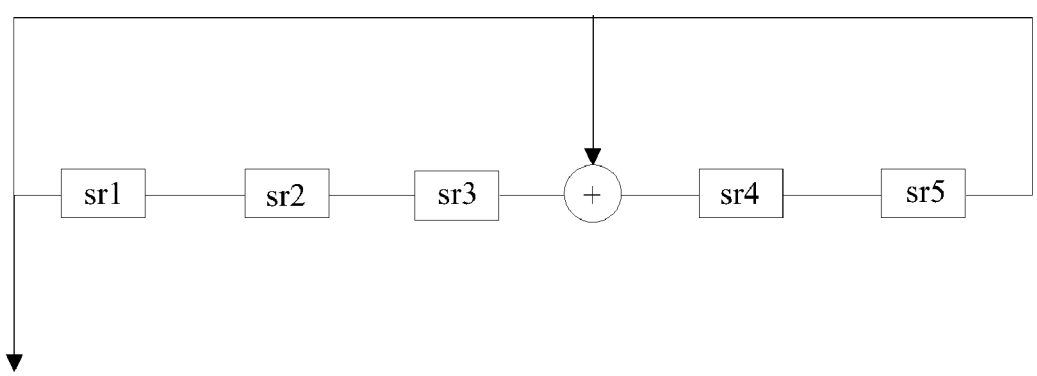
FIG. 39 is another table with consecutive states of a shift register in Galois configuration.
FIG. 40 is a diagram of a sequence generator in Galois configuration.

The first 16 symbols generated by the generator of FIG. 40 with initial content of the shift register [0 1 0 0 1] are [1 0 1 1 1 0 1 1 0 0 0 1 1 1 1 1].

Figures 41, 42:
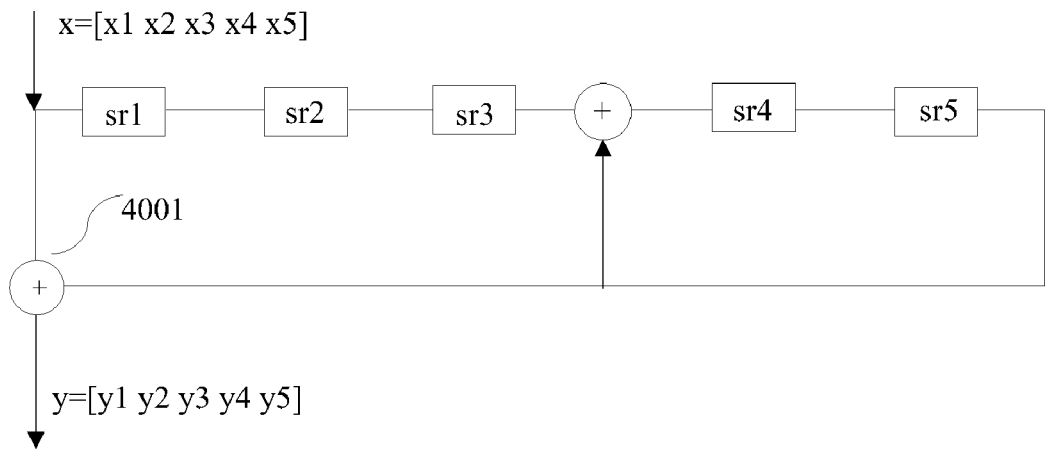
FIG. 41 is a diagram of a sequence detector in Galois configuration in accordance with an aspect of the present invention.
FIG. 42 is a table with consecutive states of a shift register in Galois configuration.

FIG. 42 shows a table with consecutive shift register content for the generator of FIG. 40, which is identical to the calculated content of the shift register of the detector when the sequence in correct phase is detected. As before, every shift register content is unique and different from every other shift register content if only sequences being phase shifted versions of each other are received.

Figures 43, 44:
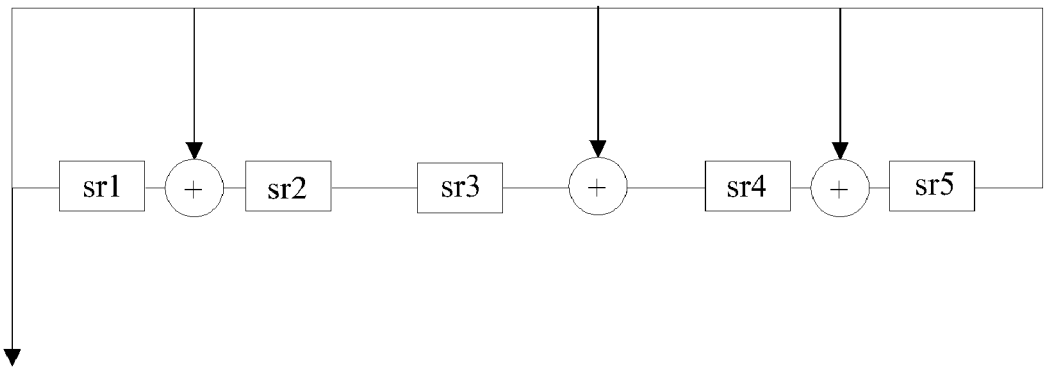
FIG. 43 is a diagram of a sequence generator in Galois configuration.
FIG. 44 is a table with consecutive states of a binary shift register in Galois configuration.

FIG. 43 shows a diagram of another binary m-sequence generator. This generator has the same number of shift register elements as the one FIG. 40. Accordingly both generators will have the same set of contents of the shift register, only in substantially different order. Assume that the generator of FIG. 43 starts with the same shift register content as FIG. 40. The shift register content calculated by the detector of FIG. 41 is shown in the table of FIG. 43. In this case only the 9th row of the table of FIG. 44 and FIG. 42 have a content in common, the content being [1 1 0 0 0]. Accordingly the method as provided can also used to detect between sequences generated by different generators. Such detection in most cases may require calculating multiple contents to address common content occurrences.

One application of detection as here provided for instance can be track location on a magnetic or optical disk, wherein a position can be marked by a sequence which can be detected by the present method or apparatus.

One can use the method and apparatus as provided in FIG. 33 also to distinguish between sequences generated by different sequence generators. In such a case one should compare several consecutive states.

Fibonacci and Galois Scramblers and Descramblers

Figure 4:
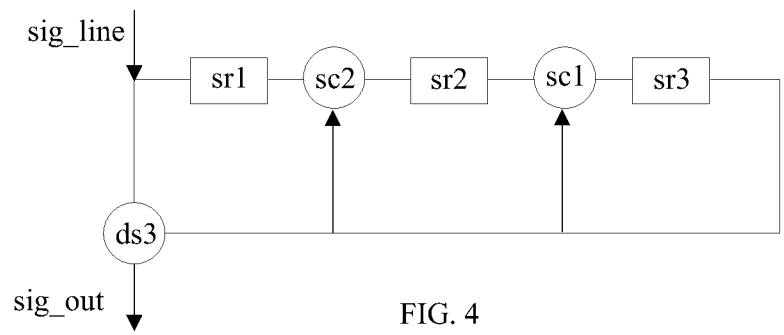
FIG. 4 is a diagram of an n-valued descrambler in Galois configuration.

It is another aspect of the present invention to provide identical Fibonacci and Galois scramblers and descramblers. Galois scramblers and descramblers have been provided. In the configuration as shown in FIG. 3 and FIG. 4 it has been demonstrated that the Galois scramblers and descramblers work as expected. However the Galois scramblers are not identical to the shown Fibonacci scramblers and a Fibonacci descrambler cannot descramble a sequence created by a Galois scrambler without extra measures. Such a possibility may be attractive as it would provide a fast scrambler and a perhaps slower, but self-synchronizing descrambler. In fact one could make descrambling faster by using the memory based descrambler or the multi-input function descrambler as demonstrated in an earlier section.

As an example of the provided method to achieve equivalence, a modified Galois scrambler derived from the one shown in FIG. 3 will be used.

Figure 45:
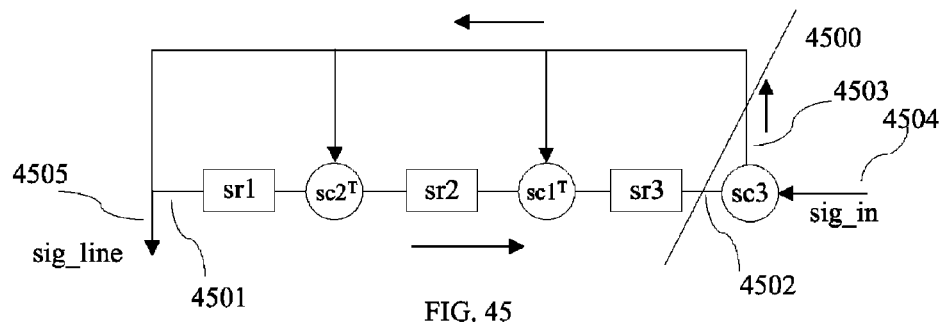
FIG. 45 is a diagram of a scrambler in Galois configuration in accordance with an aspect of the present invention.

The example starts with a scrambler in Fibonacci configuration as shown in FIG. 1. The equivalent Galois configuration descrambler is shown in FIG. 45. The modification applies the rules of transforming the sequence generator (mirroring the position of the taps) and transposing the truth tables of the functions at the taps from Fibonacci to Galois configuration. A novel element in the method is the change in position of function sc3 at the top left of the Fibonacci scrambler to the right of the modified Galois scrambler.

Figure 46:
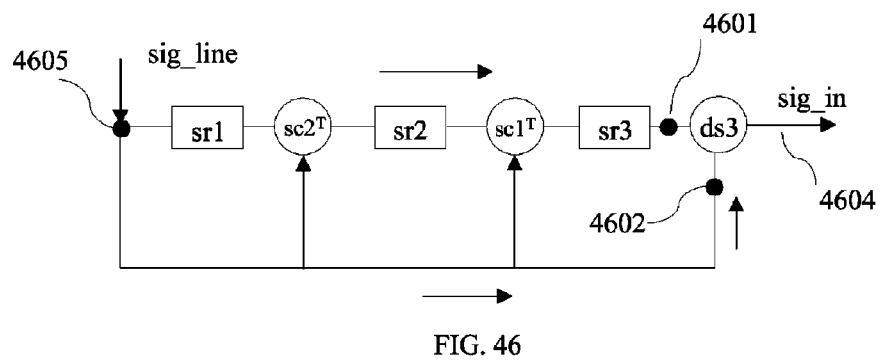
FIG. 46 is a diagram of a descrambler in Galois configuration in accordance with an aspect of the present invention.

The signal generated by the Galois scrambler of FIG. 45 is "out-of-phase" with the signal generated by the Fibonacci scrambler. However it turns out that that does not matter for the Galois descrambler as shown in FIG. 46 as it will self-synchronize after flushing. The following examples will illustrate the approach.

One can start out with a to be scrambled ternary sequence sig_in.

sig_in=[0 1 2 2 1 1 2 0 0 1 2 0 0 1 2 0 1 0 2 1 1 1 0 2 1 0].

The Fibonacci scrambler of FIG. 1 has the functions with the following truth tables.

| sc1 | 0 | 1 | 2 |
|---|---|---|---|
| 0 | 0 | 2 | 1 |
| 1 | 1 | 0 | 2 |
| 2 | 2 | 1 | 0 |

| sc2 | 0 | 1 | 2 |
|---|---|---|---|
| 0 | 0 | 1 | 2 |
| 1 | 1 | 2 | 0 |
| 2 | 2 | 0 | 1 |

| sc3 | 0 | 1 | 2 |
|---|---|---|---|
| 0 | 0 | 1 | 2 |
| 1 | 1 | 2 | 0 |
| 2 | 2 | 0 | 1 |

Assume the initial state of the shift register to be [1 0 2] and the scrambled sequence is seq_f_scram=[2 2 1 2 0 1 1 0 1 1 2 0 0 2 1 2 0 0 0 1 2 2 2 0 0 1].

The Galois scrambler of FIG. 45 has functions with the truth tables:

| $sc2^T$ | 0 | 1 | 2 |
|---|---|---|---|
| 0 | 0 | 1 | 2 |
| 1 | 1 | 2 | 0 |
| 2 | 2 | 0 | 1 |

| $sc1^T$ | 0 | 1 | 2 |
|---|---|---|---|
| 0 | 0 | 1 | 2 |
| 1 | 2 | 0 | 1 |
| 2 | 1 | 2 | 0 |

| sc3 | 0 | 1 | 2 |
|---|---|---|---|
| 0 | 0 | 1 | 2 |
| 1 | 1 | 2 | 0 |
| 2 | 2 | 0 | 1 |

Assume the initial state of the shift register of the scrambler of FIG. 45 also to be [1 0 2]. This will create the scrambled sequence: sig_g_scram=[2 0 2 2 1 1 0 1 0 0 1 1 0 2 0 1 0 2 0 2 1 0 0 1 2 1]. This is clearly a different sequence than sig_f_scram. However if one makes the shift register initial state [1 1 2] then the sequence generated by the Galois scrambler is the same as the one from the Fibonacci scrambler.

The corresponding descrambler of the Galois scrambler of FIG. 45 is the Galois descrambler of FIG. 46, which is another aspect of the present invention. As before the descrambler is the mirror image of the scrambler, wherein the LFSR uses the same functions as in the scrambler. However as the scrambler has a scrambling function 'sc3', the descrambler has a descrambling function 'ds3' which is the reverse of 'sc3'.

The signal sig_g_scram is inputted into the descrambler of FIG. 46 on sig_line wherein ds3 has the truth table:

| ds3 | 0 | 1 | 2 |
|---|---|---|---|
| 0 | 0 | 2 | 1 |
| 1 | 1 | 0 | 2 |
| 2 | 2 | 1 | 0 |

When the initial state of the shift register is also [1 0 2] then the original signal sig_in will be provided on the output of the descrambler of FIG. 46.

As another aspect of the present invention the Fibonacci descrambler of FIG. 2 will be provided as a descrambler for the n-valued scrambler of FIG. 45. Assume the initial state of the shift register of this Fibonacci descrambler to be [1 0 2]. This will result into: sig_f_dscram=[0 2 2 2 1 1 2 0 0 1 2 0 0 1 2 0 1 0 2 1 1 1 0 2 1 0]. The first 3 symbols of the original input sequence were [0 1 2]. The equivalent initial states of the two scramblers of FIG. 1 and FIG. 44 are different for creating the same scrambled sequence. Accordingly a Fibonacci descrambler descrambling a Galois scrambled sequence has to be flushed of the 'wrong' symbols before descrambling correctly. However after flushing the descrambler correctly descrambles the signal scrambled by the Galois scrambler back into sig_in (except of course for the beginning during flushing if the initial content was not correct).

This approach works for any n-valued Fibonacci scrambler, by finding the corresponding Galois scrambler and descrambling with the Fibonacci descrambler. This includes the binary case. The Galois configuration scrambler of FIG. 45 is essentially different from the scrambler of FIG. 3. Both scramblers have the same LFSR. In FIG. 3 the LFSR is to the right of line 300. If the line 300 is a short circuit then FIG. 3 is a sequence generator. With the scrambling function 'sc3' connected to the LFSR FIG. 3 is a scrambler. In FIG. 3 301 is the input to the shift register and 302 is the output of the shift register. One input of 'sc3' is connected to output 302 and the output 303 of the scrambling function 'sc3' is connected to the input 301 of the shift register. Also an input of the LFSR functions (sc1 and sc2) is connected to the output of the LFSR.

The scrambler of FIG. 45 is almost identical to the scrambler of FIG. 3; however there are important differences. The LFSR is the part to the left of line 4500. If the line 4500 is a short circuit then the circuit id a sequence generator. However while the LFSR functions in FIG. 3 were directly connected to the output of the shift register, in FIG. 45 the functions $sc1^T$ and $sc2^T$ of the LFSR are not directly connected to the output 4501 of the shift register. In FIG. 45 the functions of the LFSR are connected to the output of the scrambling function sc3. Because one can descramble a sequence scrambled by the scrambler of FIG. 45 by a Fibonacci descrambler, the configuration as shown in FIG. 45 will be called a Galois LFSR configuration scrambler in Fibonacci equivalent mode.

Accordingly a method is provided to create a Fibonacci descrambler for a Galois scrambler. This method can be applied to binary and n-valued scramblers and descramblers.

The steps of this method are:
1. design an n-valued Fibonacci scrambler with p storage element shift register and q taps;
2. design the equivalent Galois scrambler, by changing the tap at position k to position (p-k) and the function from sc to $sc^T$.
3. use the Fibonacci descrambler corresponding to step 1 for descrambling the signal of step 2.

Accordingly a method has been provided that allows an n-valued or a binary sequence to be scrambled by a Galois type scrambler and to be descrambled by a Fibonacci (self-flushing) type descrambler.

The Self-Synchronizing Galois Descrambler

It is also possible to create a self-synchronizing descrambler in Galois configuration for a corresponding scrambler in Galois configuration. One can use a Galois scrambler in the Fibonacci equivalent mode, such as shown in FIG. 45, with a scrambling function connected directly to the output of the LFSR and the signal outputted by the scrambling function being the feedback signal. The corresponding descrambler in Galois configuration is shown in FIG. 46. Comparing the scrambler of FIG. 45 with the descrambler of FIG. 46 one can see that the input 4504 to the scrambler of FIG. 45 becomes the output 4604 of the descrambler of FIG. 46. Further more the output 4505 of the scrambler of FIG. 45 becomes the input 4605 of the descrambler of FIG. 46. Further more the scrambling function sc3 of the scrambler of FIG. 45 becomes a descrambling function ds3 in the descrambler of FIG. 46 whereby functions 'sc3' and 'ds3' are each others reverse. This then provides a general rule for binary and n-valued corresponding scramblers and descramblers in Galois configuration.

One can easily conclude from the diagram of FIG. 46 that the descrambler is self-synchronizing. The symbols on the input 4605 provide new content for the shift register as well as the feed-forward signals. An occurring error will be shifted through the register elements. As the incoming signal becomes error free, so is the feed-forward signal, and so will be the outputted signal on 4604, once the errors are flushed from the shift register. As before, both the scrambler and descrambler LFSR are under control of a clock signal, not shown but may be assumed. Accordingly a self-synchronizing descrambler in Galois configuration has been provided.

For practical reasons one may identify 3 important nodes or terminals in the descrambler. The circuit within these terminals in the descrambler is not a Linear Feedback Shift Register but rather a Linear Forward Connected Shift Register (LFCSR), wherein the signal on the input is forwarded through taps to functions separating shift register elements. Herein 4605 is an input of the LFFSR, 4601 is a first output and 4602 is a second output of the LFCSR. In the configuration as shown in FIG. 46 4602 and 4605 are carrying the same signal. The following 4-valued illustrative example will show that in some cases 4602 and 4605 may have different signals.

In general a test to distinguish if a shift register in Galois configuration is in LFSR or in LFCSR mode is to identify a function connected between two shift register elements. If the function has an input connected to the output (potentially through an inverter) of the shift register, it is part of an LFSR. If it is connected (potentially through an inverter) to the input of the shift register it is part of an LFCSR.

The illustrative example is a 4-valued variation of the scrambler and descrambler combination as earlier provided in FIGS. 31 and 32. They are shown in Galois Fibonacci equivalent mode in FIGS. 47 and 48. The scrambler of FIG. 47 has a multiplier 4701 which is 2 over GF(4) in its input. The functions sc1, sc2, sc3, sc4 and ds4 are the earlier provided adder over GF(4). The descrambler of FIG. 48 has a multiplier 4801 in a corresponding position at the input. This multiplier, which inverts multiplication 2 over GF(4) and accordingly is a multiplication 3 over GF(4), can be considered an inverter, that reverses multiplier 4701, in order to correctly descramble. This condition for multipliers at the input is one general requirement for a correct descrambler corresponding to an n-valued scrambler in Galois configuration with an inverter at the input. Further more the descrambling function 'ds4' in the descrambler of FIG. 47 should reverse function 'sc4'. It is easy to see that the signals at 4802 and 4803 may be different.

Figure 47:
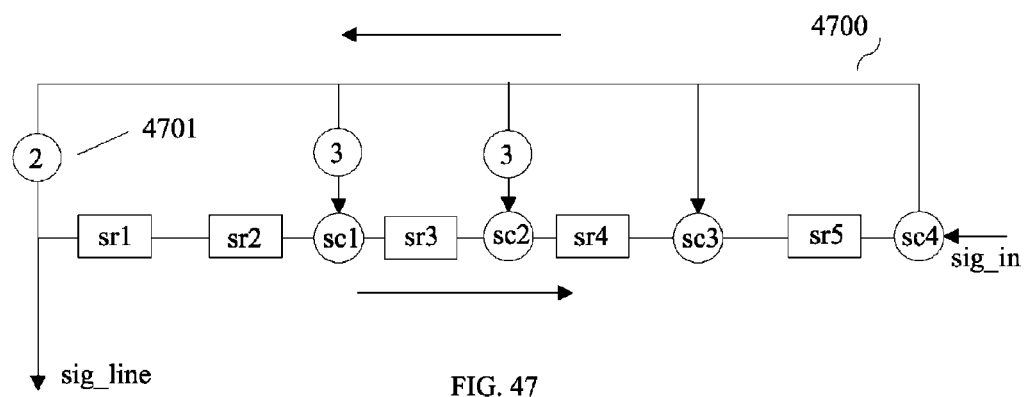
FIG. 47 is a diagram of a scrambler in Galois configuration in accordance with an aspect of the present invention.

Assume that the scrambler of FIG. 47 is provided with a 4-valued sequence sig_in=[0 1 2 3 0 1 2 3 0 1 2 3 0 1 2 3 3 2 1 0], the initial state of the shift register is [0 1 3 0 1], the '+' and 'x' functions are the earlier provided 4-valued adder and multiplier over GF(4). The generated sequence sig_line=[2 0 3 1 3 3 1 2 1 1 0 2 0 0 2 3 2 3 0]

Figure 48:
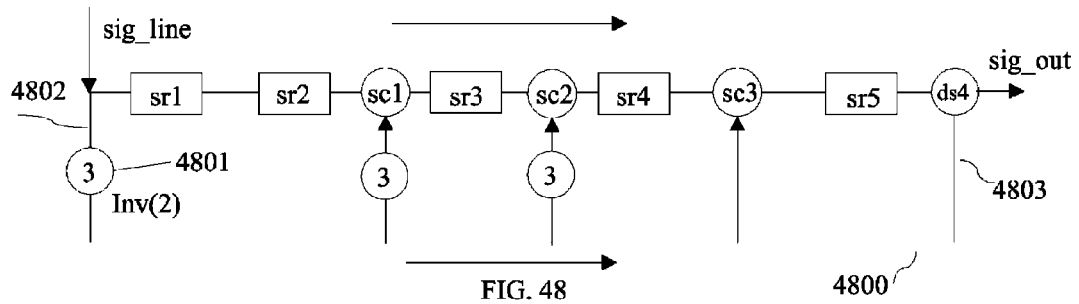
FIG. 48 is a diagram of a self-synchronizing descrambler in Galois configuration in accordance with an aspect of the present invention.

Inputting sig_line into the descrambler of FIG. 48 with the same initial shift register content will again generate sig_in. Assume that symbols [1 1 2] in positions 7, 8 and 9 of sig_line experienced errors and are now [0 0 0]. Determining the difference of the descrambled sequence with sig_in provides [0 0 0 0 0 0 −1 0 0 −1 1 −2 1 2 0 0 0 0 0 0]. This shows that after the errors are flushed from the shift register the errors have disappeared from the descrambled sequence. This applies to any n-valued and binary Galois descrambler in Fibonacci equivalent mode, as long as the conditions for corresponding scramblers and descramblers are met.

In FIG. 47 the input of the shift register is also the input of shift register element sr1. In scramblers in Galois configuration like in FIG. 47 when it is stated that the output of a scrambling function (in FIG. 47 sc4 is the scrambling function) is connected to the input of a shift register it is intended to mean either directly without an inverter in the path from function output to shift register input, or indirectly, meaning like in FIG. 47 through an inverter such as for example inverter 4701. The same applies to connecting the output of the scrambling function to an input of a reversible function connecting two shift register elements, such as functions sc1, sc2 and sc3 in FIG. 47. While the output of sc4 is directly connected to an input of sc3, it is indirectly connected to an input of sc2 through an inverter. Accordingly connected herein means directly connected or indirectly connected through an inverter. This applies to scramblers, descramblers, detectors and sequence generators.

Figure 49:
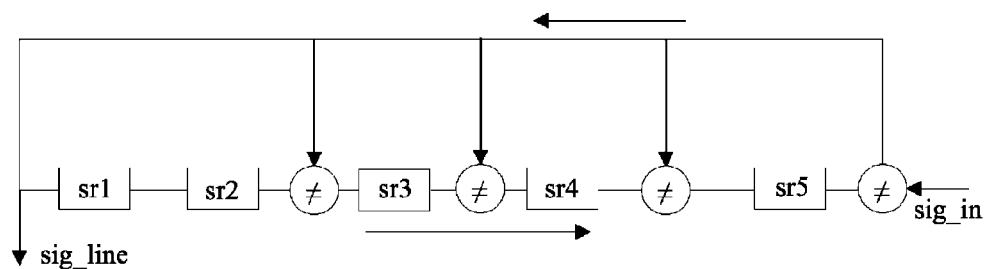
FIG. 49 is a diagram of a binary scrambler in Galois configuration in accordance with an aspect of the present invention.

One can check the method in the binary case by making all multipliers in FIG. 47 1 and replacing the 4-valued '+' with the 2-valued '+'. This binary Galois scrambler is shown in FIG. 49. Making the initial state of the shift register [0 1 1 0 1] and sig_in=[0 1 1 1 0 0 1 1 1 0 1 0 1 1 1 0 0 1 0 0] the binary scrambler of FIG. 49 will generate sig_line=[1 0 1 0 1 1 1 1 0 1 0 0 1 0 1 0 1 0 1 1]. Inputting sig_line into the corresponding descrambler as shown in FIG. 50 with an identical initial shift register content will generate sig_in again.

Figure 50:
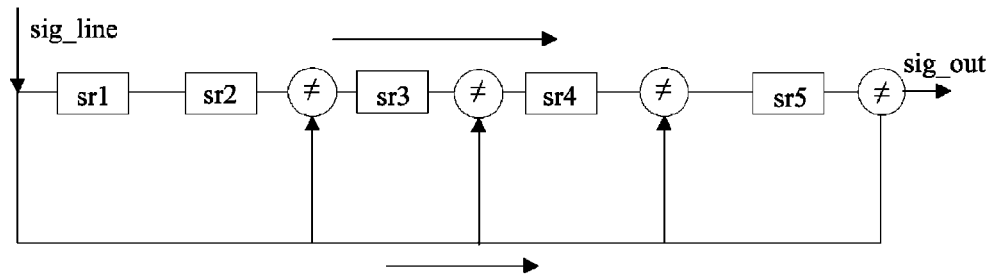
FIG. 50 is a diagram of a binary self-synchronizing descrambler in Galois configuration in accordance with an aspect of the present invention.

Replacing the first 4 symbols of sig_line as being in error by [0 1 0 1] and descrambling sig_line will generate a signal that differs with sig_in as [−1 0 1 0 −1 0 1 1 0 0 0 0 0 0 0 0 0 0], which demonstrates that the Galois configuration descrambler of FIG. 50 is flushed of errors and thus is self-synchronizing.

Figure 51:
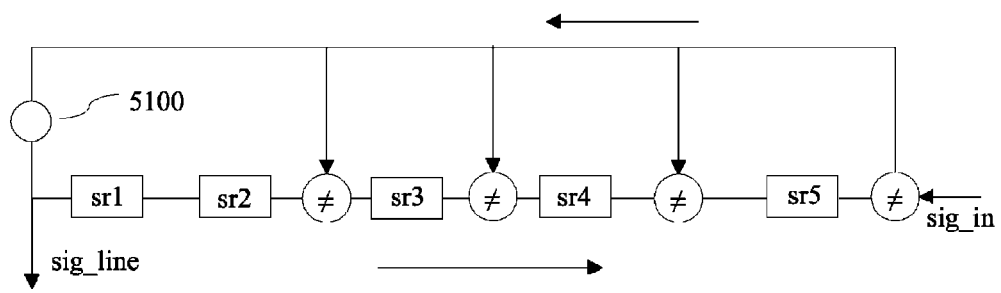
FIG. 51 is another diagram of a binary scrambler in Galois configuration in accordance with an aspect of the present invention.
Figure 52:
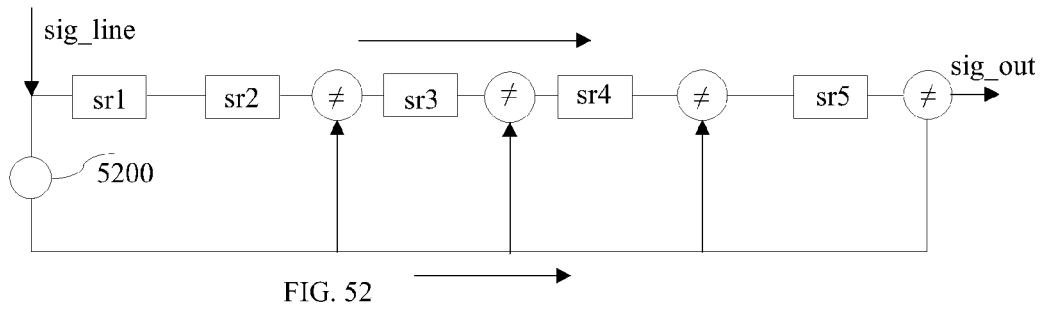
FIG. 52 is another diagram of a binary self-synchronizing descrambler in Galois configuration in accordance with an aspect of the present invention.

In FIG. 51 a binary scrambler is shown almost identical to the binary scrambler of FIG. 49. A difference is an inserted binary inverter 5100. The corresponding descrambler is shown in FIG. 52. FIG. 52 has an inverter 5200. FIG. 52 is the exact mirror not only in structure, but also in functions and inverters of FIG. 51. In fact, no matter where an inverter is inserted into a binary scrambler in Galois configuration in Fibonacci mode, its descrambler will be a mirror image, and have exactly the same functions and inverters. Another binary example is provided in FIG. 53 with inverters 5300 and 5301 and its corresponding descrambler is shown in FIG. 54 with inverters 5400 and 5401.

Figure 55:
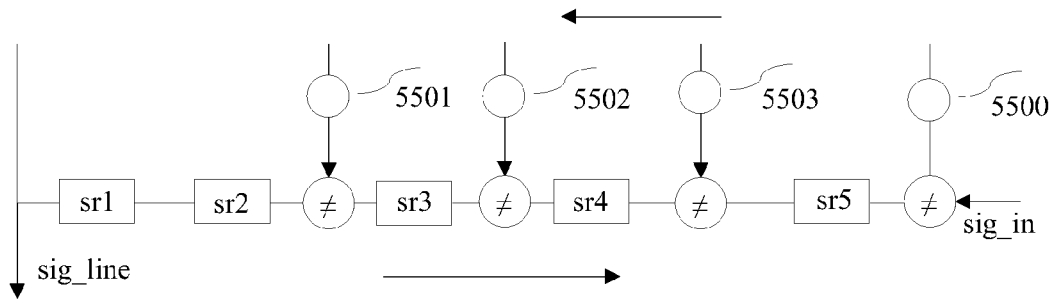
FIG. 55 is another diagram of a binary scrambler in Galois configuration in accordance with an aspect of the present invention.
Figure 56:
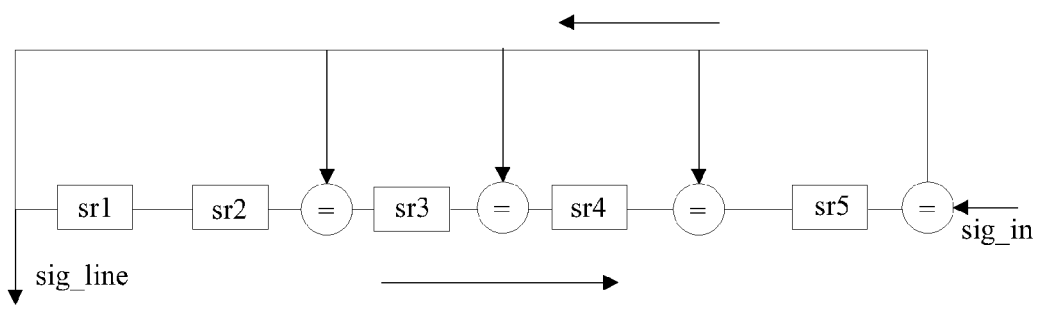
FIG. 56 is another diagram of a binary self-synchronizing descrambler in Galois configuration in accordance with an aspect of the present invention.

The use of binary inverters in binary scramblers, descramblers and sequence generators has essentially the effect of changing a XOR or mod-2 addition function into an EQUAL function. One can easily check that a XOR function with one binary inverter at the input is identical to an EQUAL function. A XOR function with a binary inverter at the output also is equivalent to an EQUAL function. A XOR function with a binary inverter at both inputs remains equivalent to a XOR function. Accordingly the use of inverters in binary scramblers, descramblers and sequence generators is equivalent to replacing some or all XOR functions by EQUAL functions. As an illustrative example the binary scrambler of FIG. 51 is provided by its equivalent circuit in FIG. 55, by 'moving' the inverter 5100 to 5500 in FIG. 55. This changes the signal provided to the XOR function between the shift register elements in FIG. 55. To correct that each tap is provided with an inverter: inverter 5501, 5502 and 5503. Based on the earlier provided explanation one can then change all the relevant XOR functions combined with inverters into EQUAL functions as shown in FIG. 56. Based on the earlier cited patent applications it should be appreciated that all multipliers in n-valued with n>2 LFSRs and LFCSRs can be eliminated so that only 2-input functions are used.

Figure 53:
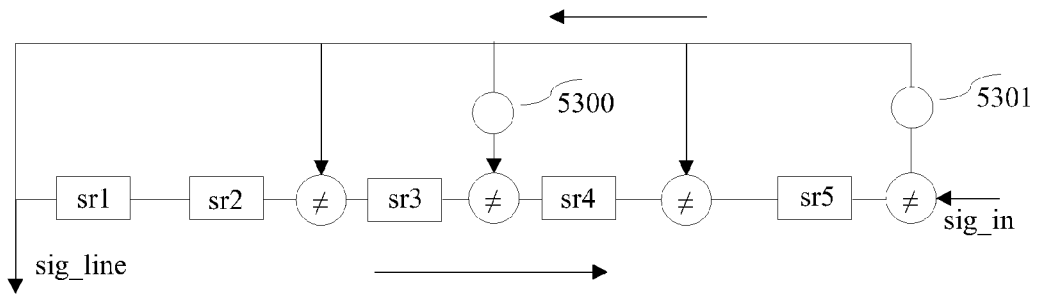
FIG. 53 is another diagram of a binary scrambler in Galois configuration in accordance with an aspect of the present invention.
Figure 54:
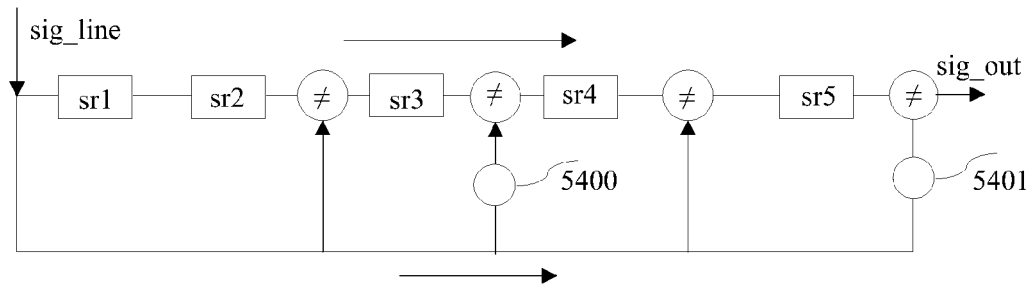
FIG. 54 is another diagram of a binary self-synchronizing descrambler in Galois configuration in accordance with an aspect of the present invention.

FIG. 53 and FIG. 54 show corresponding binary scrambler and descrambler with inverters 5300, 5301 and 5400 and 5401. These inverters can be eliminated by using EQUAL functions at the appropriate positions.

The effect of using inverters in binary sequence generators may be that the sequence will be inverted or that the sequence is shifted in phase. In both cases the absolute correlation number between such a sequence and sequences generated different inverter configurations of the generator will be the minimum number, indicating that the sequences are not in phase.

Figure 57:
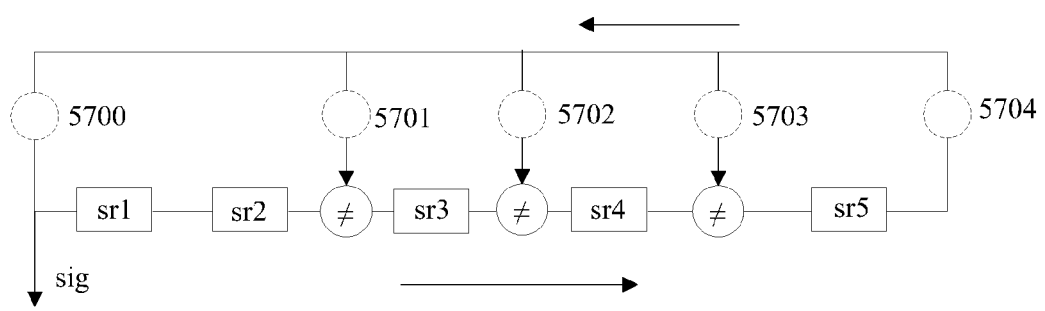
FIG. 57 is a diagram of possible binary sequence generators in Galois configuration in accordance with an aspect of the present invention.

A binary illustrative example of this method which is an aspect of the present invention is provided in a binary sequence generator as shown in FIG. 57. Herein one of the binary multipliers 5700, 5701, 5702, 5703 or 5704 is used in generating a binary m-sequence of 31 chips. Again a clock signal is assumed, though not shown. For each case the generator starts with shift register content [0 1 1 0 1]. For each generator with a different inverter the generated sequence is provided:

Inverter 5700: [0 0 0 1 1 0 0 1 0 0 1 1 1 1 1 0 1 1 1 0 0 0 1 0 1 0 1 1 0 1 0]

Inverter 5701: [1 1 1 1 0 0 1 1 0 1 1 0 0 0 0 0 1 0 0 0 1 1 1 0 1 0 1 0 0 1 0]

Inverter 5702: [1 1 0 0 0 0 0 1 0 0 0 1 1 1 0 1 0 1 0 0 1 0 1 1 1 1 0 0 1 1 0]

Inverter 5703: [1 0 1 0 0 1 0 1 1 1 1 0 0 1 1 0 1 1 0 0 0 0 0 1 0 0 0 1 1 1 0]

Inverter 5704: [0 1 1 0 1 1 0 0 0 0 0 1 0 0 0 1 1 1 0 1 0 1 0 0 1 0 1 1 1 1 0]

For instance using the sequence generated using Inverter 5700 as the baseline the sequence of Inverter 5701 is an inverted and shifted version of the sequence of Inverter 5700. The sequence of Inverter 5702 is a shifted version of the sequence of Inverter 5701; etc. One can generate additional sequence versions by using combinations of the Inverters. This method which is an aspect of the current invention applies to binary as well as to non-binary sequence generators. It provides a relatively simple method to create orthogonal sequences with minimal modifications and without changing initial shift register content.

It was shown here and elsewhere by the inventor that a combination of binary and n-valued inverters and a single 2-input (or 2-place) switching function can be reduced to an equivalent 2-input switching function. Conversely one can expand a single 2-input function into a 2-input switching function with inverters. Accordingly the scramblers, descramblers, sequence generators and detectors of the present invention that have no inverters can also be realized by equivalent circuits having functions and inverters. Accordingly scramblers, descramblers, sequence generators and detectors that have inverters and which can be reduced to equivalent scramblers, descramblers, sequence generators and detectors having no inverters and can perform in accordance with one or more aspects of the present invention are fully contemplated.

It has been demonstrated in earlier cited patent applications that multipliers can be avoided in LFSRs in Fibonacci configuration. It has been shown as an aspect of the present invention how a Fibonacci LFSR can be converted into a Galois LFSR. Accordingly it is possible to create Galois LFSRs wherein multipliers are avoided. Further more multipliers only play a role in n-valued LFSRs with n>2. For n=2 or the binary case a multiplier is either 0 or 1, which means either a connection is present or not.

In one embodiment of n-valued functions it is sometimes preferred to use adders and multipliers over $GF(2\hat{0}p)$ or in an extended binary field. This allows implementing adders and multipliers with binary circuits. In such a case it may not be beneficial to circumvent the use of multipliers. Accordingly it has been show how to create descramblers, scramblers, sequence generators and detectors with multipliers. It should be appreciated that a self synchronizing descrambler in Galois configuration having an LFCSR and having an appropriate descrambling function so that identical 2 inputs always provide an output in a first state, will serve as a self synchronizing detector for a sequence of n-valued symbols generated by an n-valued sequence generator with an LFSR with the same structure (taps, functions and shift register) as the LFCSR.

The general rules and configurations are provided for converting a Fibonacci structure LFSR into a Galois configuration; also a rule for converting a Galois configuration into a Fibonacci configuration was provided; further more a method was provided for determining the content of the shift register of a Galois configuration and a detector for detecting n-valued sequences. Also a descrambler in Galois configuration used in Fibonacci mode was provided and a Galois scrambler and corresponding self-synchronizing Galois descrambler was provided for binary and n-valued signals. The LFSR based scrambler and descrambler of which at least one is in Galois configuration may be part of a system of scrambling/descrambling wherein scrambler and descrambler are positioned in different apparatus and/or locations. The descrambler may have a LFCSR instead of an LFSR. Also a sequence generator and a sequence detector, wherein the sequence generator has an LFSR may be part of a system. The detector may be considered a descrambler with a non-reversible descrambling function, wherein the output of the descrambling function provides important information about a detected sequence.

A novel concept that was introduced is the Linear Forward Connected Shift Register or LFCSR. In a scrambler in Galois configuration such as FIG. 47 an LFSR is used. Herein the movement of symbols from input to output of the scrambler through the shift register is different from the direction of movement through the loop 4700 in FIG. 47. In a descrambler in Galois configuration such as shown in FIG. 48 all movement from symbols either through the shift register or through loop 4800 has the same direction. Accordingly the descrambler of FIG. 48 has an LFCSR. The structure of the LFSR of the Galois scrambler and the LFCSR of the corresponding LFSR are identical. This is intended as: the shift registers are identical with taps and functions in the same positions. Inverters, if included, occur in the same positions in LFSR and LFCSR. As explained in certain cases an inverter in an LFSCR connected to the input of the shift register of a scrambler may be the reverse of an inverter connected to the output of the LFSR of the corresponding scrambler.

It should be clear that the descrambler in Galois configuration with an LFCSR reverses the direction of movement of symbols as compared to the LFSR of the corresponding scrambler. Accordingly the input of the descrambler corresponds with the position of the output of the scrambler. The input of the scrambler (or an input of the scrambling function) corresponds with the output of the descrambler (or the output of the descrambling function). The output of the scrambling function of the scrambler corresponds with an input of the descrambling function in the descrambler.

It is here repeated that anywhere and anytime an LFSR or an LFCSR is used a clock signal to initiate the shift of content into an element of a shift register is assumed. If the LFSR or LFCSR is implemented in a processor such clock signal is implied by executing an instruction. Elements of a shift register that can hold a binary or n-valued symbol or a binary word representing an n-valued symbol may be realized as for instance latches or Flip-Flops. N-valued memory elements are enabled and disclosed in U.S. Pat. No. 6,133,754 by Olson, issued on Oct. 19, 2000 entitled Multiple-valued logic circuit architecture; supplementary symmetrical logic circuit structure (SUS-LOC). N-valued latches and memory elements are also disclosed by the inventor in U.S. patent application Ser. No. 11/139,835 filed May 27, 2005 entitled Multi-valued digital information retaining elements and memory devices which is incorporated herein by reference in its entirety. Scramblers, descramblers, sequence generators and sequence detectors, substantially in n-valued form with n>2 were disclosed by the inventor in earlier cited patent applications and in U.S. patent application Ser. No. 11/042,645, filed on Jan. 25, 2005 entitled Multi-valued scrambling and descrambling of digital data on optical disks and other storage media which is incorporated herein by reference in its entirety.

An n-valued or n-state symbol can have one of n-states with n>2. An n-state symbol can be represented by a signal that can assume one of n states. An n-state symbol can also be represented by a plurality of k-state symbols with k<n. A k-state symbol can be represented by a signal that can assume one of k states. Accordingly, an n-state symbol can be represented by a plurality of k-state signals. For instance an 8-state symbol can be represented by at least 2-state symbols. The finite field $GF(n=2^p)$ may be an extension of the finite binary field GF(2). If the field GF(2) is defined in using 2-valued arithmetic, then the field $GF(n=2^p)$ may be defined using similar operations to define elements in $GF(n=2^p)$ wherein a symbol in $GF(n=2^p)$ may be represented by a word of p bits.

An n-state symbol may be processed by an n-valued logic function. Under certain circumstances an n-state symbol may be represented by a plurality of k-state symbols with k<n and the plurality of k-state symbols may be processed by a plurality of k-valued logic functions. The result of such a processing may be another plurality of k-state symbols representing an n-state symbol.

Under certain conditions the processing of a first plurality of k-state symbols representing a first n-state symbol with a first plurality of k-state logic functions will generate a second plurality of k-state symbols representing a second n-state symbol. This processing by a plurality of k-valued functions is equivalent to the processing of the first n-state symbol by a first n-valued logic function into the second n-state symbol when $GF(K^p)$ is an extension field of GF(k).

Herein a field $GF(n=2^p)$ will be called an extension field or and extension finite field or an extended field of GF(2). Because binary operations are currently the preferred switching technology at the time of the invention, the examples provided herein use binary extension fields. It is to be understood that extension fields for other values of k may be created and applied and are fully contemplated.

Figure 58:
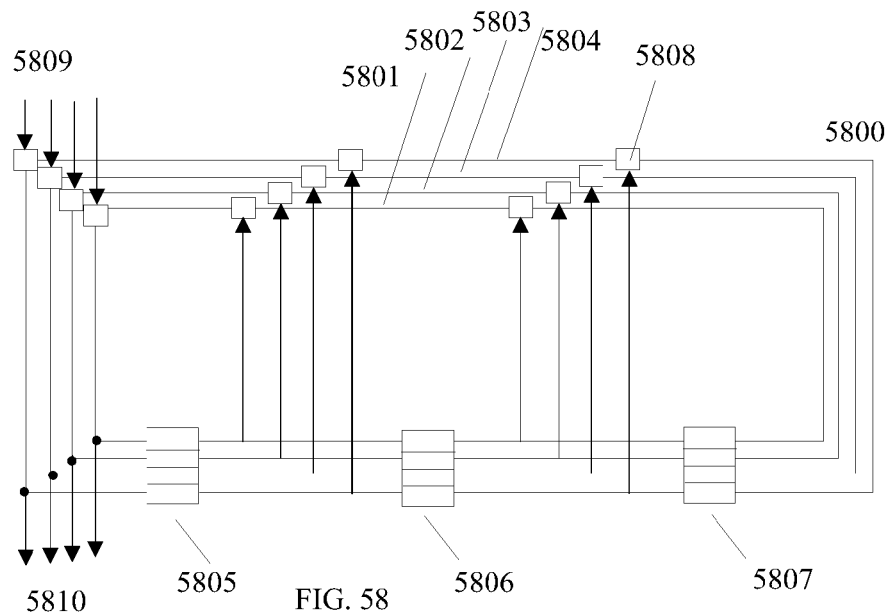
FIG. 58 is a diagram showing a scrambler in accordance with an aspect of the present invention.
Figure 59:
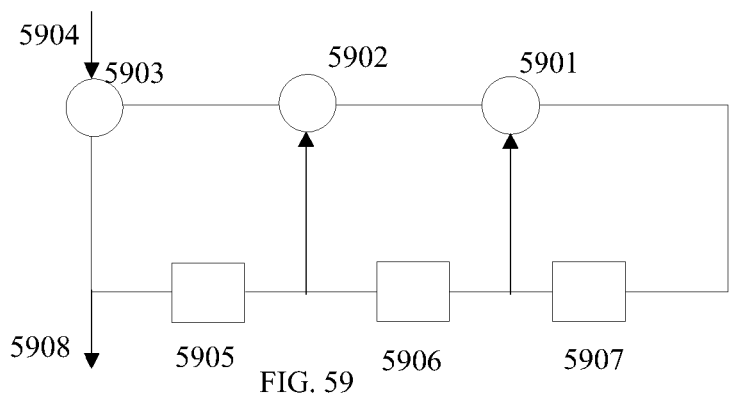
FIGS. 59-61 are diagrams showing a scrambler in accordance with one or more further aspects of the present invention.

FIG. 58 shows a 16-state LFSR based scrambler 5800 in binary form. Its 16-state form is shown in FIG. 59. The scrambler 5800 is comprised of 4 parallel LFSRs 5801, 5802, 5803 and 5804. A 16-state symbol is represented by a binary word of 4 bits. Each word can be stored in parallel in shift register elements 5805, 5806 and 5807 each able to store and shift 4 bits. This LFSR has no multipliers or inverters. This means that feedback is straight forward within an LFSR to a XOR function in the LFSR. For instance 5808 is a diagram of an XOR device. In fact all squares similar to 5808 indicate a binary XOR function. Numerals are not provided to prevent the diagram from becoming unreadable. An input 5809 is provided with a word of 4 bits to be scrambled and the input is actually made up from 4 individual inputs. The output 5810 (which are of course in binary form 4 individual outputs) provides the scrambled 16-state symbol in binary form as 4 bits.

One can imagine that such a scrambler can be used to scramble a symbol for a QAM-16 system. A/D and D/A converters can be used to create the actual 16 valued symbols or to create a 4 bit word in order to process the 16-state symbol in binary form. It was explained in earlier cited U.S. patent application Ser. No. 12/137,945 that the scrambler executes a 16-state LFSR scrambler using 16-state adders over GF(16). One can see that without inverters the scrambler is actually made from 4 individual binary scramblers.

The diagram of FIG. 58 is equivalent with the diagram of FIG. 59 wherein all elements are 16-state elements. Shift register elements 205, 206 and 207 can store and shift 16 state symbols. Functions 5901, 5902 and 5903 are adders over GF(16). The 16-state symbols may be inputted on 5904 and the scrambled 16-state symbols are outputted on 5908. In the binary implementation 16-state symbols are processed as $2^4$-symbols or as 4-bit words.

The LFSR of FIG. 58 and its equivalent form in FIG. 59 are not optimal in scrambling. One may look at the LFSR in a sequence generation configuration, which is the form as in FIG. 59 wherein the function 5903 is shorted. The optimal form of the LFSR for scrambling is wherein the LFSR will generate a maximum length 16-state symbol sequence. In that case the scrambler with such an LFSR is least sensitive to sequences to be scrambled with certain repetitive patterns such as all 1 bits words or all 0 bits words.

Figure 60:
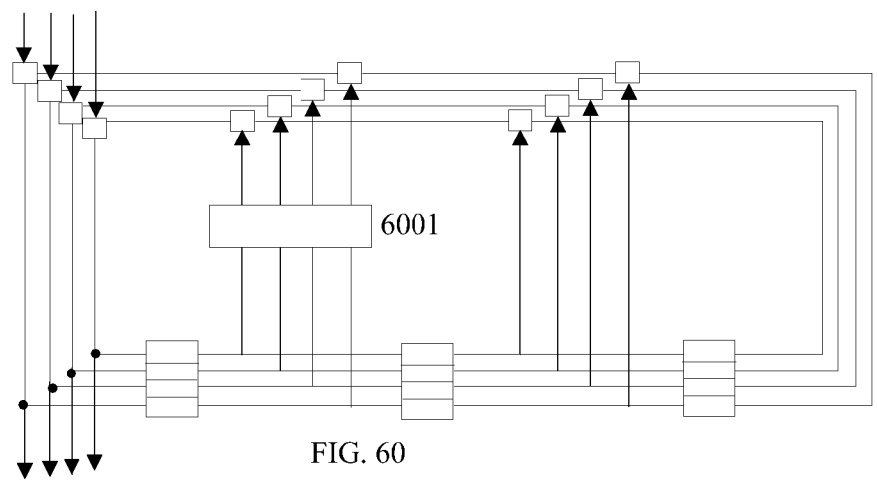
Figure 61:
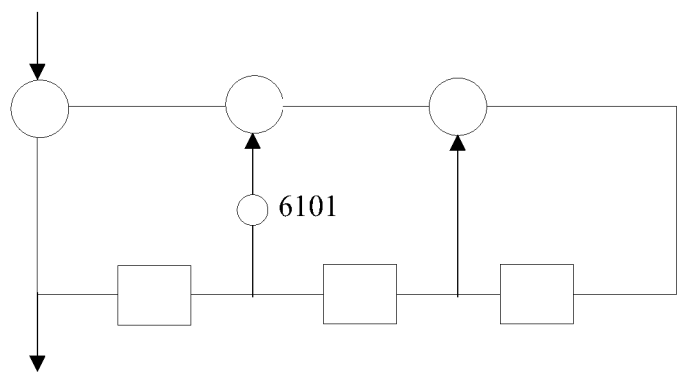

Such an optimal LFSR usually can be realized by inserting an n-state (in this case a 16-state) reversible inverter. Such a reversible inverter may be an n-valued multiplier over GF(n). It may also be an inverter that does not transform state 0 into state 0, which may be called a non-zero based n-state reversible inverter. Such an inverter 6101 is shown in FIG. 61 which is almost identical to FIG. 59 except of course for the inverter. This is equivalent to the binary implementation as shown in FIG. 60 with inverter 6001.

An 8-state reversible inverter may be [0 1 2 3 4 5 6 7]→[0 3 4 5 6 7 1 2]. The inversion is provided by the states in corresponding positions. It shows that state 0 always remains state 0, while state 7 is inverted to state 2. Herein inverters will be displayed as horizontal vectors. They may also be displayed as vertical vectors. The above zero-based inverter is shown in vertical form in the following table. A binary representation is also provided.

| 0 |   | 0 | 000 |   | 000 |
|---|---|---|-----|---|-----|
| 1 |   | 3 | 001 |   | 011 |
| 2 |   | 4 | 010 |   | 100 |
| 3 |   | 5 | 011 |   | 101 |
| 4 | → | 6 | 100 | → | 110 |
| 5 |   | 7 | 101 |   | 111 |
| 6 |   | 1 | 110 |   | 001 |
| 7 |   | 2 | 111 |   | 010 |

It was shown in for instance earlier cited U.S. patent application Ser. No. 12/137,945 by the inventor that multipliers over GF(n) may be realized easily in binary combinational circuitry in binary form. One may of course also apply memory based inverters wherein for instance an incoming word may be considered as a memory address and the content of the memory address is the inverted word as shown for instance in the above table. Some inverters can be realized by simple inversion. For instance the reversible 8-state non-zero-based inverter [0 1 2 3 4 5 6 7]→[7 6 5 4 3 2 1 0] in binary form requires only inversion of each bit in a word, as can be determined from the following table.

| 0 |   | 7 | 000 |   | 111 |
|---|---|---|-----|---|-----|
| 1 |   | 6 | 001 |   | 110 |
| 2 |   | 5 | 010 |   | 101 |
| 3 |   | 4 | 011 |   | 100 |
| 4 | → | 3 | 100 | → | 011 |
| 5 |   | 2 | 101 |   | 010 |
| 6 |   | 1 | 110 |   | 110 |
| 7 |   | 0 | 111 |   | 000 |

The following table shows a truth table for an adder over GF(8).

| +GF(8) | 0 | 1 | 2 | 3 | 4 | 5 | 6 | 7 |
|--------|---|---|---|---|---|---|---|---|
| 0 | 0 | 1 | 2 | 3 | 4 | 5 | 6 | 7 |
| 1 | 1 | 0 | 4 | 7 | 2 | 6 | 5 | 3 |
| 2 | 2 | 4 | 0 | 5 | 1 | 3 | 7 | 6 |
| 3 | 3 | 7 | 5 | 0 | 6 | 2 | 4 | 1 |
| 4 | 4 | 2 | 1 | 6 | 0 | 7 | 3 | 5 |
| 5 | 5 | 6 | 3 | 2 | 7 | 0 | 1 | 4 |
| 6 | 6 | 5 | 7 | 4 | 3 | 1 | 0 | 2 |
| 7 | 7 | 3 | 6 | 1 | 5 | 4 | 2 | 0 |

The above table is shown next in binary form, wherein binary words are assigned according to a definition over GF(8).

| +GF(8) | 000 | 100 | 010 | 001 | 110 | 011 | 111 | 101 |
|--------|-----|-----|-----|-----|-----|-----|-----|-----|
| 000 | 000 | 100 | 010 | 001 | 110 | 011 | 111 | 101 |
| 100 | 100 | 000 | 110 | 101 | 010 | 111 | 011 | 001 |
| 010 | 010 | 110 | 000 | 011 | 100 | 001 | 101 | 111 |
| 001 | 001 | 101 | 011 | 000 | 111 | 010 | 110 | 100 |
| 110 | 110 | 010 | 100 | 111 | 000 | 101 | 001 | 011 |
| 011 | 011 | 111 | 001 | 010 | 101 | 000 | 100 | 110 |
| 111 | 111 | 011 | 101 | 110 | 001 | 100 | 000 | 010 |
| 101 | 101 | 001 | 111 | 100 | 011 | 110 | 010 | 000 |

The above truth table demonstrates two aspects of adders over $GF(2^p)$ when p>2. The first aspect is (which applies to all adders over $GF(2^p)$) that the sum over $GF(2^p)$ is achieved from inputs by applying to individual corresponding bits a XOR function. The second aspect is that states over $GF(2^p)$ for p>2 do not conform with the actual binary representation of the decimal value of a state. One may rearrange the truth table according to the decimal value that each word represents as is shown in the following table GFm(8).

| +GFm(8) | 000 | 001 | 010 | 011 | 100 | 101 | 110 | 111 |
|---------|-----|-----|-----|-----|-----|-----|-----|-----|
| 000 | 000 | 001 | 010 | 011 | 100 | 101 | 110 | 111 |
| 001 | 001 | 000 | 011 | 010 | 101 | 100 | 111 | 110 |
| 010 | 010 | 011 | 000 | 001 | 110 | 111 | 100 | 101 |
| 011 | 011 | 010 | 001 | 000 | 111 | 110 | 101 | 100 |
| 100 | 100 | 101 | 110 | 111 | 000 | 001 | 010 | 011 |
| 101 | 101 | 100 | 111 | 110 | 001 | 000 | 011 | 010 |
| 110 | 110 | 111 | 100 | 101 | 010 | 011 | 000 | 001 |
| 111 | 111 | 110 | 101 | 100 | 011 | 010 | 001 | 000 |

This rearrangement does not fundamentally change the working of the binary implementation. However it does change the relationship between LFSRs over GF(21) in $2^p$-state form and those in binary representations in binary words when inverters are involved.

It is to be understood that at any time the relationship between binary and $2^p$-state representation can be restored by assigning the correct states to an inverter. However, one may also create LFSRs wherein words of p-bits are being processed without directly considering the GF(n) representation.

Figure 62:
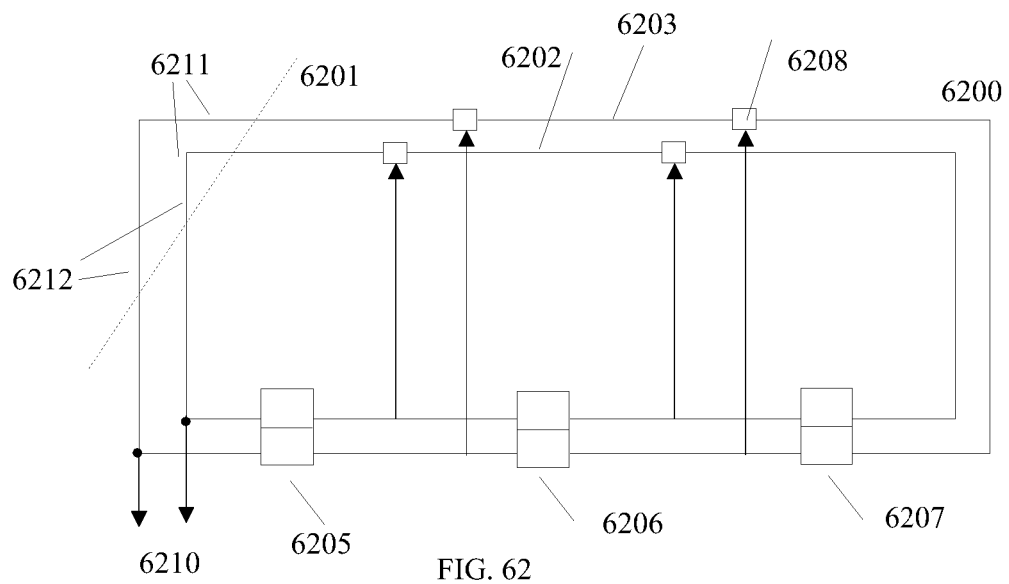
FIGS. 62-66 show a diagram of Linear Feedback Shift Register (LFSR) based sequence generators in accordance with aspects of the present invention.

In the above context an LFSR 6200 over GF(4) in binary form is provided in FIG. 62. Herein each 4-state symbol is represented by 2 bits. The LFSR in compliance with earlier definitions such as in U.S. patent application Ser. No. 12/137, 945 is defined as the circuit to the right of line 6201. The combination 6211 may be considered an output of the LFSR and the combination 6212 an input. A connection between 6211 and 6212 may create a sequence generator. Inserting two XOR functions may create a scrambler. The two LFSRs 6202 and 6203 work independently of each other it seems. The connecting event between the two LFSRs is a clock signal which allows the shift register elements 6205, 6206 and 6207 to shift at the same moment. Each shift register element stores two bits. A clock signal is assumed but not shown in order to keep the diagrams uncluttered. The feedbacks are implemented through an XOR function 6208. Each small square like 6208 indicates a device implementing an XOR function. The circuit of FIG. 62 provides an output of 2 bit words on output 6210. One may apply for instance a D/A converter to create actual 4-valued signals. One may also convert each word of p bits in a physically independent signal. For instance into a light signal wherein a wavelength determines a state.

Figure 63:
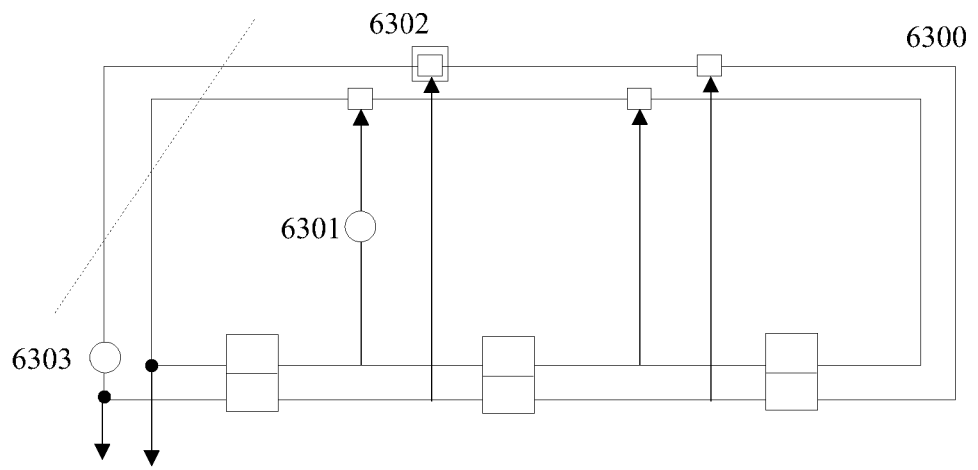

One may change the working of the combined binary LFSRs in different ways. For instance one may insert a binary inverter [0 1]→[1 0] into a feedback tap. This is shown in FIG. 63 in LFSR 6300 as 6301. One may also change an XOR function into an EQUALITY function (=) as is shown in 6302 as the double square. Furthermore, one may also insert a binary inverter in any other connection, for instance as shown in FIG. 63 as 6303.

Figure 64:
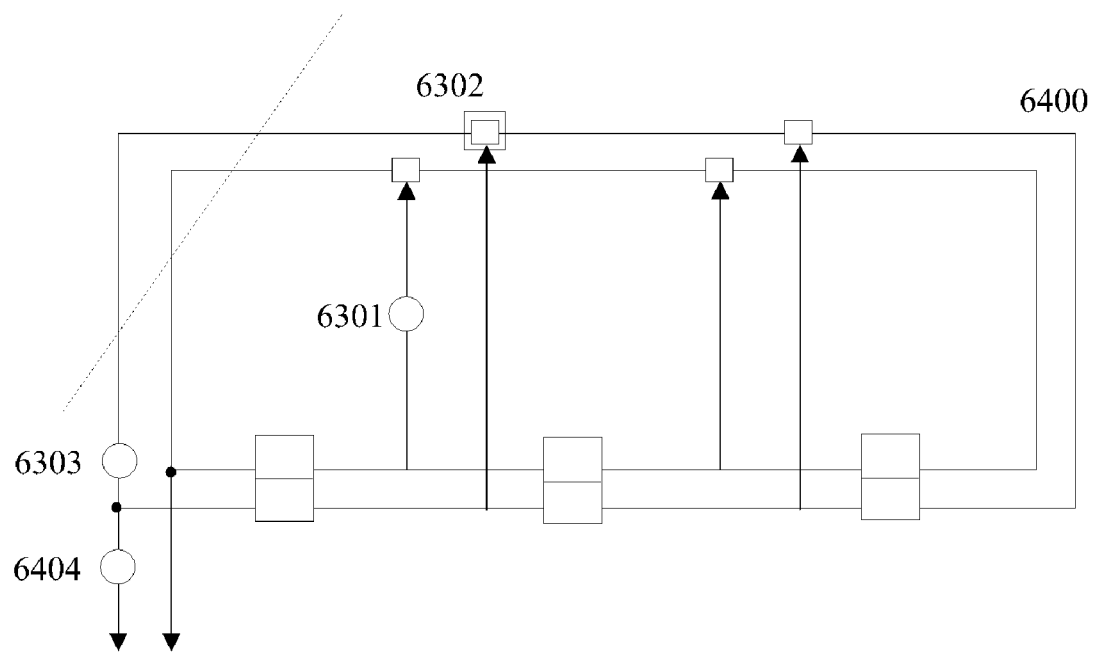

One may also insert as is shown in FIG. 64 in LFSR 6400 a binary inverter 6404 in the output of a sequence generator or of a scrambler. This will change the appearance of a sequence. However, such a change is external to the LFSR.

How great the variety of a sequence generated through a binary LFSR is may be determined by the sequences that are generated by the LFSR in sequence generation form. The variety is determined by a sequence of $2^p$ state symbols represented by p binary words, and not by the binary LFSRs. In general identical p binary LFSRs will not generate pseudo-random like $2^p$ state sequences. Sequences may change in phase, depending on the initial content of the shift registers. However, if p LFSRs will not generate a $2^p$ state pseudo-random sequence a phase shift in the binary shift registers will generally not generate a $2^p$ state sequence that is pseudo-random.

There are several ways to create $2^p$ pseudo-random LFSR based sequence generators. One way is to design a sequence generator with n=$2^p$-state commutative functions and multipliers and zero-based n=$2^p$-state inverters. Such an approach for a 4-state sequence generator was explained by Derek Paul Rogers in his 1995 Ph. D. thesis "Non-binary spread-spectrum multiple-access communications". One may also take a more general approach using also non-commutative n-state reversible switching functions and non-zero based reversible inverters for n=$2^p$ wherein p can also be greater than 2, an aspect that was deliberately not investigated by the Rogers reference, but was extensively described by the inventor for instance in U.S. patent application Ser. No. 10/935,960 filed on Sep. 8, 2004 which is incorporated herein by reference in its entirety.

One may then translate the designed n-state sequence generator into binary form. This is a valid approach. However, except for adders over GF(n=$2^p$) almost none of the n-state switching functions are easy to implement in binary logic. An approach provided herein as an aspect of the present invention is to use as much as possible binary components, including: functions implementing XOR and EQUIVALENT functions, binary inverters, binary shift registers and binary state generators. For instance a binary state 0 may be generated by ground and binary state 1 by a power source. A binary state may also be generated by a signal with a defined wavelength for instance. Inverters, such as multipliers over GF(n) may be implemented by binary combinational logic circuitry. In certain instance also table or memory based inverters may be applied.

One way to define a pseudo-random sequence is by a correlation, including an auto-correlation as well as a cross-correlation with another sequence. A novel method of determining a correlation value for n-state sequences was provided by the inventor earlier. For instance in U.S. Patent Application (optical disks) which is incorporated herein by reference in its entirety. The novel method of determining a correlation value between two n-state symbols includes adding a fixed value to a sum when the two n-state symbols are identical. One may also subtract a fixed value when two symbols are different. Such a value may be zero, it may be positive and it also may be negative. The value is not dependent upon a state of a symbol. It was shown in the earlier cited U.S. patent application Ser. No. 12/137,945 how one may compare words of p bits as n-state symbols and how this creates a simple correlation graph which is improved over a correlation graph of a binary sequence.

In accordance with one aspect of the present invention a set of n-state pseudo-random generators is provided wherein the cross-correlation has a strict upper limit, wherein the generators differ by a single element. This approach may also be used in binary sequence generators. The background of the approach is to invert all symbols in an n-state sequence in such a way that no symbols in the inverted sequence are not-inverted. One can thus create a set of n n-state pseudo-random sequences which are inverted versions without overlap. For instance in a 4-state sequence one may use the inverters [0 1 2 3]→[1 0 3 2], [0 1 2 3]→[2 3 0 1] and [0 1 2 3]→[3 2 1 0] to create the desired sequences.

Figure 65:
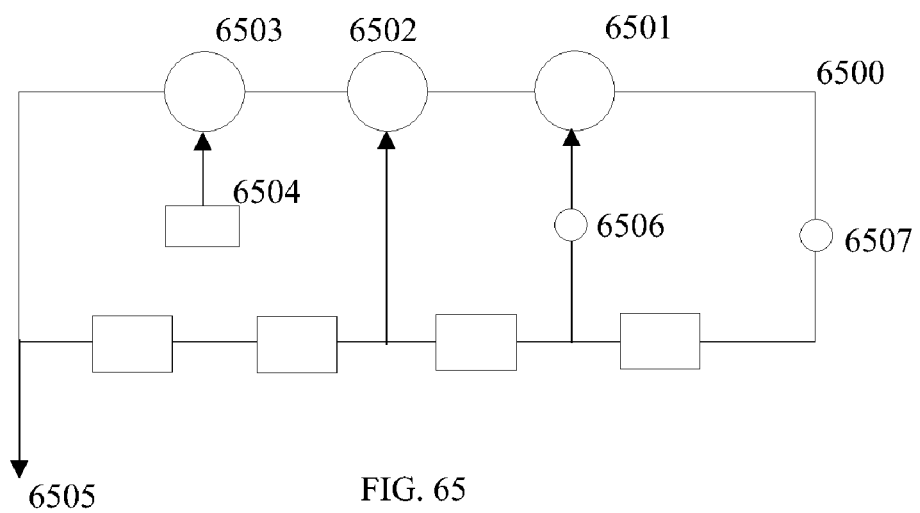

FIG. 65 shows a 4-state sequence generator 6500 with a 4-state shift register with 4 shift register elements and 3 devices implementing an adder over GF(4): 6501, 6502 and 6503. There are also 2 4-state inverters: 6506 implementing [0 1 2 3]→[0 2 3 1] and 6507 implementing [0 1 2 3]→[0 3 1 2]. Also a source 6504 is provided on an input of 6503 which may provide a signal with either state 0, 1, 2 or 3. In general one may consider state 0 to be an open connection. A sequence of 255 4-state symbols (=$4^4$-1) is provided on output 6505. Again, a clock signal driving the LFSR is assumed but not shown.

Figure 66:
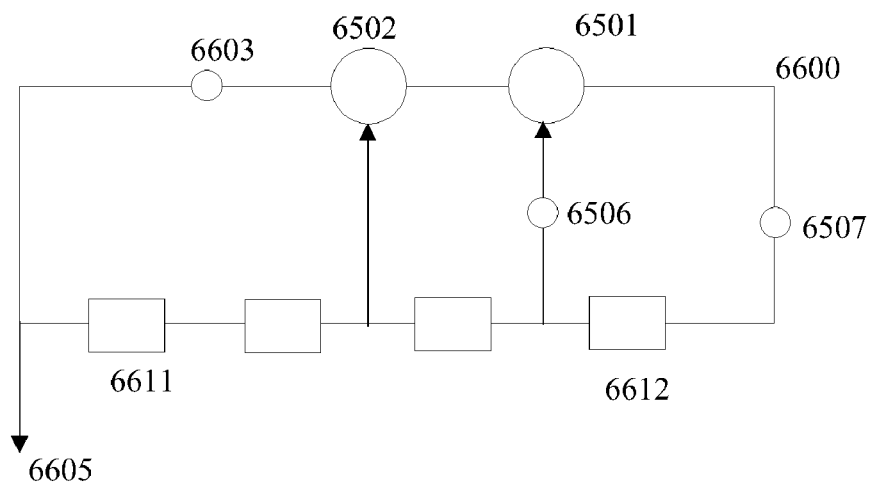

The states represented by the source replace the use of the non-zero based inverters provided earlier. This is shown in FIG. 66. Generator 6600 of FIGS. 66 and 6500 of FIG. 65 are equivalent. Generator 6600 provides identical sequences on 6605 as generator 6500 on 6505 depending of course on the initial condition of the shift registers. However, the adder over GF(4) 6503 with the source 6504 have been replaced with an inverter 6603. The inverter 6603 may be identity ([0 1 2 3]→[0 1 2 3]) or [0 1 2 3]→[1 0 3 2], [0 1 2 3]→[2 3 0 1] or [0 1 2 3]→[3 2 1 0], which are non-zero based inverters.

Figure 67:
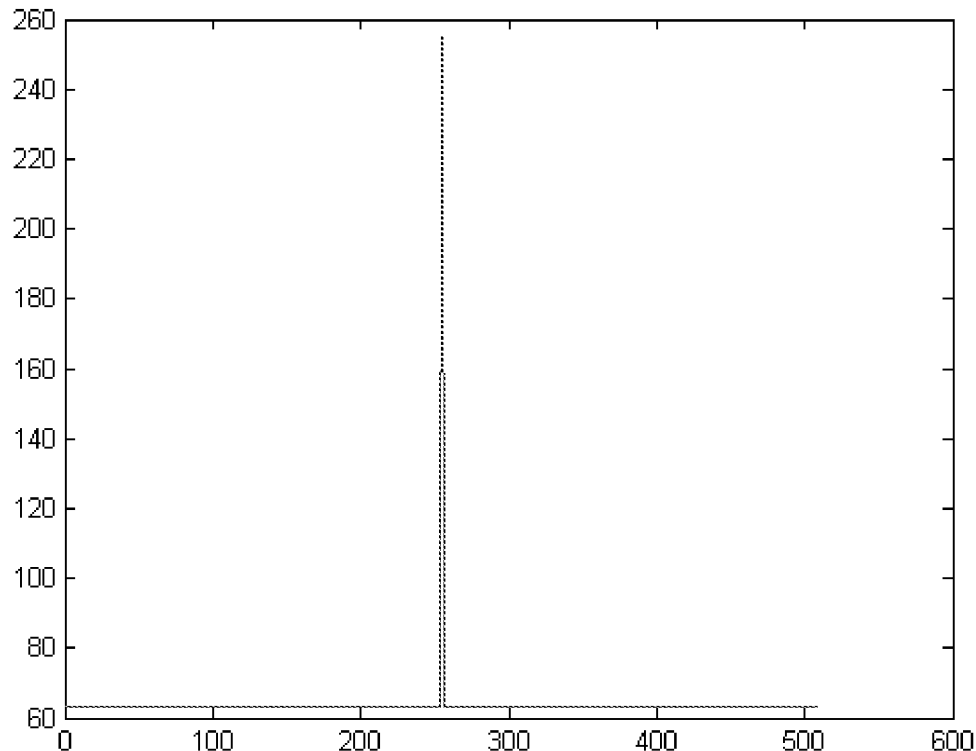
FIGS. 67-69 show correlation graphs in accordance with an aspect of the present invention.
Figure 68:
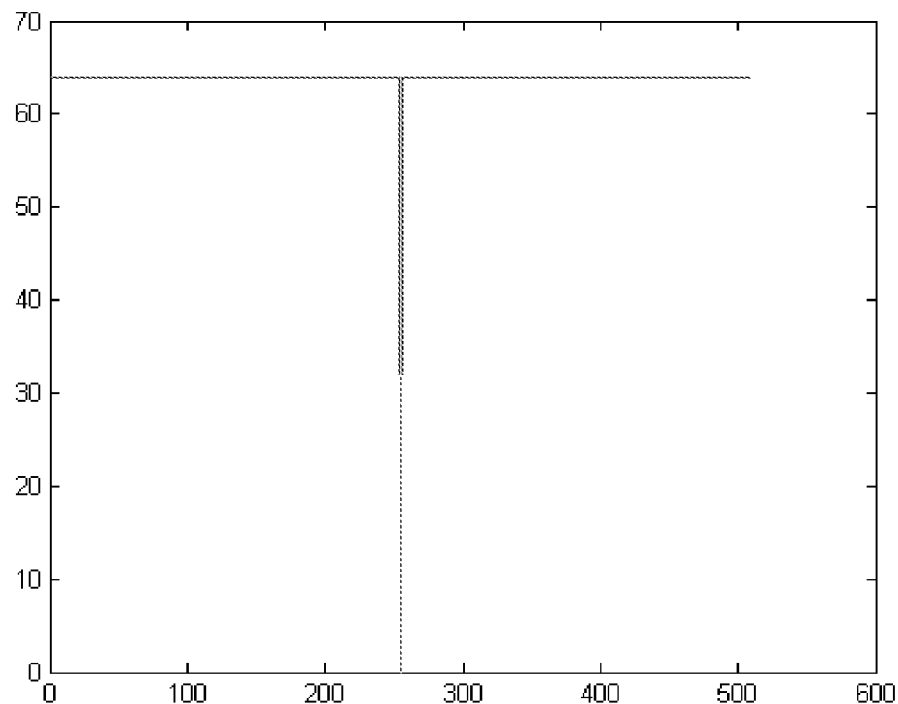
Figure 69:
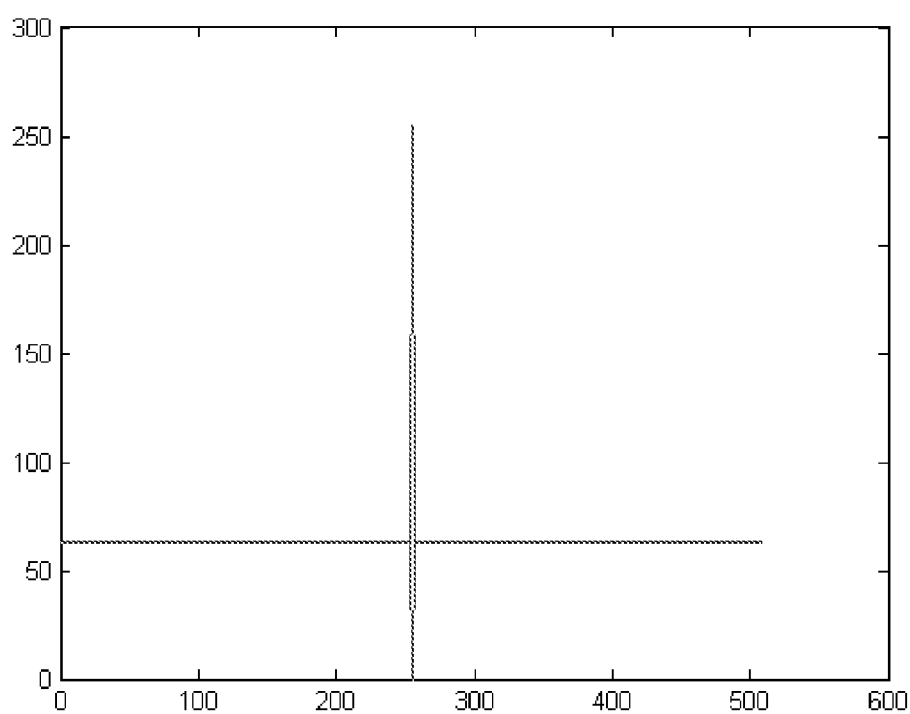

FIG. 67 shows an auto-correlation graph generated according to the earlier provided method for the 255 4-state sequences generated according to the generator of FIG. 65 or 66. FIG. 68 shows a cross-correlation between each of the sequences. FIG. 68 shows that when two of the set of 4 sequences are aligned there are no corresponding identical 4-state symbols. FIG. 69 shows the combined auto-correlation and cross-correlation graphs. One may in certain applications, such as spread spectrum applications use the set of 4 sequences and their shifted versions, instead of just one sequence and its shifted version.

The correlation (including auto-correlation and cross-correlation) of n-state symbols, including when an n-state symbol is represented by a binary word may be determined in accordance with a further aspect of the present invention. In classical correlation methods a number corresponding to a state of a symbol is multiplied with a number corresponding to the state of the symbol with which it is compared. A simpler method in accordance with an aspect of the present invention is applied herein. Two n-state symbols, or two words for instance binary words representing the two n-state symbols, are compared. If the two symbols, or their representation, are identical a number, for instance 1, may be added to a sum. The number may be the same for each pair of identical symbols. The number may also depend on the state of the identical pair. If two compared symbols, or their representations are not identical, one may leave the sum unchanged; one may also subtract from the sum a fixed number when a pair of symbols or their representations are not identical; one may also subtract a number depending on only one of the symbols of the pair that has no identical symbols or symbol representations.

One preferred embodiment of creating a $2^p$-state LFSR is by using only binary switching devices and state resources and no inverters realized by memory tables. One problem in creating a $2^p$-state LFSR with binary LFSRs is that the maximum length of the $2^p$-state LFSR with k $2^p$-state shift register elements is $(2^p)^k-1$, while the maximum length of a binary LFSR with k elements is $2^k-1$. Inverters, such as for instance multipliers, act like a switch between at least two parallel LFSRs and create a maximum length binary sequence that is longer than provided by using a single LFSR.

Figure 70:
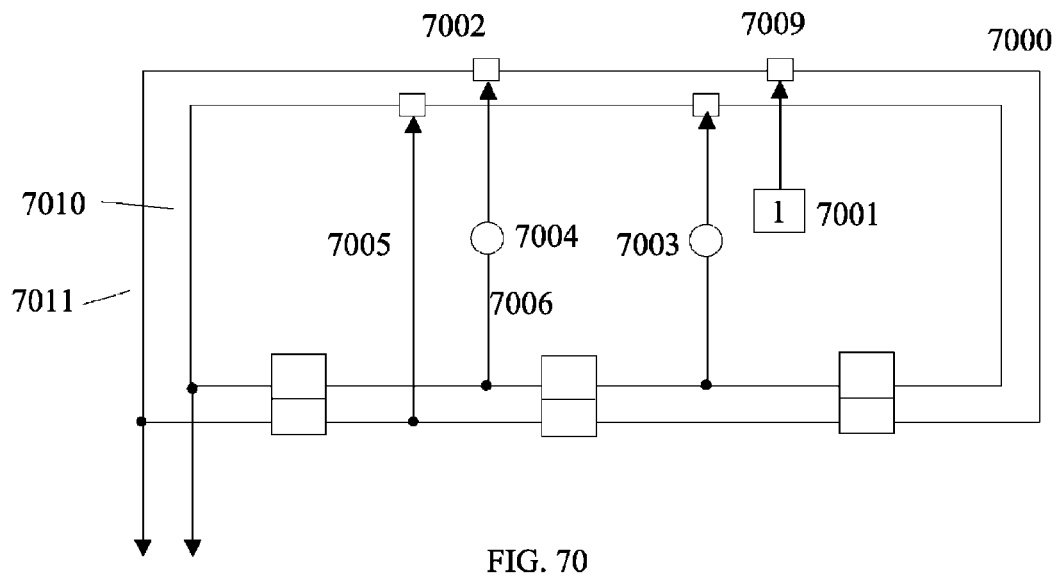
FIGS. 70-71 show a diagram of a Linear Feedback Shift Register (LFSR) based sequence generators in accordance with an aspect of the present invention.

This aspect of the present invention is illustrated in FIG. 70. For demonstration purposes a 4-state LFSR in a 4-state sequence generator is provided. In accordance with a further aspect of the present invention one may apply this approach also to $2^p$-state LFSRs in binary form with p>2 and n>4 for instance for n=8 and n=16 or n=4096 or any n-state LFSR that requires to be implemented in binary logic. In FIG. 70 one can distinguish two binary LFSRs 7010 and 7011, each with three binary shift register elements. The feedback in the LFSRs is through a device implementing a XOR function, shown as little squares of which 7002 and 7009 are two examples. XOR device 7009 is provided on one input with a constant source 1. This is an aspect of the invention that was explained above. One feedback tap also has an inverter 7003. The switch between the two LFSRs 7010 and 7011 takes place in taps 7005 and 7006. Tap 7006 connects the outer LFSR 7011 with the inner LFSR 7010 through an XOR device. Tap 7006 connects inner LFSR 7010 with outer LFSR 7011 through an XOR device.

Figure 71:
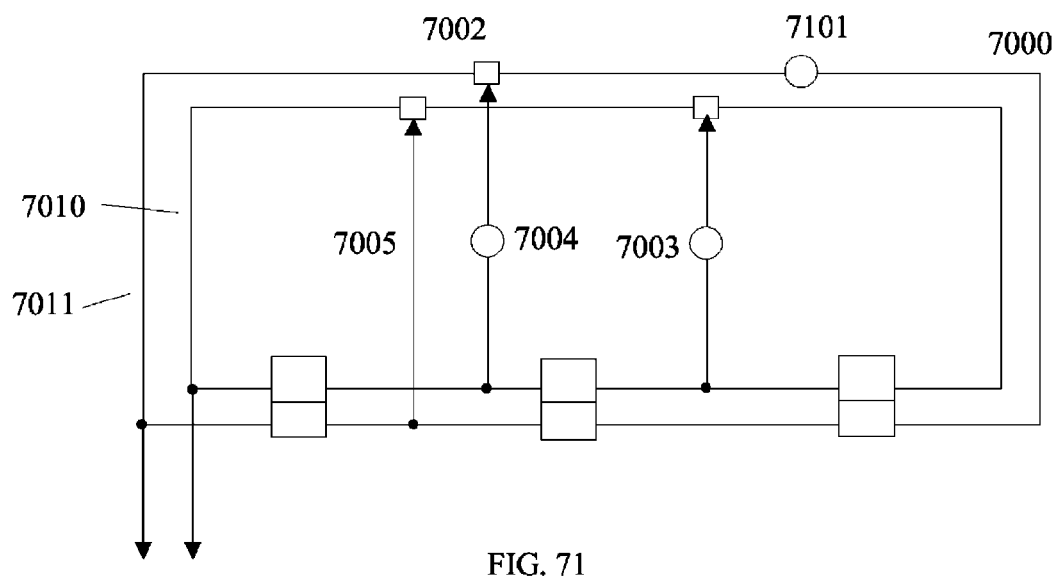

One may replace in FIG. 70 the source 7001 which always provides state 1 and the XOR device 7009 by the binary inverter 7101 in FIG. 71. The sequence generators 7000 of FIGS. 70 and 71 are functionally identical. One may further reduce component counts for instance by replacing XOR device 7002 and inverters 7004 and 7101 at its inputs by a device implementing an EQUALITY (=) function. Possible binary logic reductions are assumed to be known as equivalent.

The thus created sequence generator formed by cross-linking at least two binary LFSRs being individual binary sequence generators of p binary LFSR based sequence generators may be maximum length sequence generator of a $2^p$-state symbol sequence. The two 63 binary symbol sequences created by the generator of FIG. 70 or 14 are: [000010000110001010011110100011100100101101110110101011111110] and [011010010001001100-101010000011110111100111010110000101110011] which are shifted versions of each other. Combining two corresponding bits in each sequence into a 4-state symbol creates the 4-state sequence [0110300102210031201232302000233113013132033303211220212133222231] wherein each 4-state symbol is a 2-bits word.

Figure 72:
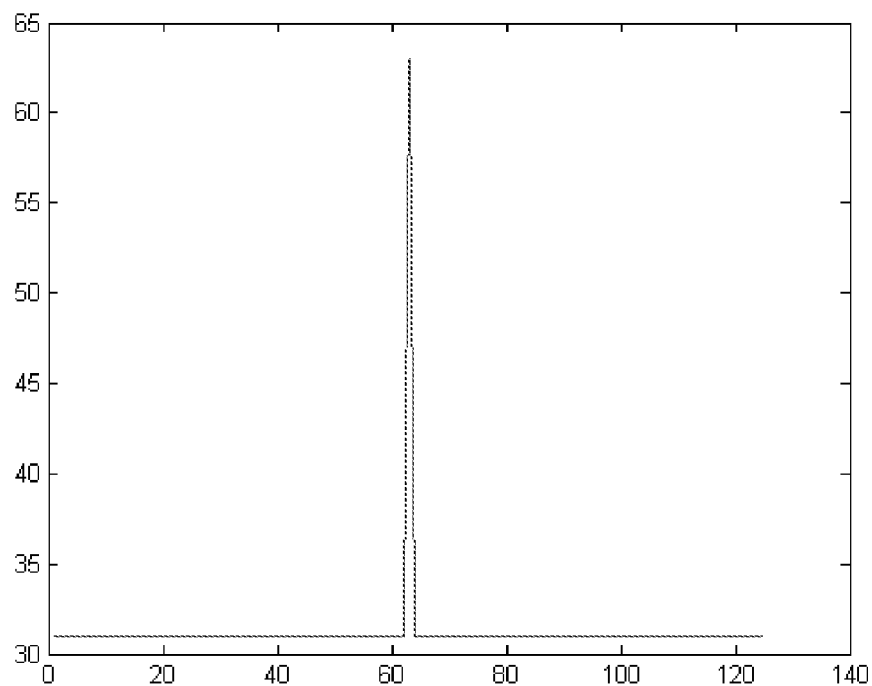
FIGS. 72-73 show correlation graphs in accordance with an aspect of the present invention.
Figure 73:
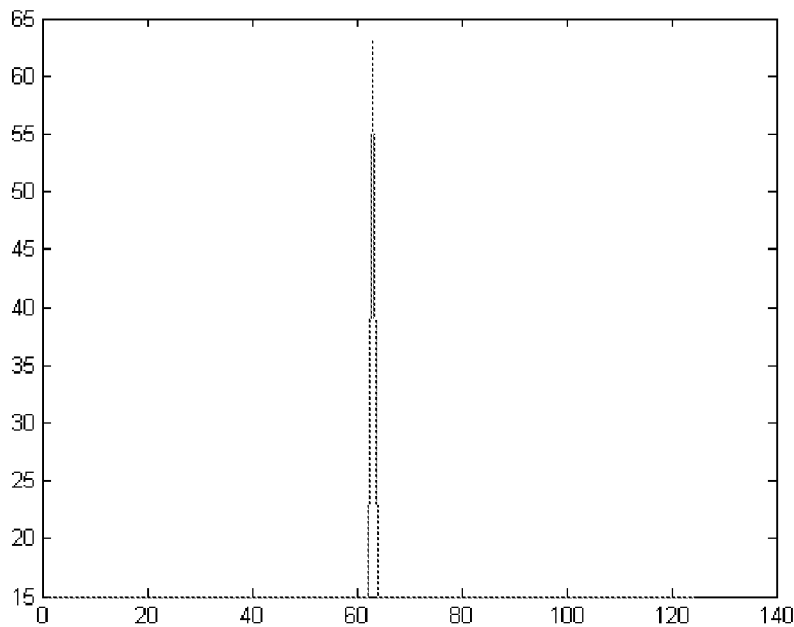

FIG. 72 and FIG. 73 show the auto-correlation graph for the binary and the 4-state sequence respectively. These graphs are determined by the comparison method provided earlier wherein a 1 is added if symbols are identical and nothing is added or subtracted if they are not identical. The 4-state auto-correlation clearly has a better performance against for instance noise and other disturbances as its base value is 15 and peak 63, versus basis value 31 and peak 63 in the binary case. One may also apply different correlation calculations.

One may generate different 4-state sequences by changing the configuration. A simple change is for instance to remove the inverter 7101 in FIG. 71. One may also place the "switching taps" after the first shift register element. One may place inverters at different places in taps and in an input or an output of a switching device. One may also increase the number of shift register elements.

Another way to generate $2^p$-state maximum length sequences is by starting out with a binary maximum-length sequence generator. One may then take a shifted version of the generated sequence for instance as is shown in FIG. 74. In FIG. 74 7400 may be a binary maximum length sequence (ML) generator, generating a binary ML sequence 7401 of for instance length 63. One may create an out-of-phase version 7402 of the sequence by inserting a shift register element that delays the sequence by at least one symbol. The delayed sequence is then outputted on 7403. Both the original and the delayed sequence may then be combined in symbols created from 2-bits words in 7405 and a ML 4-state sequence is outputted on 7406. One may repeat the delay as shown in FIG. 75 by delaying the delayed sequence in a shift register 7504 and creating a delayed sequence on 7505. In 7506 one may combine all bits and for instance with a D/A converter create an n-state symbol on 7507 or provide the equivalent binary word on 7507. This method of combining will generate a sequence of symbols wherein a symbol is represented by 3-bits, and wherein the sequence has a correlation graph that is an 8-state ML sequence.

Assume the binary ML sequence of 63 bits is [001000100110010101000000111110111100111010110000101110001101101]. A delayed or shifted version of the sequence may be [0100010011001010100-000011111011110011101011000010111000110110110].

Combining corresponding bits will generate the 4-state sequence [02100210231021212100000233331233310233-12123100021233310023123121].

One may combine with an again delayed sequence as shown in FIG. 18, thus creating an ML 8-state sequence:
[241024126512434341000026777536775126753436510024367510265365341].

Accordingly, one may use at least three methods to generate an n=$2^p$-state ML sequence from binary circuitry: (a) by designing an n-state sequence generator and implementing all components in binary form; (b) by generating a binary ML sequence and combining with p delayed instances of the ML sequence into p bits words based symbols; (c) by using parallel binary LFSRs with cross-connections between the LFSRs.

One may use the n=$2^p$-state ML sequences in different ways. One may transform each p bit word into for instance a n=$2^p$-state symbol for transmission, for instance in QAM-n=$2^p$ state signal transmission in for instance video signal transmission or mobile phone transmission. One may also generate from a n=$2^p$-state word of p bits an n-state Phase Shift Key or Frequency Shift Key signal.

In general in n=$2^p$-state symbol modulation, especially wherein a phase or an amplitude is modulated in a constellation one will try to even out the energy in a channel over the symbols. For instance in QAM-n=$2^p$ state signal transmission one would prefer a low Peak-to-Average ratio.

A current way of scrambling QPSK or NPSK (n-Phase shift key modulation) is by adding a pseudo-random phase shift to a phase shift that represents a symbol. One may try to do the same in QAM. Because a QAM signal has two components (phase and amplitude) the scrambling by modifying the signal by modulation is not preferred. It would be easier to scramble a symbol when it still can be processed as a logic symbol.

FIG. 76 shows an illustrative example of an n-state logic scrambler. A unit 7601 generates an n-state sequence, which preferably is a ML pseudo-random sequence which can be repeated in the descrambling phase. The sequence of n-state symbols is generated as a sequence 'seqn' and is inputted on a device implementing a scrambling function 'sc1', which is preferably a reversible n-state logic function. On a second input a sequence of n-state symbols 'sign' is provided. The device implementing 'sc1' generates a sequence of n-state symbols 'scramn'.

One may descramble the sequence 'scramn' of scrambled n-state symbols as shown in diagram in FIG. 77. Herein a device 7601 also generates a sequence 'seqn' of n-state symbols which is inputted to a device implementing a descrambling n-state function 'ds1'. Function 'ds1' reverses 'sc1' with 'seqn' as a known input. The sequence of scrambled n-state symbols 'scramn' in inputted to the device implementing 'ds1' and also inputted with 'seqn'. If 'seqn' and 'scramn' are in phase or in synchronization then the descrambler of FIG. 77 will generate the original sequence of n-state symbols 'sign'.

The scrambler and descrambler of FIGS. 76 and 77 are easy to implement and run in binary logic. It is preferred to apply self-reversing n-state functions as scrambling/descrambling functions, and in particular an adder over GF(n) because of its easy implementation in binary logic. Suppose for illustrative purposes that one wishes to scramble/descramble a sequence of 4-state symbols or n=$2^2$. In that case one may generate a $2^2$-state ML sequence and scramble through the scrambler with a sequence of $2^2$-state symbols to generate words of 2 bits which represent the scrambled symbols.

Figure 78:
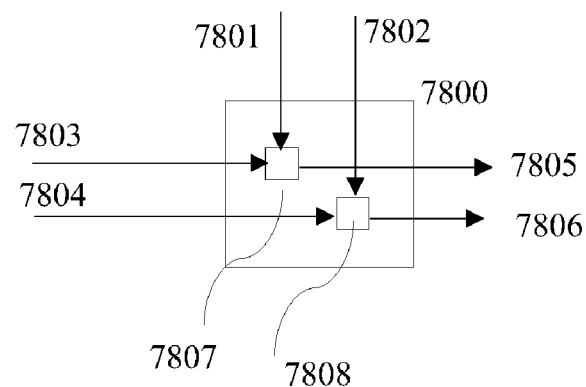

One embodiment of a scrambler is shown in FIG. 78. This may also be a descrambler, as these functions as shown in FIG. 78 are completely reversible. A symbol of pseudo-random or other known 4-state sequence is provided as a 2-bit word on inputs 7801 and 7802 of devices 7807 and 7808 which may implement an XOR or an EQUALITY binary function. A symbol of a to be scrambled (or descrambled) 4-state sequence is provided as a 2-bit word on inputs 7803 and 7804 of 7807 and 7808. A scrambled 4-state symbol as a binary word of 2-bits is provided on outputs 7805 and 7806.

The scrambler/descrambler requires a clock and circuitry for coordinating all signals, which is assumed but not shown. The same applies for the descrambling part of course. The descrambler further requires a synchronization mechanism to make sure that the sequences for scrambling and descrambling are synchronized. Such mechanisms or circuitry are known and will not be explained further, but are assumed throughout the specification.

One may expand the scrambler/descrambler to the scrambling/descrambling of any $2^p$ state symbol by expanding the number of devices implementing reversible binary logic functions to p and related inputs to p inputs and the outputs to p outputs with p>2. To maintain a random like appearance of the symbols one may want to use a generated 'known' pseudo-random sequence of an adequate number of n-state symbols.

A 16-state scrambler thus will process 4-bits word by scrambling each 4-bits word against a 4-bits word from a known sequence; a 256-state scrambler will process 8-bits words; etc.

Figure 79:
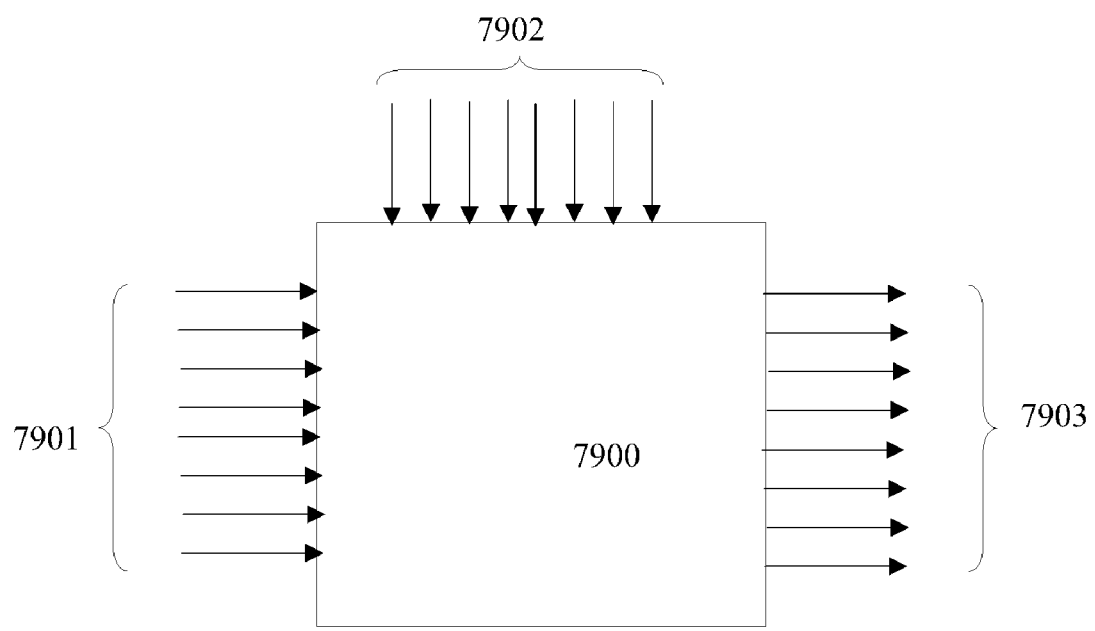

FIG. 79 shows a diagram of a 256-state scrambler in binary form. It has 8 binary inputs 7901 enabled to receive an 8-bits word representing a 256-state symbol. An 8-bit word is scrambled with an 8-bits word provided on 7902, which may be an 8-bits word generated by a 256-state ML sequence generator. Scrambling takes place by XOR-ing bits providing on corresponding inputs by a device implementing a binary XOR or EQUALITY function. Each device outputs a single bit on the 8 outputs of 7903, providing an 8-bits word representing a 256-state symbol. Device 7900 implements thus an adder over GF(256) in binary form. The scrambler of FIG. 79 is self reversing and may be used as its own descrambler.

Figure 80:
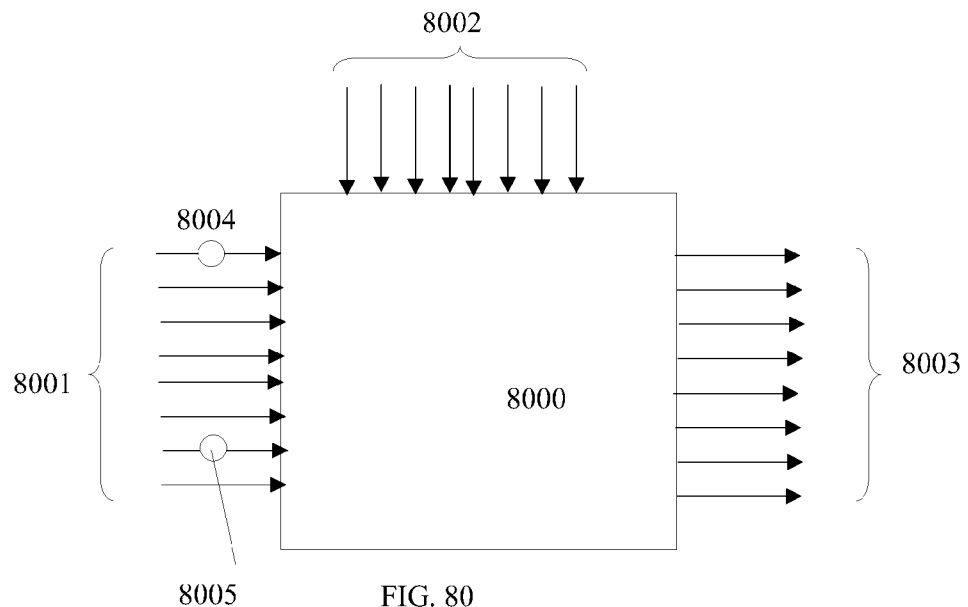

One may modify the scrambler of FIG. 79 to the scrambler as shown in FIG. 80. This scrambler also has two sets of 8 inputs 8001 and 8002 providing binary symbols to be processed by 8 XOR or EQUALITY implementations in 8000 and generating 8-bits words on 8003. However the scrambler is modified by applying two binary inverters 8004 and 8005 in the input set 8001. A single inverter in an input to a XOR or EQUALITY function reverses that function. It does not matter if an inverter is in a first or a second input or in the output. So, while the inverters are shown in inputs 8001 they may be as well in relevant inputs in 8002 or in the relevant outputs of 8003. Two inverters in either inputs or in an input and an output leave the function unchanged. Three inverters have the same effect as 1 inverter. The scrambler with inverters as shown in FIG. 80 is also self-reversing and thus may act as its own descrambler, provided that the correct sequence to descramble against is provided.

One may also apply a more complex inverter, which will invert the $2^p$-state symbols rather than the individual bits. If the inverters are multipliers over GF(n=$2^p$) then one may implement the inverters in binary combinational circuits. As was shown earlier by the inventor a reversing inverter to an inverter being a multiplier over GF(n=$2^p$) is also a multiplier over GF(n=$2^p$) and thus can also be implemented in a combinational circuits. One may implement non-zero based n-state inverters and any other inverter as a translation table in a memory device.

Figure 81:
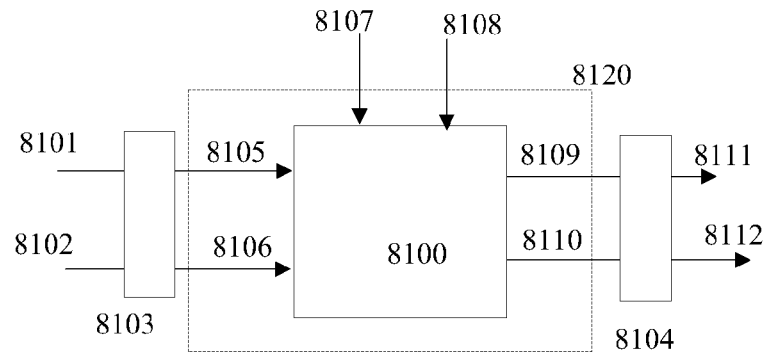

The simple relation between scrambler and descrambler that exists by using only XOR or EQUALITY functions and using binary inverters is in general not possible in using n-state inverters. An illustrative example is shown in FIG. 81. Herein a 4-state scrambler is shown wherein a 2-bit word (as a 4-state symbol) is provided on inputs 8101 and 8102 to a 4-state inverter 8103. The following table shows an example of a non-zero based reversible 4-state inverter.

| 4-state | binary | invert | binary | 4-state | re-invert | 4-state | binary |
|---------|--------|--------|--------|---------|-----------|---------|--------|
| 0 | 00 |   | 11 | 3 |   | 1 | 01 |
| 1 | 01 | → | 00 | 0 | → | 2 | 10 |
| 2 | 10 |   | 01 | 1 |   | 3 | 11 |
| 3 | 11 |   | 10 | 2 |   | 0 | 00 |

Also shown in the table is the reversing inverter that will undo or revert the inversion. This is a different inverter. The 4-state inverter as shown is not self reversing.

The inverter 8103 provides a two-bits word on 8105 and 8106. The inputs are inputted to 8100 having XOR or EQUALITY functions as used before. A 4-state word which may be generated from a 4-state pseudo-random sequence is provided on inputs 8107 and 8108. A binary word is provided on binary outputs 8109 and 81 10. The scrambler/descrambler inside dotted box 8120 is identical to the above provided scrambler/descrambler. Binary inverters may be inserted if one so desires.

One may further scramble a symbol by using a 4-state reversible inverter 8104 to invert the 4-state symbol to a 4-state symbol generated on outputs 8111 and 8112.

Figure 82:
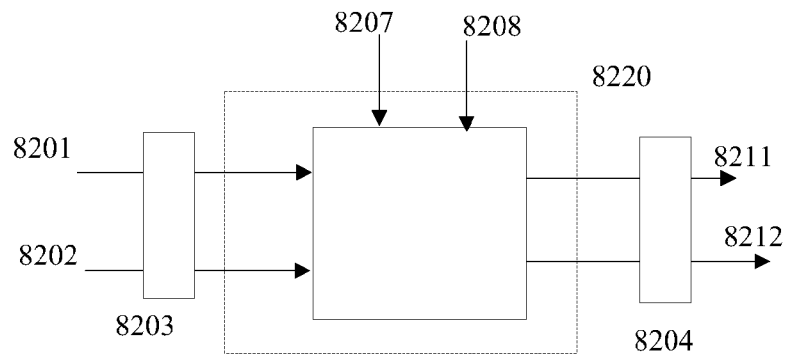

FIG. 82 shows a corresponding descrambler to the scrambler of FIG. 81. The heart of the descrambler 8220 is identical to the heart 8120 of the scrambler of FIG. 81. The same sequence as provided on 8107 and 8108 should be provided on 8207 and 8208. The 4-state symbols generated on 8111 and 8112 should be provided on inputs 8201 and 8202 of the descrambler of FIG. 82. The inputs are provided to an inverter 8203 which is the reversing inverter of 8104 of FIG. 81. The symbols outputted by 8203 are being processed by 8220 and then outputted on 4-state inverter 8204 which should be the reversing inverter of 8103 in FIG. 81.

In a further embodiment of the present invention one may also scramble a sequence of $2^q$ symbols into a sequence of $2^p$ symbols, with p>q. For instance, one may increase the security of a QPSK signal as well as its random properties by generating a sequence of symbols with more states. In a phase modulated signal one may do that by "adding" a phase-shift. This is usually done by multiplying the signal with a phase shifted signal, requiring a modulator as well as a means to create a phase shift.

Figure 83:
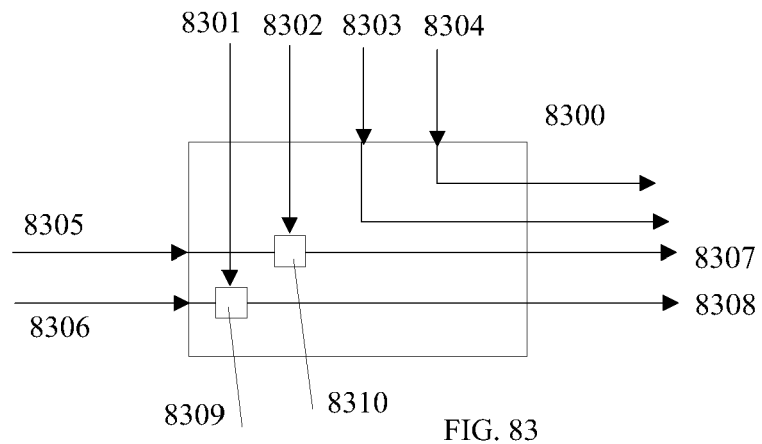

A scrambler, in accordance with an aspect of the present invention can do that in a much easier way. For instance one may scramble a 4-state signal into a 16-state signal by using an adder over GF(16) in a scrambling circuit and by using a pseudo-random 16-state ML sequence. Each 16-state symbol may be represented by a 4-bits word. The 4-state symbols are represented by a 2-bit word. One illustrative example is shown in FIG. 83. An unknown 4-state symbol provided as a 2-bit word is provided on inputs 8305 and 8306 of scrambler 8300. A sequence of 16-state elements as 4-bits words is provided on inputs 8301, 8302, 8303 and 8304. The XOR devices 8309 and 8310 scramble the 2-bits words against 2 bits of the 4-bits word and provide the scrambled 2-bit word on outputs 8307 and 8308. The 2 bits provided by 8303 and 8304 may be provided directly as an output signal.

Figure 84:
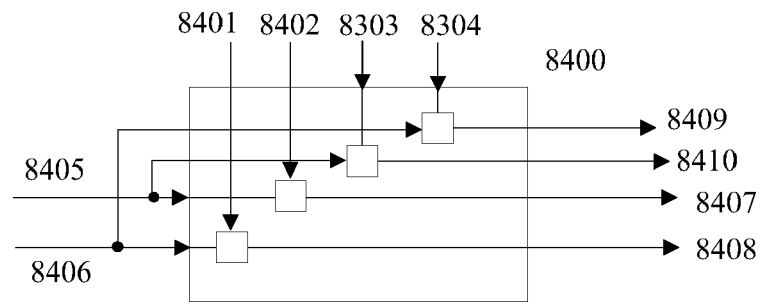

The sequence of 16-state symbols provided on 8301-8304 is preferably a pseudo-random sequence. This means that 8300 will provide a sequence of 16-state symbols that is substantially pseudo-random. However, in many cases one would like to scramble (even with minimal security) all symbols. Such a case is shown in FIG. 84. The scrambler 8400 shown in FIG. 84 is almost identical to scrambler 8300 of FIG. 83. However, in 8400 one also scrambles 2-bit word provided on 8303 and 8304 with the input signals on 8305 and 8306 through XOR devices and outputs a scrambled 2-bits word on 8409 and 8410. It should be clear that for descrambling for both scramble 8300 and 8400 only the 2-bits word on 8307 and 8308 has to be descrambled by reversing the process with almost the same circuit as in FIGS. 83 and 84. For descrambling the inputs 8303 and 8304 do not need to be provided. This aspect of the present invention can be applied to scrambling of any sequence of k (with k>1)$2^q$ symbols to a sequence of k $2^p$ symbols with p>q. Other configurations, including cross-connections and the use of inverters are possible and fully contemplated.

The above scramblers require a means for synchronization with a descrambler. If synchronization between scrambler and descrambler is lost the descrambler may incorrectly descramble a scrambled sequence. Errors may continue unless synchronization is restored.

It was show earlier by the inventor how one may create n-state Linear Feedback Shi Register Based scramblers and descramblers.

Figure 85:
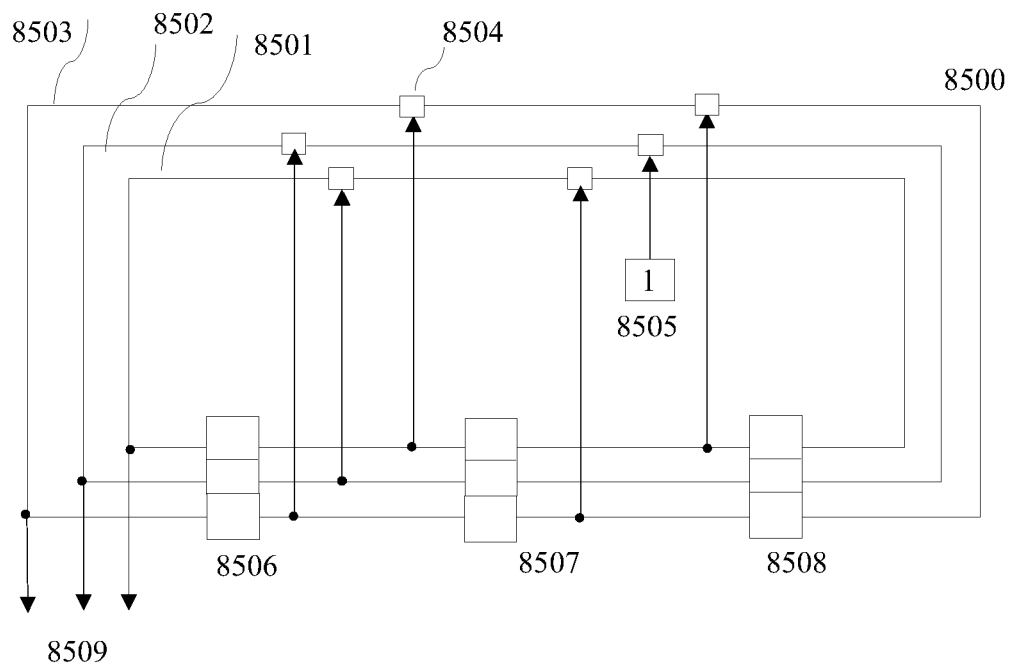
FIGS. 85-87 show a diagram of an LFSR based sequence generator in accordance with an aspect of the present invention.

For illustrative purposes an 8-state LFSR based sequence generator 8500 in binary form is provided in FIG. 85. The LFSR has 3 8-state shift register elements 8506, 8507 and 8508, each able to hold and shift a 3-bit word representing an 8-state symbol. The 8-state LFSR contains 3 LFSR loops 8501, 8502 and 8503. Furthermore, logic operations are provided by XOR or EQUIVALENT devices 8504. A constant state may also be provided. This is the case with 8505 which provides state 1. The 8-state symbols are provided as 3-bit words on output 8509. One may also include binary inverters and reversible 8-state inverters which may be implemented as combinational binary logic circuits or as memory based binary 8-state inverters. A clock signal is assumed but not shown. One may thus create any $2^p$-state LFSR using binary circuits and devices with p≧2 and p>2.

Figure 86:
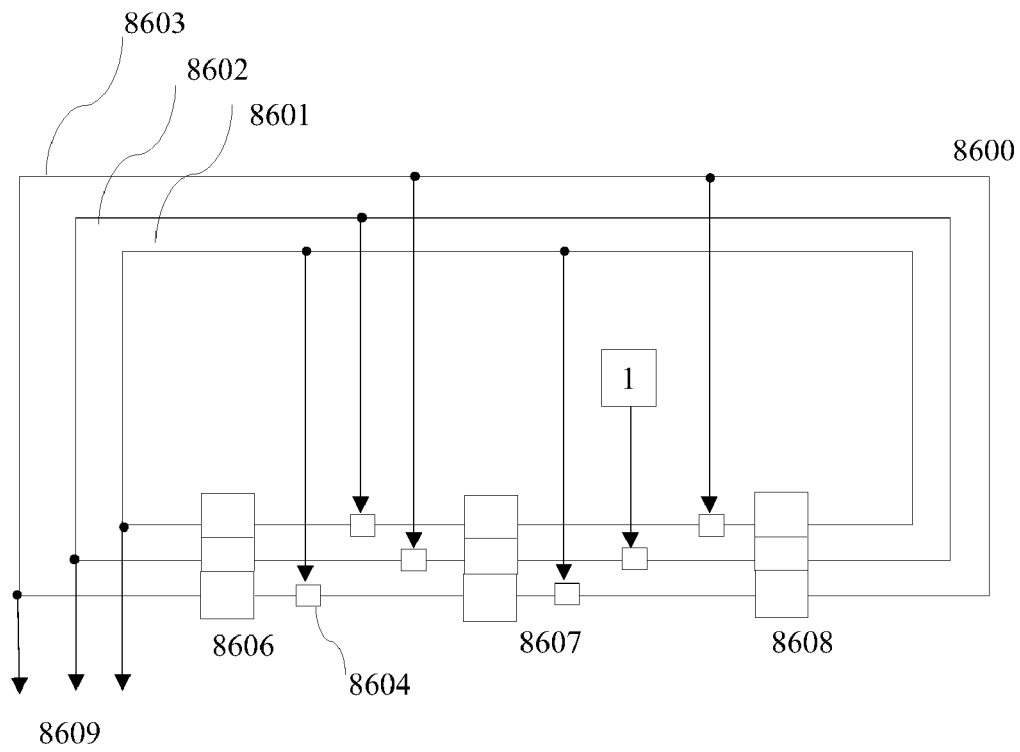

Examples were provided herein of n-state LFSRs in binary implementations wherein the LFSRs are Fibonacci LFSRs. One may also implement n-state LFSRs with n=$2^p$ and p≧2 or p>2 for LFSRs in Galois configuration. An illustrative example is provided in FIG. 86 for n=8. The 8-state LFSR is part of an 8-state sequence generator 2900 for k=255 8-state symbols, each symbol being represented by 3 bits. The LFSR has 3 parallel binary LFSRs 8601, 8602 and 8603 with 3-bits shift register elements 8606, 8607 and 8608. Feedback taps are connected through a device indicated by a small square such as 8604 which may implement a binary XOR or EQUIVALENT function. The 8-state symbols are generated on 8609 as 3 bit words. A clock signal is assumed but not shown. The configuration as shown in FIG. 86 uses the feedback taps to switch between the individual LFSRs. One tap is replaced by a source providing a state 1.

Figure 87:
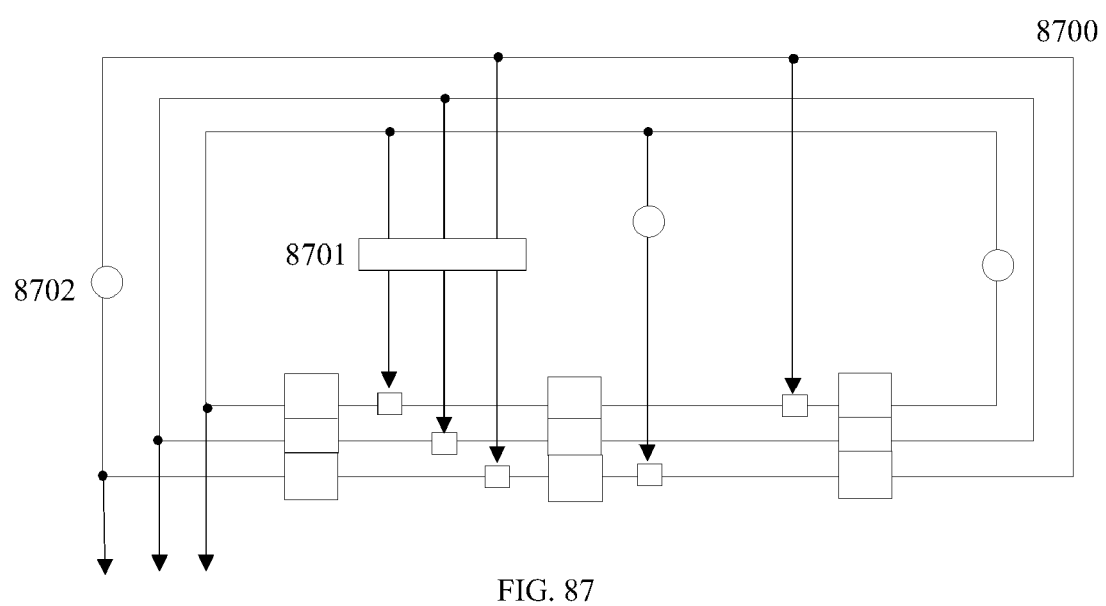

Other configurations allow a sequence to be generated with by further using binary inverters, absence of taps and n-state inverters. This is shown in FIG. 87 wherein an 8-state Galois LFSR 8700 in binary form applies a binary inverter 8702, an 8-state inverter 8701 which may be implemented using combinational binary logic or a memory based inverter.

One may create also a $2^p$-state ML sequence of length k by first generating a binary ML sequence of length L, then shi or delay the sequence and then combining the delayed sequences to create symbols of p words. A $2^p$-state ML sequence requires then generating p binary ML sequences of length k that each are delayed of each other as was shown in the case of the Fibonacci sequence generator above.

The next step in accordance with a further aspect of the current invention is to demonstrate that the $2^p$-state LFSRs in binary form can be used to implement scramblers, descramblers and sequence detectors.

Figure 88:
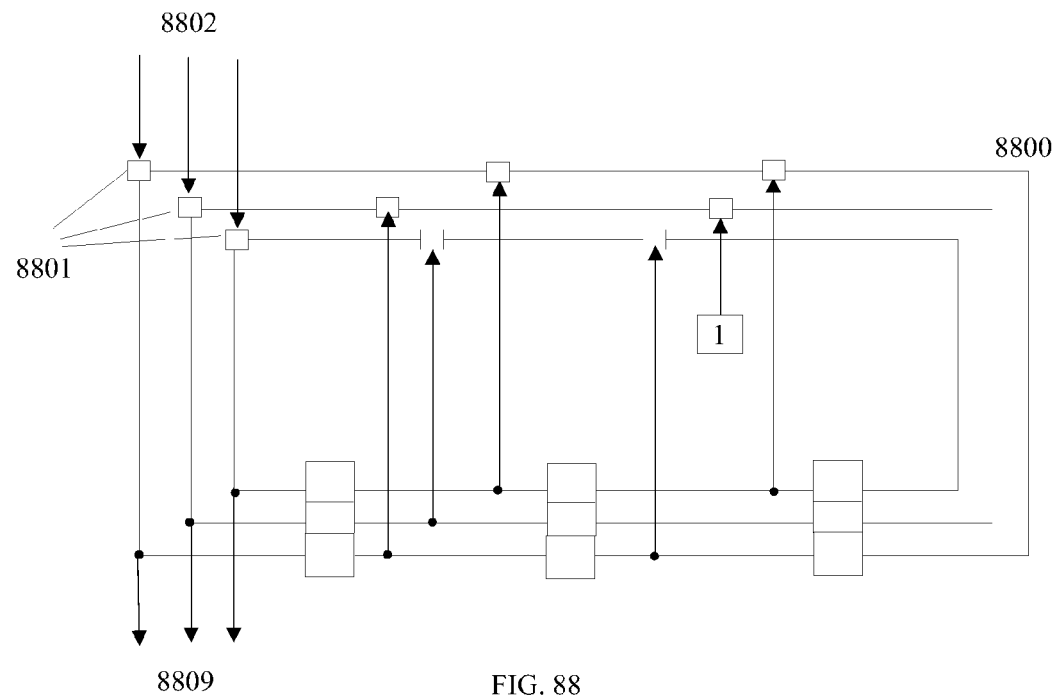
FIG. 88 shows a diagram of an LFSR based scrambler in accordance with an aspect of the present invention.

A first illustrative example is shown in FIG. 88, being an 8-state scrambler 8800 using the LFSR of the sequence generator of FIG. 85. The scrambling function is an adder over GF(8) implemented by XOR devices 8801. An 8-state symbol represented by a p-bit word with p=3 is inputted on 8802. A scrambled symbol is outputted as a p-bit word with p=3 on 8809. One may, as before add binary inverters, fixed state sources and zero and non-zero based inverters. Inverters which can not be implemented by binary inverters may be implemented in combinational binary circuitry or as binary memory based inverters.

Figure 89:
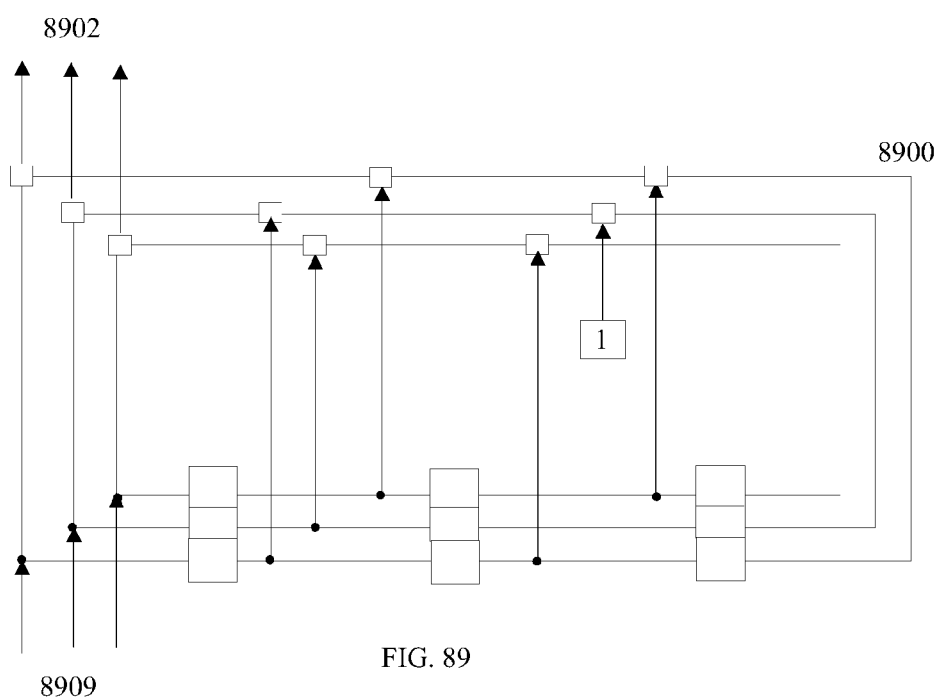
FIG. 89 shows a diagram of an LFSR based descrambler in accordance with an aspect of the present invention.

FIG. 89 shows the corresponding descrambler 8900 for the scrambler 8800. This descrambler is self-synchronizing. In essence, if no 8-state inverters are applied that cannot be implemented by binary inverters only, the scrambler and descrambler use the same structure and components. Only the input is now 8909 and the output is 8902. In case an 8-state inverter is used that is not self-reversing and that is not in the LFSR but between the input and output of the scrambler then one should use the inverter in the descrambler that reverses a corresponding inverter in the scrambler. Such requirement does not exist if the 8-state inverter is in the LFSR. An essential aspect of LFSR based scramblers and descramblers is that they may use LFSRs that are functionally identical.

The scrambler and descrambler provided as illustrative examples in FIGS. 88 and 89 in Fibonacci configuration are 8-state and have 3 8-state shift register elements. One of ordinary skill in the art should be able to now also create longer or shorter LFSRs of any n=$2^p$ state LFSR based scrambler and descrambler for p>2 and p≧2.

Figure 90:
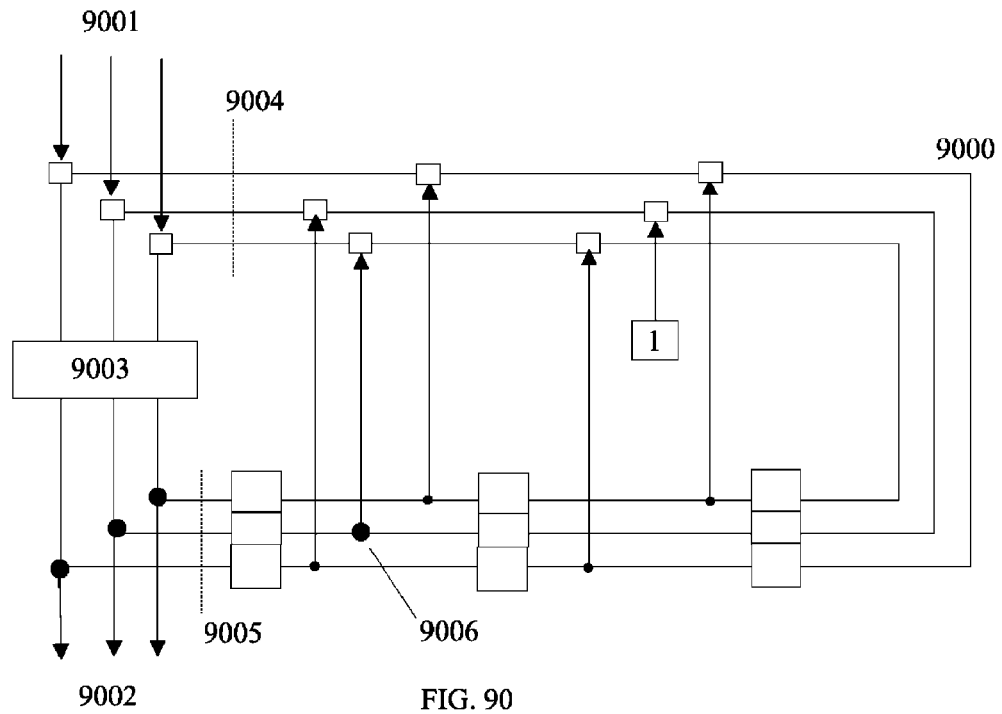
FIG. 90 shows a diagram of an LFSR based scrambler in accordance with an aspect of the present invention.
Figure 91:
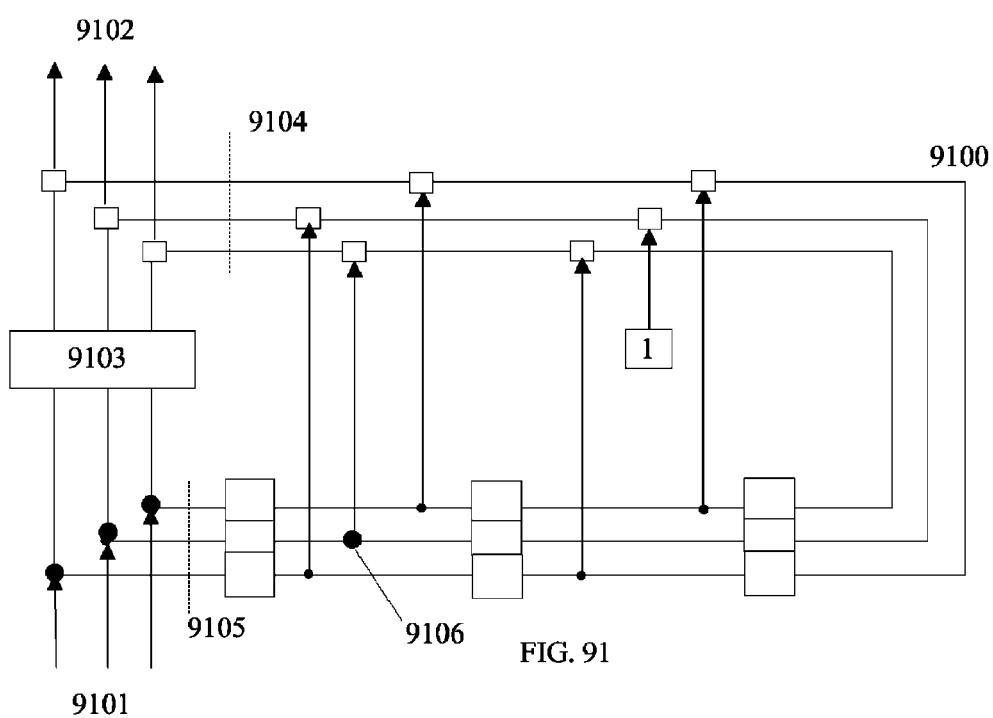
FIG. 91 shows a diagram of an LFSR based descrambler in accordance with an aspect of the present invention.

FIG. 62 shows a diagram defining an input and an output of an LFSR. When a scrambler (or a sequence generator) has a reversible device between the input and output then the corresponding descrambler or sequence detector requires the reversing device. When such a device is self-reversing it may be the same device. This aspect is illustrated in FIGS. 90 and 91. FIG. 90 shows in diagram an 8-state scrambler 9000 with input 9001 and output 9002 and with a reversible 8-state inverter 9003 between input and output. The dotted line 9004 defines the output of the combined LFSR, or the outputs of the individual LFSRs of FIG. 90. The dotted line 9005 defines the input of the combined LFSR or the inputs of the individual LFSRs of FIG. 90. Dot 9006 is a connection point in the binary LFSR containing this point.

The corresponding descrambler 9100 is shown in FIG. 91 with input 9101 and output 9102 with an 8-state inverter 9103 which reverses inverter 9003 in FIG. 90. This aspect also applies to devices applying n-state LFSRs in binary form in Galois configuration. The dotted line 9104 defines the output of the combined LFSR, or the outputs of the individual LFSRs of FIG. 91. The dotted line 9105 defines the input of the combined LFSR or the inputs of the individual LFSRs of FIG. 91. Dot 9106 is a connection point in the binary LFSR containing this point.

Figure 92:
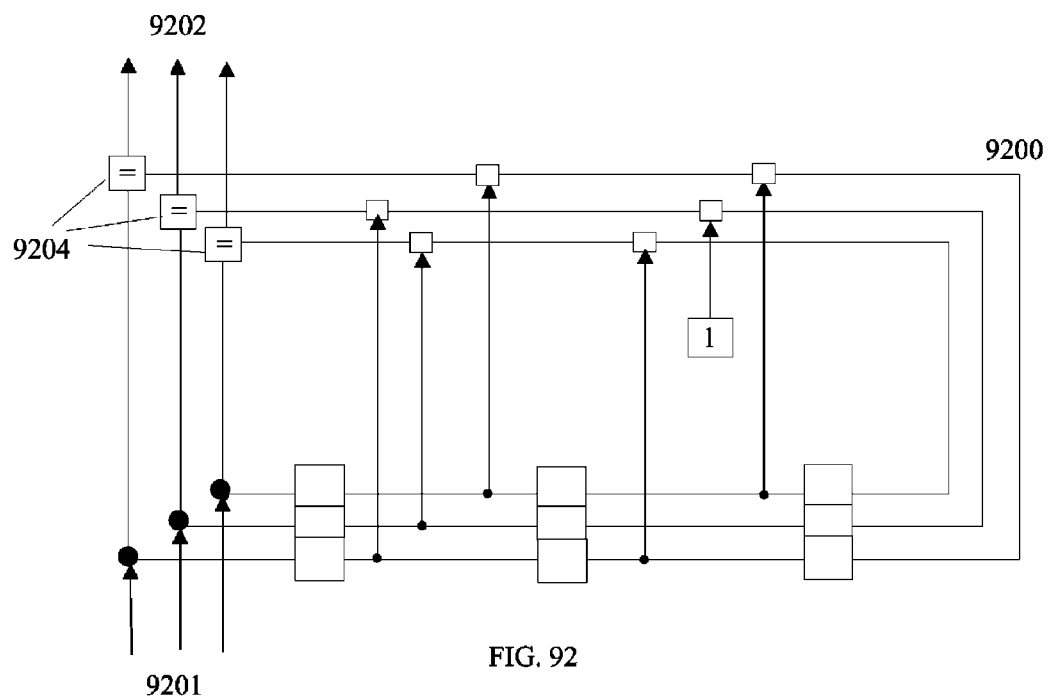
FIG. 92 shows a diagram of an LFSR based sequence detector in accordance with an aspect of the present invention.

FIG. 92 shows in diagram a detector 9200 of the sequence generated by the generator shown in FIG. 85. Only if the correct sequence is entered on input 9201 will output 9202 generate an all 1 pattern (keeping in mind that a 3-bit word of all 1s may represent 7 in 8-state symbols. To achieve this, the devices 9204 are all to implement binary EQUIVALENT (=) functions.

Figure 93:
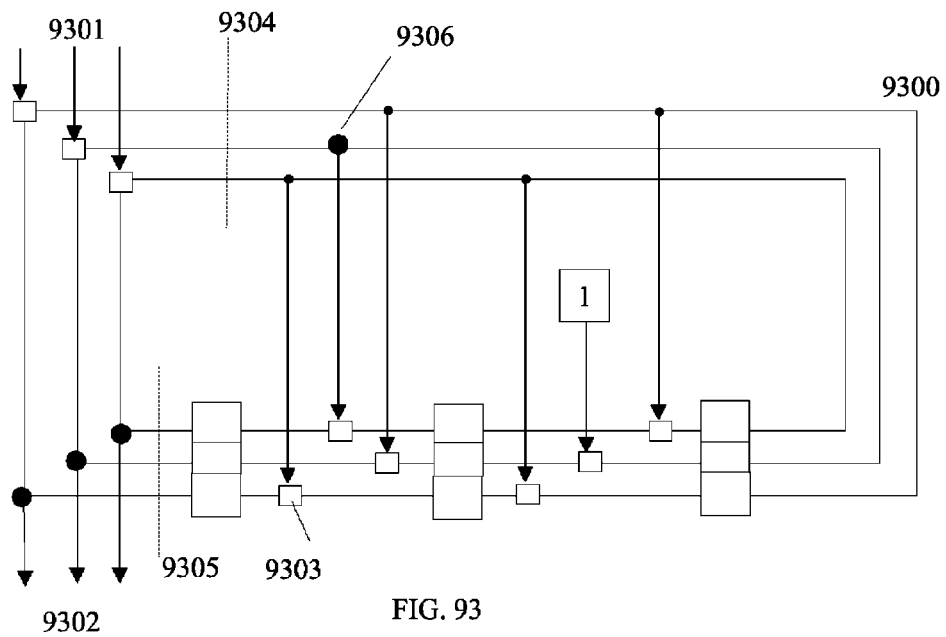
FIG. 93 shows a diagram of an LFSR based scrambler in accordance with an aspect of the present invention.

An 8-state LFSR based binary scrambler 9300 in Galois configuration is shown in FIG. 93. The logic devices such as 9303 indicated by a small square, as before, may implement a XOR or a binary EQUIVALENT function. Binary inverters may also be inserted. The 8-state symbols are inputted as p-bit words with p=3 on 9301 and the scrambled symbols are provided as p-bit words with p=3 on 9302. The dotted line 9304 defines the output of the combined LFSR, or the outputs of the individual LFSRs, of FIG. 93. The dotted line 9305 defines the input of the combined LFSR or the inputs of the individual LFSRs of FIG. 93. Dot 9306 is a connection point in the binary LFSR containing this point.

Figure 94:
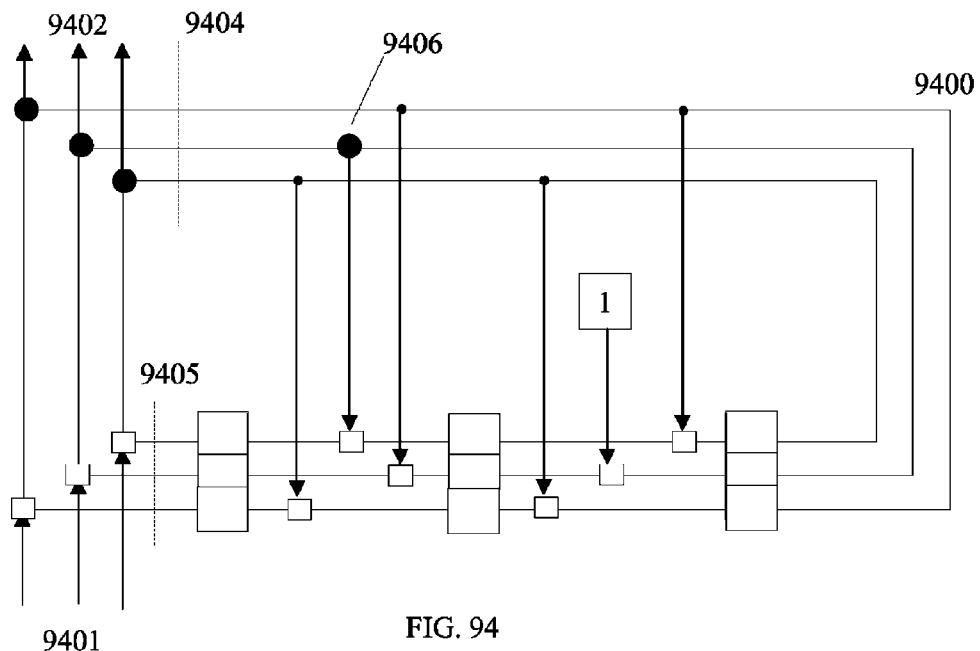
FIG. 94 shows a diagram of an LFSR based descrambler in accordance with an aspect of the present invention.

A corresponding descrambler 9400 is shown in FIG. 94 with input 9401 and output 9402. The dotted line 9404 defines the output of the combined LFSR, or the outputs of the individual LFSRs, of FIG. 94. The dotted line 9405 defines the input of the combined LFSR or the inputs of the individual LFSRs of FIG. 94. Dot 9406 is a connection point in the binary LFSR containing this point. This descrambler in Galois configuration is not self-synchronizing.

This means that initial setting of the shift registers of scrambler and descrambler have to be identical for the descrambler to descramble correctly. An occurring error in a received sequence that has to be descrambled may perpetuate through the complete sequence after the error.

One may also create a detector of a sequence generated by a Galois configured sequence generator by using only binary EQUIVALENT functions at the output of the detector.

In accordance with a further aspect of the present invention one may use $2^p$ scrambler as provided herein to scramble a $2^q$ state sequence with p>q. In such a case one may provide the q-bit word on q of the p inputs of a $2^p$-state scrambler. One may provide a state 0 or 1 or a mix of those states on the remaining (p-q) inputs. Other ways to enter q-bit words, such as inputting one or more of the q inputs multiple times on the p inputs, are also fully contemplated.

Figure 95:
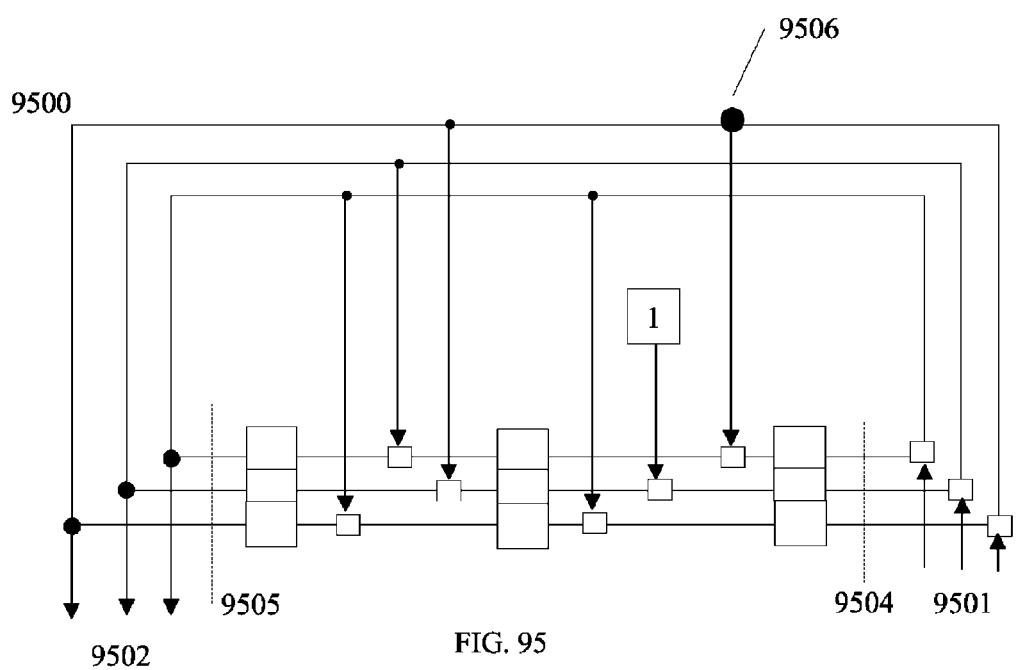
FIG. 95 shows a diagram of an LFSR based scrambler in accordance with an aspect of the present invention.

As a further aspect of the present invention a combination of an n-state LFSR based scrambler and descrambler that are self-synchronizing and implemented in binary logic is provided. As an illustrative example an 8-state scrambler 9500 in Galois configuration is provided in FIG. 95. The dotted line 9504 defines the output of the combined LFSR, or the outputs of the individual LFSRs, of FIG. 95. The dotted line 9505 defines the input of the combined LFSR or the inputs of the individual LFSRs of FIG. 95. Dot 9506 is a connection point in the binary LFSR containing this point. All elements are binary elements such as devices implementing binary XOR and/or EQUIVALENT functions and binary shift registers and binary state generators. While not shown, individual binary inverters may also be used. All 8-state symbols are processed as p-bit words with p=3. The p-bit words are inputted on 9501. The scrambled p-bit words are provided on 9502.

Figure 96:
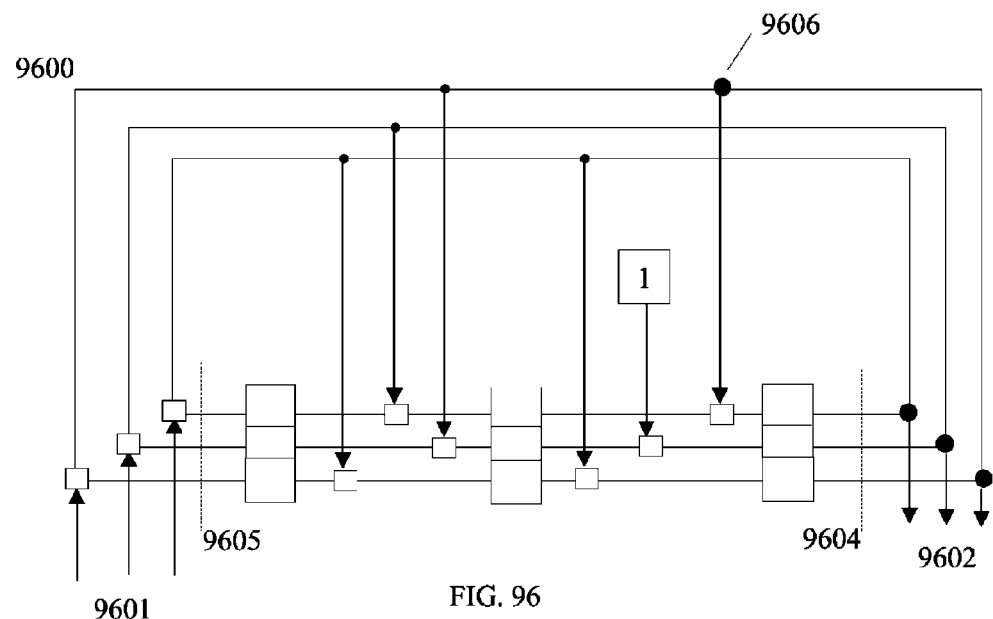
FIG. 96 shows a diagram of an LFSR based descrambler in accordance with an aspect of the present invention.

The corresponding self-synchronizing descrambler is shown in FIG. 96, wherein p-bit words are inputted on 9601 and the descrambled p-bit words are provided on 9602. The dotted line 9604 defines the output of the combined LFSR, or the outputs of the individual LFSRs of FIG. 96. The dotted line 9605 defines the input of the combined LFSR or the inputs of the individual LFSRs of FIG. 96. Dot 9606 is a connection point in the binary LFSR containing this point.

Figure 97:
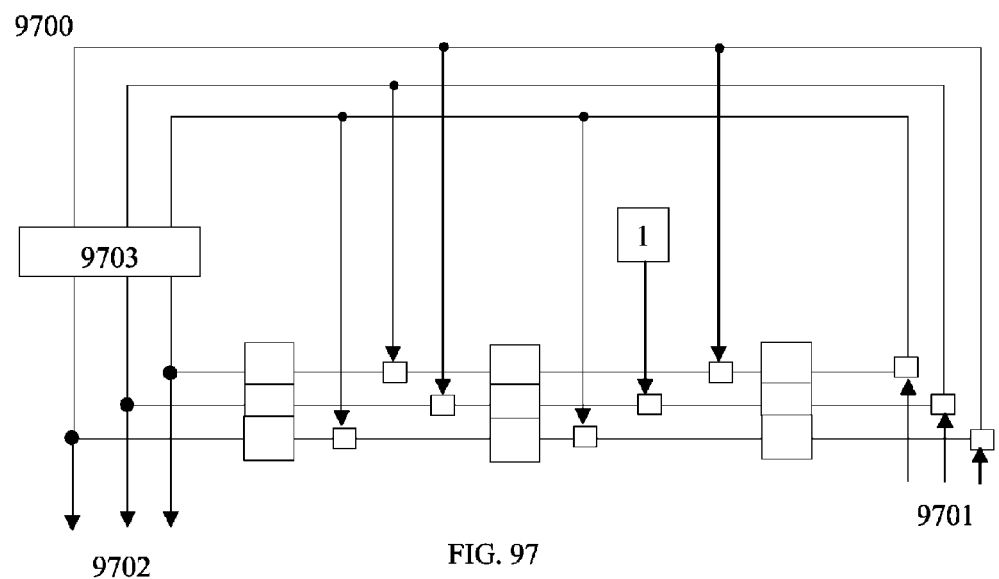
FIG. 97 shows a diagram of an LFSR based scrambler in accordance with an aspect of the present invention.
Figure 98:
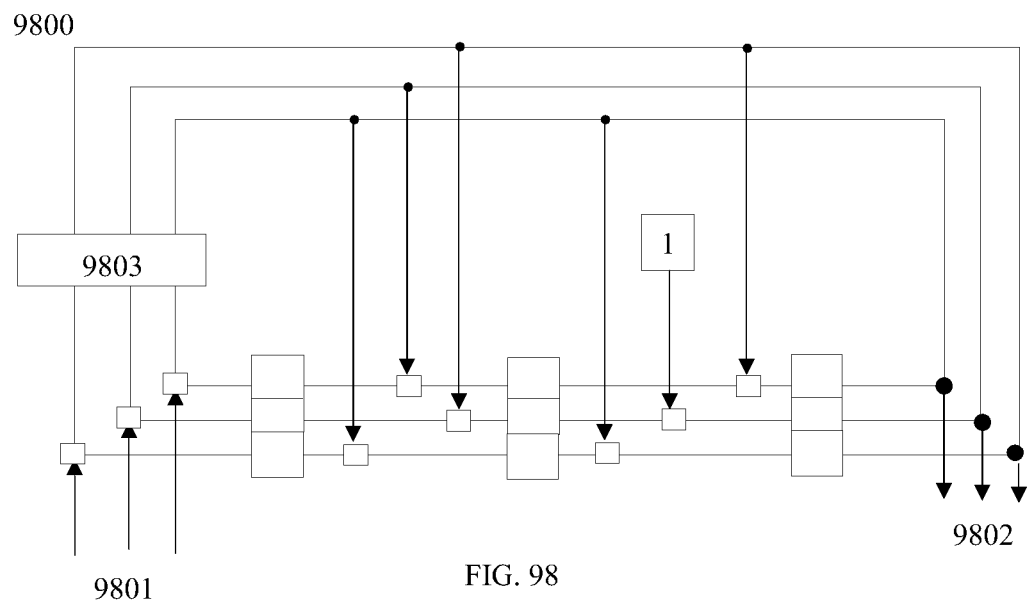
FIG. 98 shows a diagram of an LFSR based descrambler in accordance with an aspect of the present invention.

The scrambler and descrambler in self-synchronizing Galois configuration may also be implemented not only using binary inverters, but by using an inverter that is implemented by a combinational circuit. This is shown as Galois configured scrambler 9700 in FIG. 97 with input 9701, output 9702 and combinational circuit/inverter 9703. The corresponding descrambler 9800 as shown in FIG. 98 with input 9801 and output 9802 should then have the reversing inverter of 9803, being the reverse of 9703.

In summary LFSR based $2^p$ state with p>2 or p≧2 scramblers, descramblers, sequence generators and sequence detectors in binary implementation have been provided. As one aspect of the present invention these devices only apply devices implementing binary XOR and EQUIVALENT functions, binary shift registers and binary inverters and binary state generators. In a further embodiment also $2^p$ state inverters using binary combinational logic are applied. In a further embodiment also memory based binary $2^p$ state inverters are applied. Non-LFSR based n-state scramblers and descramblers in binary logic were also provided.

Throughout the present invention the use of sources generating a binary state have been disclosed. Such a state may be a 0 or a 1. For instance FIG. 85 shows a source of state 1 8505 connected to a logic device. It is to be understood that the combination of such a source and the logic device can be replaced by an equivalent. For instance source 8505 is connected to a device implementing a reversible binary function (= or ≠) in LFSR 8502. The following equivalent rules may be applied throughout and for all aspects of the present invention: (1) when the device implements an XOR (≠) function, and the source generates a state 1, then the XOR function may be replaced by a binary inverter; (2) when the device implements an XOR (≠) function, and the source generates a state 0, then the XOR function may be replaced by a connection which is an identity inverter; (3) when the device implements an EQUIVALENT (=) function, and the source generates a state 1, then the EQUIVALENT function may be replaced by a connection; (4) when the device implements an EQUIVALENT (=) function, and the source generates a state 0, then the EQUIVALENT function may be replaced by a binary inverter.

Scramblers are herein provided to scramble what could be called a plaintext or unscrambled series of symbols represented by binary or n-valued signals with n>2. A descrambler restores the plaintext from the scrambled symbols by descrambling the scrambled signals. Functionally, the role of scramblers and descramblers may be interchanged. One usually does not do that because the self-synchronizing aspect of descramblers will be lost if one makes a descrambler a scrambler. However, if one creates the means to provide the correct initial conditions at the descrambling side, there is no reason why scrambler cannot be used as descramblers and descramblers as scramblers.

It was shown how one may create n-state like LFSRs in binary form by connecting one LFSR to another one in a plurality of LFSRs. This allows a signal from one binary LFSR to enter another parallel binary LFSR. The LFSRs can be in Fibonacci or in Galois configuration. It is preferred that in a plurality of LFSRs all LFSRs are either in Galois or in Fibonacci configuration. The LFSRs may be applied as part of a scrambler, of a descrambler, of a sequence generator, an encoder such as an BCH encoder, or in a GF(n) arithmetical LFSR based device. Examples provided herein are focused on scramblers, descramblers and sequence generators but are not limited there to and other LFSR applications are fully contemplated.

The examples herein show how two binary LFSRs are connected through their taps. The invention is not limited to such a connection. One may also connect the loops going into the input first shift register element of an LFSR or the output coming from the last shift register element of the LFSR in such a way that inputs or outputs are connected to a loop not being part of the LFSR that the shift register element belongs to. This is illustrated for a set of 3 LFSRs 9901, 9902 and 9903 in FIG. 99.

The LFSR may be defined as the set of shift register elements connected directly to each other and the connection from output of the last shift register element to the input of the first shift register element. The dotted line 9907 defines the output of the combined LFSR, or the outputs of the individual LFSRs of FIG. 99. The dotted line 9906 defines the input of the combined LFSR or the inputs of the individual LFSRs of FIG. 99. Dot 9910 is a connection point in the binary LFSR containing this point. In this case one may say that 9910 is in one LFSR (though it is in both LFSRs that are connected through 9910) that connects to an output of another LFSR.

Figure 99:
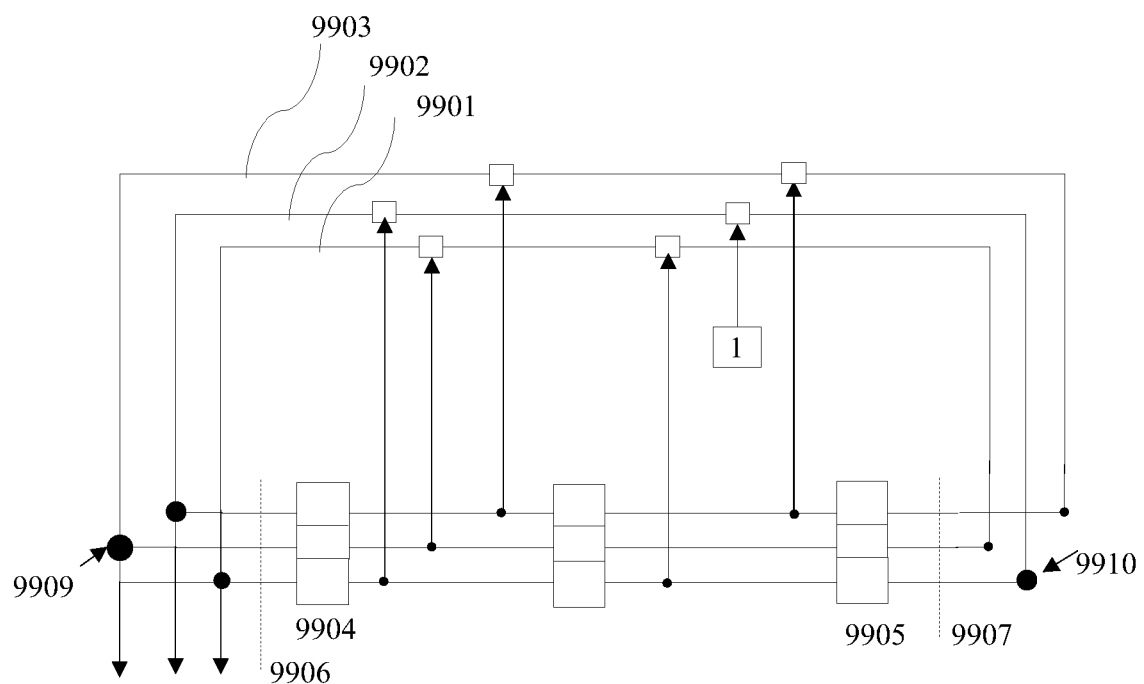
FIG. 99 shows a diagram of an LFSR in accordance with an aspect of the present invention.

FIG. 99 shows how the structure is modified by connecting the loop that defines LFSR 9902 to the first shift register element 9904 of LFSR 9901. A similar modification is shown at the output of the last shift register element 9905 of LFSR 9901 being connected to LFSR 9903. In general one may define in LFSRs inputs and outputs as they relate to inputs and outputs of shift register elements or of devices that implement the reversible logic functions and the like. It is shown that outputs and inputs may be connected to the general loop of an LFSR. One may define such points as "connection points of the LFSR". Such points are shown as black solid circles 9909. One may say that 9909 is in one LFSR (though it is of course in both LFSRs that are connected through this connection point) that connects to an input of another LFSR.

Figure 100:
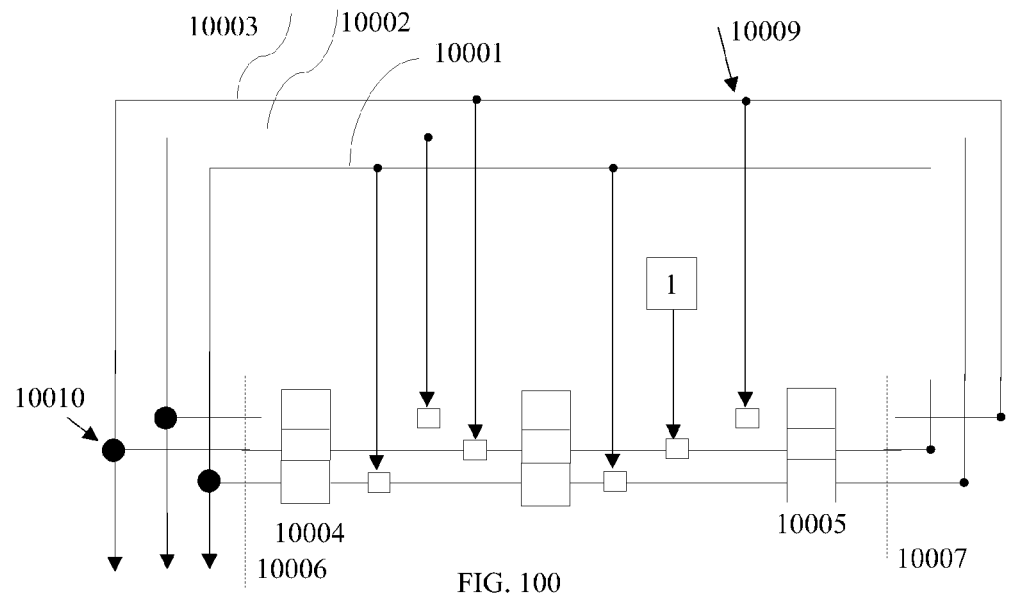
FIG. 100 shows a diagram of another LFSR in accordance with an aspect of the present invention.

Similar switching connections as shown for a Fibonacci LFSR between different LFSRs can also be applied to Galois LFSRs. This is shown in FIG. 100. The dotted line 10007 defines the output of the combined LFSR, or the outputs of the individual LFSRs of FIG. 100. The dotted line 10006 defines the input of the combined LFSR or the inputs of the individual LFSRs of FIG. 100. Dot 10010 is a connection point in the binary LFSR containing this point. One may say that 10010 is in one LFSR (though it is of course in both LFSRs that are connected through this connection point) that connects to an input of another LFSR.

One can easily distinguish how 3 LFSRs 10001, 10002 and 10003 can be connected via inputs of first shift register element 10004 or via outputs of last shift register element 10005. It is useful to define point 10009 as a connection point in an LFSR loop. Depending on the use of the Galois LFSR devices may be positioned throughout the LFSR. The loop of the Galois LFSR is the connection that would directly or through an inverter connect the output of the last shift register element in a binary LFSR with the input of the first shift register element of the LFSR. The first and the last shift register element being part of a Galois shift register.

It is known that LFSRs in either Fibonacci or in Galois configuration can be used to generate systematic codes. Such a code generates check symbols in addition to the to be transmitted symbols. The decoder, for instance in CRC error detection is essentially a repeat of the coder stage. Check symbols are again generated from the systemic part of a block of symbols. If the generated check symbols in the decoder are different from the check symbols that were included with a codeword, an error has occurred in the codeword. Such an error may have taken place in the check symbols. These coders are block codes. Scramblers and descramblers as disclosed herein operate in a streaming or continuous mode. Furthermore, scramblers herein scramble a symbol one-on-one: each to be scrambled symbol is scrambled into a scrambled symbol. That is generally not the case in BCH coders. These codes are called (p,k) codes, indicating that a certain number of symbols are generally provided with a number of check symbols that is less than the number of to be scrambled symbols. One may provide as a distinguishing characteristic of a scrambler that can generate a number of scrambled symbols that exceeds the number of elements in the LFSR. In a BCH code the number of check symbols is equal to the number of LFSR elements. In a BCH coder for each code-word the content of the LFSR has to be reset to a fixed content, usually all 0s. This is not required in scramblers/descramblers provided herein. Furthermore, a decoder to the BCH coder is not a descrambler. A BCH decoder is certainly not a self synchronizing descrambler.

Figure 101:
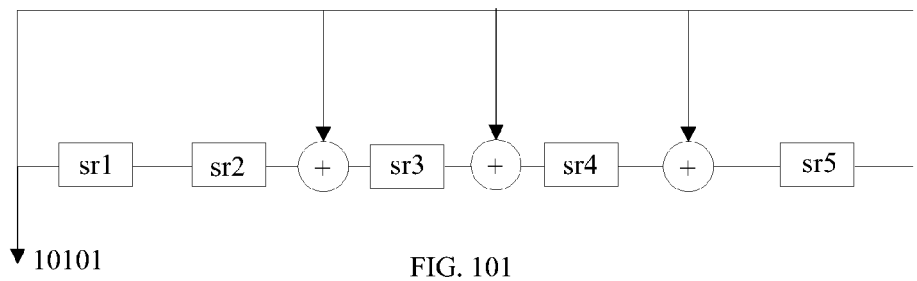
FIG. 101 shows a diagram of a sequence generator in accordance with an aspect of the present invention.
Figure 102:
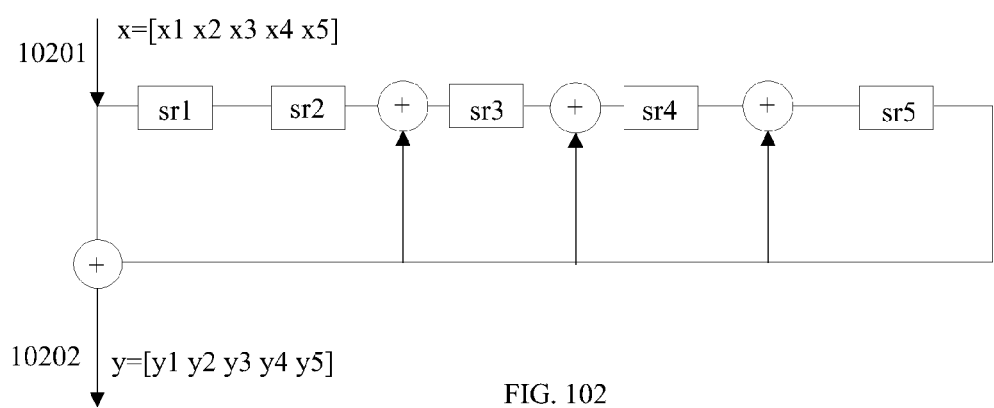
FIG. 102 shows a diagram of a detector/descrambler in accordance with an aspect of the present invention.

Sequence generators in Galois form such as illustrated in FIG. 31 may also provided in binary form such as illustrated in FIG. 101. A sequence of binary symbols may be provided on output 10101. The functions in the sequence generator are shown as '+', or the XOR function. It is to be understood that these functions may also be the '=' or 'EQUIVALENCE' function. It may also be that one or more functions are '+' and one or more functions are '='. The sequence as generated by the generator of FIG. 101 may be detected by the detector of FIG. 102 in Galois configuration. The sequence as generated on 10101 is received on 10201 in FIG. 2. If the sequence that is received on 10201 is identical to the one that was provided on 10101, and the LFSR of FIG. 102 is identical to the LFSR of FIG. 101, and the initial state of the LFSR of FIG. 101 is identical to the initial state of the LFSR of FIG. 102 then the output 10202 will generate a sequence of all '0s'. One may change this particular function with output 10202, also to a '=' function. In that case output 10202 will generate a sequence of all '1s'. Due to the Galois configuration the detector as shown in FIG. 102 is phase sensitive to the received sequence. An out-of-phase binary sequence will not generate an 'all=0' or 'all–1' sequence. This may be an advantage over a Fibonacci configuration wherein phase-errors will be flushed. It requires that one has the shift register of FIG. 102 filled with the correct content. In a further embodiment one may calculate based on receiving a detectable sequence, but having a wrong or out-of-phase initial shift register content, how large (or how many symbols) the out-of-phase is. Such a calculation may be applied to binary as well as non-binary sequence detectors in Galois configuration.

Figure 103:
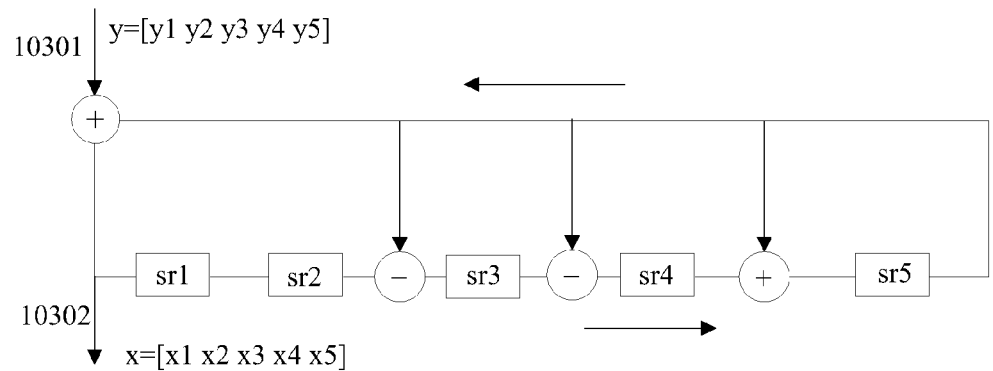
FIG. 103 shows a diagram of a scrambler in accordance with an aspect of the present invention.

The detector of FIG. 102 may be considered the binary descrambler in Galois configuration that corresponds to a binary scrambler in Galois configuration as shown in FIG. 103. In such a scrambler a to be scrambled binary sequence is received on input 10301 and a scrambled sequence of binary symbols of equal length to the sequence received on the input is provided on output 10302. The sequence of scrambled binary symbols may be descrambled by the descrambler as shown in FIG. 102. This requires that initial states of the LFSR in scrambler and descrambler are identical. If not, the descrambler will not generate the correct descrambled symbols and errors may propagate.

One may apply the sequence generators in communication systems using n-state symbols, such as for instance wireless systems which may apply QPSK, QAM-$2^p$ or other multi-valued symbols. A sequence may herein for instance represent a symbol. One may also apply the scramblers and descramblers provided herein in communication systems. The use of scramblers and descramblers provided herein allow communication devices to scramble before modulation and to descramble after demodulation, preventing to have to use modulation techniques to perform the scrambling and descrambling tasks. One may also use the sequence detectors to detect n-state sequences. Furthermore, in accordance with a further aspect of the present invention one may apply the method for determining a correlation value provided herein in a communication system. One may determine a correlation value by adding a fixed value to a sum when two words of p-bits are identical. One may subtract a fixed value, including 0, when two p-bit words are not identical.

Figure 104:
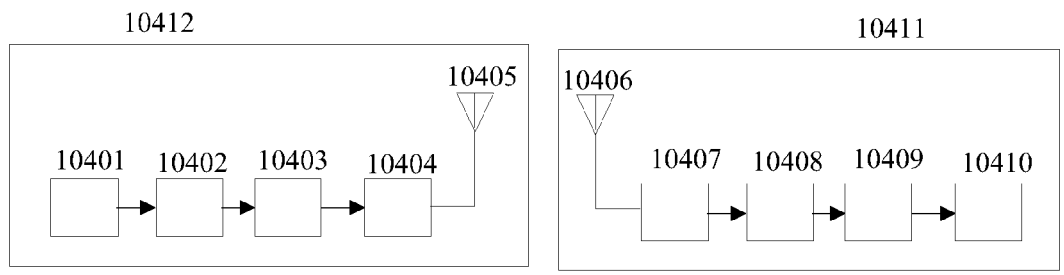
FIGS. 104-106 show diagrams of devices applying at least one method or apparatus in accordance with an aspect of the present invention.

A diagram of a communication system is shown in FIG. 104. A source 10401 generates a signal, which may be converted in n-state symbols or signal representation thereof, having one of n discrete states with n greater than 2. The source may also provide binary signals, without word synchronization. The signal from 10401 may be converted into words of binary symbols or signals representing those symbols or they may be binary signals with no word synchronization. The signal source 10401 may be other equipment or systems, for instance multiplexing equipment or other equipment. The signals may be scrambled in accordance with an aspect of the present invention in scrambling unit 10402. This unit may also provide line-coding facilities. A unit 10403 may provide additional error control coding, including error correction or error detection. Line coding may take place in its entirety in unit 10403 instead of 10402 or partially. It is known that multiple coding schemes may be applied. Unit 10402 or 10403 may also provide signal interleaving. The signal in scrambled and coded form may then be provided to a transmitter 10404 which may provide further signal conversion, modulation, signal shaping, including amplification and transmission medium matching. It is then provided to a medium converter such as an antenna 10405. At the receiving end the process is reversed. A receiving transducer 10406, which may be an antenna, receives a signal; the signal may be optimized, amplified, demodulated, detected, and converted into signals that are further processed by a unit 10407. Unit 10408 may provide error detection or correction, which may be combined with de-interleaving. Unit 10409 may provide detection or descrambling of a sequence in accordance with an aspect of the present invention. Unit 10410 may be the target of the system. This may be an end user such as a receiving phone or tv set or computer. It may also be an apparatus that is part of a communication system, such as a demultiplexer or any other communication or storage apparatus.

It is to be understood that additional functions may be included in a system as shown in FIG. 104. This may include additional coding steps, insertion of a pilot signal or a synchronization signal or any other useful step. However, these steps in general will not negate the step of scrambling, descrambling or sequence detection as provided herein as different aspects of the present invention. Unit 10411 may be a communication device that can receive and that can process a signal in accordance with at least one aspect of the present invention. Such a device may be a tv-receiver, a computer that is connected to a network for instance the Internet, a mobile computing device, a wireless computing device, a radio device, a wireless phone, a GPS device, or any device that can receive a signal that can be processed in accordance with at least one aspect of the present invention. The scrambling, descrambling and sequence detection methods and apparatus that are an aspect of the present invention may also be applied to a data storage system. Such a system in general contains two parts a writing part which is shown in diagram in FIG. 105 and a reading part which is shown in diagram in FIG. 106.

Figure 105:
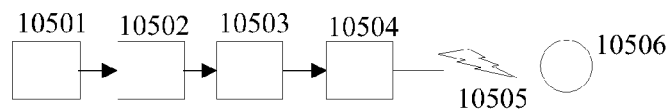

The writing part of a storage system as shown in FIG. 105 has units that provide several functions. A unit 10501 provides digital data. This may be data in the form of discrete n-state signals. It may also be data in the form of binary signals. The signal may be binary or non-binary signals with no word synchronization. A unit 10502 may scramble the signal as provided by 10501 in accordance with one or more aspects of the present invention. A unit 10503 may provide error control coding. A unit 10504 may provide signal conversion and/or shaping and/or modulation to prepare the signal for writing to a storage medium 10506. The signal as generated by 10504 may be provided to a signal converter 10505 that converts the signal from 10504 to a signal that can be written to a medium 10506 and may include a Digital/Analog converter. For instance 10504 may be an electrical signal that is converted to an optical signal by 10505 to be written to a storage medium that is an optical disk 10506. A storage medium 10506 may be an optical, electro-optical, magneto-optical, magnetic or electronic medium or any medium that can store binary signals and/or non-binary signals.

Figure 106:
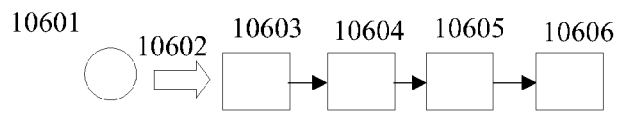

A storage system also has a reading part as shown in FIG. 106. Herein, a signal is read from the medium 10601 by a transducer 10602 and processed by 10603, which may include a demodulator, an Analog/Digital transducer or other processing components. A unit 10604 may provide error correcting decoding or error detection, de-interleaving and the like. A unit 10605 may provide descrambling and/or sequence detection in accordance with an aspect of the present invention. The target for the detected and/or descrambled signal is unit 10606. The order of units and functions may in some instances be in a different order. Other functions may also be provided, including insertion and/or detection and/or removal of synchronization data. The device as shown in FIG. 106 may be part of a storage device that is a CD-player, a DVD-player, an MP3 player or any device that is enabled to read and play a signal that can be processed in accordance with at least one aspect of the present invention.

The device 10411 in FIG. 10 and the device as shown in diagram in FIG. 106 may both be called a playing device that processes a signal according to at least one aspect of the present invention.

Scramblers and descramblers as provided herein may be applied to storage devices. For instance one may scramble a word of p-bits before writing it to a magnetic storage disk, an optical storage disk or to an electronic storage device. One may transfer a word of p-bits into a single $2^p$ symbol. One may modulate the signal with a modulation technique such as QAM-$2^p$ before writing it to a storage medium. One may reverse the operations for retrieving $2^p$ symbols or p-bit words from a storage medium: read the symbols from the medium, if required demodulate the read signals, and descramble the symbols or words with the descramblers herein provided. One may also use sequence generators provided herein on storage media, for instance for synchronization purposes. An n-state sequence or a sequence of p-bit words may indicate a point of significance on the storage medium. Either the provided correlation techniques or sequence detectors may be applied to find those points of significance. Accordingly, communication systems and apparatus and data storage apparatus and systems using the scramblers, descramblers, sequence generators and sequence detectors have also been provided as an aspect of the present invention.

One may also store QAM signals on an optical disk. By using a signal writer such as a light source and a light pick-up as for reading the receiving antenna one may write a signal to an optical disk and read the n-state optical signal from the disk. Accordingly a storage system is provided that can apply the scrambling and descrambling methods provided herein. Optical herein includes purely optical, as well as electro-optical and magneto-optical as well as any other phenomenon that has an optical component. Data storage systems and apparatus may also use magnetic materials. Such devices may for instance store directly multi-state symbols with for instance different magnetic states or orientations. They may also be stored in a quasi-analog/digital manner for instance as a QAM-n modulated signal.

In view of the above description of the present invention, it will be appreciated by those skilled in the art that many variations, modifications and changes can be made to the present invention without departing from the spirit or scope of the present invention as defined by the claims appended hereto. All such variations, modifications or changes are fully contemplated by the present invention.

The scrambling and descrambling methods and apparatus, the sequence generating and detecting methods and apparatus, and the correlation methods and apparatus as provided herein as an aspect of the present invention may be part of a system. This may include: a communication system, a data storage system or any other system for coding, or transmitting, or storing, or receiving, or retrieving, or decoding or any other system for processing data. The system may be a wired or a wireless system. A data storage system may be a system using an optical disk, or an electro-optical disk. It may also use a magnetic medium. Symbols may be represented as optical, electronic or any other valid representation that can be processed, including magnetic. The n-valued symbols may be represented as signals having physical properties of for example different amplitude, phase, modulation, polarization or any other quantifiable physical property. Switching tables may be realized in electronic, optical, electro-optical, electromechanical, quantum mechanical or any other way that can implement an n-valued truth table. A symbol may also be represented by a series of lower valued symbols such as binary symbols. Switching and storage of symbols then take effect on the series of symbols, often called words.

A binary or n-state function that is an inverter may be called a one-place function. A device that implements such a function in general has only a functional input and a functional output, though it may have inputs for power supply and the like. Such one-place functions are determined by a 1 by n truth table for an n-state inverter and a 1 by 2 truth table for a binary inverter. An n-state or binary switching or logic function that can be defined by an n by m truth table with m≧n and n≧2 may be called a 2-place function as it has two inputs (and one output). It may also be called a 2-place logic function, or a 2-place n-state logic function. In the binary case such a function may be called a 2-place binary logic function. XOR and EQUIVALENCE are both reversible binary 2-place functions.

A connection between two connection points herein may be a straight connection. One may also say the connection is formed by an Identity Inverter or an Identity one-place logic function; for instance in the binary case [0 1]→[0 1]. A connection is herein also considered to be a connection that includes a reversible one-place function that is not an Identity Inverter; for instance in the binary case [0 1]→[1 0] is considered herein a connection. In a connection in the n-state case with n>2 wherein the one-place logic function in a connection is not reversible, but does not provide one constant output, is also considered to be a connection. A one-place logic function that provides one constant output, for instance [0 1]→[0 0] is not considered to be a connection. For instance in FIG. 70 tap 7005 which has no inverter and connects two points is a connection herein. In FIG. 70 tap 7006 which contains inverter 7004 is also a connection herein. In FIG. 66 the connection between the output of shift register element 6612 and input of device 6501 contains a device implementing an inverter 6507. The output of 6612 and the input of 6501 are called connected herein. Mentioning of the inverter is not required for this connecting aspect. In FIG. 66 the connection between the output 6605 and the output of device 6502 contains a device implementing an inverter 6603. The output 6605 and the output of 6502 are called connected herein. Mentioning of the inverter is not required for this connecting aspect herein. It is pointed out that one may differentiate two connections by the different inverter 2-place functions that they may have. Accordingly an output that is connected to an input, or an input that is connected to another input and the like may contain an inverter; it may also contain not an inverter.

The steps of the methods which are provided as aspects of the present invention may be implemented in a processor; such a processor may be a general purpose processor or for instance a digital signal processor or a microprocessor. Such a processor may process binary symbols or signals. It may also process n-valued symbols. It may also process n-state symbols as words of binary symbols or signals. They may use A/D and D/A converters to change n-valued symbols in words of lower valued symbols and to convert words of lower valued symbols into n-valued symbols. In case an n-valued symbol is represented as a word of lower valued symbol a storage element of a shift register is assumed to be able all elements of a word representing an n-valued symbol. The n-valued symbols may also be processed by dedicated or custom made switching and storage components. The methods and apparatus may also be implemented in standard binary components, or in programmable devices such as Field Programmable Gate Arrays (FPGAs) or in any other device that will process signals in accordance with one or more aspects of the present invention. While electronic devices are common, aspects of the present invention may also be processed by other type of signals, including optical, chemical, bio-chemical, biological and/or quantum mechanical representation of symbols.

It is pointed out that for convenience the terms scrambler and descrambler are applied herein. A scrambler is generally understood to be at the sending side and a descrambler at the receiving side. This terminology is also applied herein, and descramblers provided herein are self-synchronizing. It is pointed out that one may scramble with apparatus that is called herein a descrambler, and one may descramble with an apparatus that is called herein a scrambler. The self-synchronizing aspect of what is called a descrambler may be lost if one uses a what is called herein a scrambler to descramble. However, if one is able to provide corresponding initial conditions as they relate to scramblers and descramblers, reversal of their roles should not be a problem. Reversal of those roles is explicitly and fully contemplated as an aspect of the present invention.

While the invention has been described with reference to an illustrative embodiment, this description is not intended to be construed in a limiting sense. For example, while the disclosed embodiments utilize discrete devices, these devices can be implemented using one or more appropriately programmed processors, special-purpose integrated circuits, digital processors, or an analog or hybrid counterpart of any of these devices.

The following patent applications, including the specifications, claims and drawings, are hereby incorporated by reference herein, as if they were fully set forth herein: (1) U.S. Non-Provisional patent application Ser. No. 10/935,960, filed on Sep. 8, 2004, entitled TERNARY AND MULTI-VALUE DIGITAL SCRAMBLERS, DESCRAMBLERS AND SEQUENCE GENERATORS; (2) U.S. Non-Provisional patent application Ser. No. 10/936,181, filed Sep. 8, 2004, entitled TERNARY AND HIGHER MULTI-VALUE SCRAMBLERS/DESCRAMBLERS; (3) U.S. Non-Provisional patent application Ser. No. 10/912,954, filed Aug. 6, 2004, entitled TERNARY AND HIGHER MULTI-VALUE SCRAMBLERS/DESCRAMBLERS; (4) U.S. Non-Provisional patent application Ser. No. 11/042,645, filed Jan. 25, 2005, entitled MULTI-VALUED SCRAMBLING AND DESCRAMBLING OF DIGITAL DATA ON OPTICAL DISKS AND OTHER STORAGE MEDIA; (5) U.S. Non-Provisional patent application Ser. No. 11/000,218, filed Nov. 30, 2004, entitled SINGLE AND COMPOSITE BINARY AND MULTI-VALUED LOGIC FUNCTIONS FROM GATES AND INVERTERS; (6) U.S. Non-Provisional patent application Ser. No. 11/065,836 filed Feb. 25, 2005, entitled GENERATION AND DETECTION OF NON-BINARY DIGITAL SEQUENCES; (7) U.S. Non-Provisional patent application Ser. No. 11/139,835 filed May 27, 2005, entitled Multi-Valued Digital Information Retaining Elements and Memory Devices; (8) U.S. Non-Provisional patent application Ser. No. 12/137,945 filed on Jun. 12, 2008, entitled Methods and Systems for Processing of n-State Symbols with XOR and EQUALITY Binary Functions; (9) U.S. Non-Provisional patent application Ser. No. 11/679,316, filed on Feb. 27, 2007, entitled METHODS AND APPARATUS IN FINITE FIELD POLYNOMIAL IMPLEMENTATIONS; (10) U.S. Non-Provisional patent application Ser. No. 11/696,261, filed on Apr. 4, 2007, entitled BINARY AND N-VALUED LFSR AND LFCSR BASED SCRAMBLERS, DESCRAMBLERS, SEQUENCE GENERATORS AND DETECTORS IN GALOIS CONFIGURATION; (11) U.S. Non-Provisional patent application Ser. No. 11/964,507 filed on Dec. 26, 2007, entitled IMPLEMENTING LOGIC FUNCTIONS WITH NON-MAGNITUDE BASED PHYSICAL PHENOMENA; and (12) U.S. Provisional patent application Ser. No. 61/078,606, filed on Jul. 7, 2008, entitled Methods and Systems for N-state Symbol Processing with Binary Devices.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A method for scrambling with a scrambler a sequence of p n-state symbols not generated by the scrambler with n equal to or greater than 2 and with p>1, each n-state symbol able to assume one of n states, into a sequence of p scrambled n-state symbols, comprising:

inputting an n-state symbol in the sequence of p n-state symbols on a first input of a reversible n-state logic function;

receiving on a second input of the reversible n-state logic function an n-state symbol provided by an output of an n-state shift register that is part of an n-state Linear Feedback Shift Register (LFSR) based scrambler in Galois configuration with a shift register of k n-state shift register elements with k<p;

providing on an input of the n-state shift register an n-state symbol that is available on an output of the reversible n-state logic function;

providing on a tap into the n-state shift register the n-state symbol that is available on the output of the reversible n-state logic function; and providing an n-state symbol in the sequence of p scrambled n-state symbols on an output of the n-state Linear Feedback Shift Register (LFSR) based scrambler in Galois configuration.

2. The method of claim 1, wherein n>2.

3. The method of claim 2, wherein an n-state symbol is processed as a plurality of bits and the n-state shift register is realized as a plurality of binary shift registers.

4. The method of claim 3, wherein the plurality of binary shift registers form a plurality of cross-connected binary LFSRs with a plurality of reversible binary logic functions.

5. The method of claim 2, wherein the n-state LFSR includes at least one non-commutative n-state logic function.

6. The method of claim 1, further comprising a self-synchronizing method of descrambling that descrambles the sequence of p scrambled n-state symbols into a sequence of p descrambled n-state symbols that is equivalent to the sequence of p n-state symbols.

7. The method of claim 1, wherein the method is applied in a communication system.

8. The method of claim 1, wherein the method is applied in a storage system.

9. The method of claim 1, further comprising inverting an n-state symbol in accordance with an n-state inverter before it is provided to an input.

10. A descrambler for descrambling a sequence of p scrambled n-state symbols with n equal to or greater than 2 not generated by the descrambler, each n-state symbol able to assume one of n states, into a sequence of p descrambled n-state symbols with p>1, comprising:
  an n-state Linear Forward Connected Shift Register (LFCSR) in Galois configuration having an n-state shift register with an input and an output, the input of the n-state shift register enabled to receive the sequence of p scrambled n-state symbols and the input of the n-state shift register being connected to at least one tap of the n-state LFCSR;
  a first device implementing an n-state reversible logic function with a first input being connected to the output of the n-state shift register, and a second input being connected to the input of the n-state shift register; and
  an output of the first device enabled to provide the sequence of p descrambled n-state symbols.

11. The descrambler of claim 10, wherein a connection to an input includes an n-state inverter.

12. The descrambler of claim 10, wherein n>2.

13. The descrambler of claim 12, wherein an n-state symbol is processed as a plurality of bits and the n-state shift register is realized as a plurality of binary shift registers.

14. The descrambler of claim 13, wherein the plurality of binary shift registers form a plurality of cross-connected binary LFCSRs with a plurality of reversible binary logic functions.

15. The descrambler of claim 10, wherein the descrambler is self-synchronizing.

16. The descrambler of claim 10, wherein the descrambler is part of a communication system.

17. The descrambler of claim 10, wherein the descrambler is part of a storage system.

18. The descrambler of claim 10, wherein the descrambler is part of a media player.

19. A method for descrambling with a descrambler a sequence of p scrambled n-state symbols with n equal to or greater than 2 and with p>1, each n-state symbol able to assume one of n states, into a sequence of p descrambled n-state symbols, comprising:
  inputting an n-state symbol in the sequence of p scrambled n-state symbols on an input of an n-state shift register of an n-state Linear Forward Connected Shift Register (LFCSR) in Galois configuration and on an input of a multi-input n-state logic function in a tap of the n-state LFCSR;
  receiving on a first input of a reversible n-state logic function an n-state symbol provided by an output of the n-state shift register;
  receiving on a second input of the reversible n-state logic function the n-state symbol in the sequence of p scrambled n-state symbols; and
  providing on an output of the reversible n-state logic function a descrambled n-state symbol in the sequence of p descrambled symbols.

20. The method of claim 19, wherein an n-state symbol is received by an input through an n-state inverter.

* * * * *